(12) United States Patent
Farber et al.

(10) Patent No.: US 7,802,310 B2
(45) Date of Patent: *Sep. 21, 2010

(54) CONTROLLING ACCESS TO DATA IN A DATA PROCESSING SYSTEM

(75) Inventors: David A. Farber, Ojai, CA (US); Ronald D. Lachman, Northbrook, IL (US)

(73) Assignees: Kinetech, Inc., Studio City, CA (US); Level 3 Communications, LLC, Broomfield, CO (US)

( * ) Notice: Subject to any disclaimer, the term of this patent is extended or adjusted under 35 U.S.C. 154(b) by 79 days.

This patent is subject to a terminal disclaimer.

(21) Appl. No.: 11/980,687

(22) Filed: Oct. 31, 2007

(65) Prior Publication Data

US 2008/0066191 A1  Mar. 13, 2008

Related U.S. Application Data

(60) Continuation of application No. 11/724,232, filed on Mar. 15, 2007, which is a continuation of application No. 11/017,650, filed on Dec. 22, 2004, which is a continuation of application No. 09/987,723, filed on Nov. 15, 2001, now Pat. No. 6,928,442, which is a continuation of application No. 09/283,160, filed on Apr. 1, 1999, now Pat. No. 6,415,280, which is a division of application No. 08/960,079, filed on Oct. 24, 1997, now Pat. No. 5,978,791, which is a continuation of application No. 08/425,160, filed on Apr. 11, 1995, now abandoned, application No. 11/980,687, which is a continuation of application No. 10/742,972, filed on Dec. 23, 2003, which is a division of application No. 09/987,723, filed on Nov. 15, 2001, now Pat. No. 6,928,442, which is a continuation of application No. 09/283,160, filed on Apr. 1, 1999, now Pat. No. 6,415,280, which is a division of application No. 08/960,079, filed on Oct. 24, 1997, now Pat. No. 5,978,791, which is a continuation of application No. 08/425,160, filed on Apr. 11, 1995, now abandoned.

(51) Int. Cl.
*H04L 29/06* (2006.01)
*G06F 21/00* (2006.01)

(52) U.S. Cl. .................................. 726/28; 711/163
(58) Field of Classification Search .................. 726/28, 726/27, 29; 713/181
See application file for complete search history.

(56) References Cited

U.S. PATENT DOCUMENTS 3,668,647 A   6/1972   Evangelisti et al.

(Continued)

FOREIGN PATENT DOCUMENTS

EP   0 268 069 A2   5/1988

(Continued)

OTHER PUBLICATIONS

Cheriton, David R. and Mann, Timothy P., "Decentralizing a global naming service for improved performance and fault tolerance", ACM Transactions on Computer Systems, vol. 7, No. 2, May 1989, pp. 147-183.

(Continued)

*Primary Examiner*—Gilberto Barron, Jr.
*Assistant Examiner*—Samson B Lemma
(74) *Attorney, Agent, or Firm*—Davidson Berquist Jackson & Gowdey, LLP; Brian Siritzky

(57) ABSTRACT

Access to and delivery of licensed content is controlled using content names that were determined based on the content. A name for a data item is obtained, the name having been determined based at least in part on the data which comprise the contents of the data item. Access to the data item is authorized based at least in part on the name. Once authorized, access may be granted from more than one computer. The name may have been determined using a hash or message digest function such as MD4, MD5 or SHA. The data item may comprise a file, a portion of a file, a page in memory, a digital message, a digital image, a video signal or an audio signal.

87 Claims, 31 Drawing Sheets

U.S. PATENT DOCUMENTS

| | | | |
|---|---|---|---|
| 3,835,260 A | 9/1974 | Prescher et al. | |
| 4,096,568 A | 6/1978 | Bennett et al. | |
| 4,215,402 A | 7/1980 | Mitchell et al. | |
| 4,221,003 A | 9/1980 | Chang et al. | |
| 4,290,105 A | 9/1981 | Cichelli et al. | |
| 4,376,299 A | 3/1983 | Rivest | |
| 4,405,829 A | 9/1983 | Rivest et al. | |
| 4,412,285 A | 10/1983 | Neches et al. | |
| 4,414,624 A | 11/1983 | Summer, Jr. et al. | |
| 4,441,155 A | 4/1984 | Fletcher et al. | |
| 4,464,713 A | 8/1984 | Benhase et al. | |
| 4,490,782 A | 12/1984 | Dixon et al. | |
| 4,558,413 A | 12/1985 | Schmidt et al. | |
| 4,571,700 A | 2/1986 | Emry, Jr. et al. | |
| 4,577,293 A | 3/1986 | Matick et al. | |
| 4,642,793 A | 2/1987 | Meaden | |
| 4,658,093 A | 4/1987 | Hellman | |
| 4,675,810 A | 6/1987 | Gruner et al. | |
| 4,691,299 A | 9/1987 | Rivest et al. | |
| 4,725,945 A | 2/1988 | Kronstadt et al. | |
| 4,773,039 A | 9/1988 | Zamora | |
| 4,821,184 A | 4/1989 | Clancy et al. | |
| 4,887,235 A | 12/1989 | Holloway et al. | |
| 4,888,681 A | 12/1989 | Barnes et al. | |
| 4,914,586 A | 4/1990 | Swinehart et al. | |
| 4,922,414 A | 5/1990 | Holloway et al. | |
| 4,922,417 A | 5/1990 | Churm et al. | |
| 4,949,302 A | 8/1990 | Arnold et al. | |
| 4,972,367 A | 11/1990 | Burke | |
| 5,007,658 A | 4/1991 | Bendert et al. | |
| 5,014,192 A | 5/1991 | Mansfield et al. | |
| 5,025,421 A | 6/1991 | Cho | |
| 5,047,918 A | 9/1991 | Schwartz et al. | |
| 5,050,074 A | 9/1991 | Marca | |
| 5,050,212 A | 9/1991 | Dyson | |
| 5,057,837 A | 10/1991 | Colwell et al. | |
| 5,077,658 A | 12/1991 | Bendert | |
| 5,084,815 A | 1/1992 | Mazzario | |
| 5,117,351 A | 5/1992 | Miller | |
| 5,129,081 A | 7/1992 | Kobayashi et al. | |
| 5,129,082 A | 7/1992 | Tirfing et al. | |
| 5,144,667 A | 9/1992 | Pogue, Jr. et al. | |
| 5,163,147 A * | 11/1992 | Orita | 707/9 |
| 5,179,680 A | 1/1993 | Colwell et al. | |
| 5,182,799 A | 1/1993 | Tamura et al. | |
| 5,199,073 A | 3/1993 | Scott | |
| 5,202,982 A * | 4/1993 | Gramlich et al. | 1/1 |
| 5,204,897 A | 4/1993 | Wyman | |
| 5,204,958 A | 4/1993 | Cheng et al. | |
| 5,204,966 A | 4/1993 | Wittenberg et al. | |
| 5,208,858 A | 5/1993 | Vollert et al. | |
| 5,247,620 A | 9/1993 | Fukuzawa et al. | |
| 5,260,999 A | 11/1993 | Wyman | |
| 5,276,869 A | 1/1994 | Forrest et al. | |
| 5,276,901 A | 1/1994 | Howell et al. | |
| 5,287,499 A | 2/1994 | Nemes | |
| 5,287,514 A | 2/1994 | Gram | |
| 5,297,279 A | 3/1994 | Bannon et al. | |
| 5,301,286 A | 4/1994 | Rajani | |
| 5,301,316 A | 4/1994 | Hamilton et al. | |
| 5,317,693 A | 5/1994 | Cuenod et al. | |
| 5,341,477 A | 8/1994 | Pitkin et al. | |
| 5,343,527 A | 8/1994 | Moore | |
| 5,347,653 A | 9/1994 | Flynn et al. | |
| 5,351,302 A | 9/1994 | Leighton et al. | |
| 5,357,440 A | 10/1994 | Talbott et al. | |
| 5,357,623 A | 10/1994 | Megory-Cohen | |
| 5,359,523 A | 10/1994 | Talbott et al. | |
| 5,361,356 A | 11/1994 | Clark et al. | |
| 5,371,897 A | 12/1994 | Brown et al. | |
| 5,384,565 A | 1/1995 | Cannon | |
| 5,394,555 A | 2/1995 | Hunter et al. | |
| 5,403,639 A | 4/1995 | Belsan et al. | |
| 5,404,508 A | 4/1995 | Konrad et al. | |
| 5,438,508 A | 8/1995 | Wyman | |
| 5,442,343 A | 8/1995 | Cato et al. | |
| 5,448,668 A * | 9/1995 | Perelson et al. | 714/21 |
| 5,448,718 A | 9/1995 | Cohn et al. | |
| 5,452,447 A | 9/1995 | Nelson et al. | |
| 5,454,000 A * | 9/1995 | Dorfman | 714/54 |
| 5,454,039 A | 9/1995 | Coppersmith et al. | |
| 5,459,860 A | 10/1995 | Burnett | |
| 5,465,365 A | 11/1995 | Winterbottom | |
| 5,467,471 A | 11/1995 | Bader | |
| 5,475,826 A | 12/1995 | Fischer | |
| 5,479,654 A * | 12/1995 | Squibb | 707/695 |
| 5,491,817 A | 2/1996 | Gopal et al. | |
| 5,499,294 A | 3/1996 | Friedman | |
| 5,504,879 A | 4/1996 | Eisenberg et al. | |
| 5,530,757 A * | 6/1996 | Krawczyk | 713/188 |
| 5,537,585 A * | 7/1996 | Blickenstaff et al. | 707/205 |
| 5,542,087 A | 7/1996 | Neimat et al. | |
| 5,553,143 A | 9/1996 | Ross et al. | |
| 5,568,181 A | 10/1996 | Greenwood et al. | |
| 5,581,615 A | 12/1996 | Stern | |
| 5,581,758 A | 12/1996 | Burnett | |
| 5,581,764 A | 12/1996 | Fitzgerald et al. | |
| 5,583,995 A | 12/1996 | Gardner et al. | |
| 5,588,147 A | 12/1996 | Neeman et al. | |
| 5,600,834 A | 2/1997 | Howard | |
| 5,604,803 A | 2/1997 | Aziz | |
| 5,604,892 A | 2/1997 | Nuttall et al. | |
| 5,630,067 A | 5/1997 | Kindell et al. | |
| 5,632,031 A | 5/1997 | Velissaropoulos et al. | |
| 5,638,443 A | 6/1997 | Stefik et al. | |
| 5,640,564 A | 6/1997 | Hamilton et al. | |
| 5,649,196 A | 7/1997 | Woodhill et al. | |
| 5,677,952 A | 10/1997 | Blakley, III et al. | |
| 5,678,038 A | 10/1997 | Dockter et al. | |
| 5,678,046 A | 10/1997 | Cahill et al. | |
| 5,694,472 A * | 12/1997 | Johnson et al. | 713/189 |
| 5,694,596 A | 12/1997 | Campbell | |
| 5,701,316 A | 12/1997 | Alferness et al. | |
| 5,710,922 A | 1/1998 | Alley et al. | |
| 5,724,425 A | 3/1998 | Chang et al. | |
| 5,724,552 A | 3/1998 | Taoda | |
| 5,742,807 A * | 4/1998 | Masinter | 707/1 |
| 5,745,879 A | 4/1998 | Wyman | |
| 5,757,913 A | 5/1998 | Bellare et al. | |
| 5,757,915 A | 5/1998 | Aucsmith et al. | |
| 5,781,629 A | 7/1998 | Haber et al. | |
| 5,802,291 A | 9/1998 | Balick et al. | |
| 5,809,494 A | 9/1998 | Nguyen | |
| 5,826,049 A | 10/1998 | Ogata et al. | |
| 5,835,087 A | 11/1998 | Herz et al. | |
| 5,864,683 A | 1/1999 | Boebert et al. | |
| 5,907,619 A | 5/1999 | Davis | |
| 5,907,704 A | 5/1999 | Gudmundson et al. | |
| 5,940,504 A | 8/1999 | Griswold | |
| 5,978,791 A | 11/1999 | Farber et al. | |
| 5,991,414 A | 11/1999 | Garay et al. | |
| 6,006,018 A | 12/1999 | Burnett et al. | |
| 6,134,603 A | 10/2000 | Jones et al. | |
| 6,135,646 A | 10/2000 | Kahn et al. | |
| 6,415,280 B1 | 7/2002 | Farber et al. | |
| 6,732,180 B1 | 5/2004 | Hale et al. | |
| 6,816,872 B1 * | 11/2004 | Squibb | 1/1 |
| 6,928,442 B2 | 8/2005 | Farber et al. | |
| 2002/0052884 A1 | 5/2002 | Farber et al. | |
| 2002/0082999 A1 | 6/2002 | Lee et al. | |
| 2003/0078888 A1 | 4/2003 | Lee et al. | |
| 2003/0078889 A1 | 4/2003 | Lee et al. | |
| 2003/0095660 A1 | 5/2003 | Lee et al. | |
| 2004/0139097 A1 | 7/2004 | Farber et al. | |

| | | | |
|---|---|---|---|
| 2005/0010792 A1* | 1/2005 | Carpentier et al. | 713/193 |
| 2005/0114296 A1 | 5/2005 | Farber et al. | |
| 2007/0185848 A1 | 8/2007 | Farber et al. | |
| 2008/0065635 A1 | 3/2008 | Farber et al. | |
| 2008/0066191 A1 | 3/2008 | Farber et al. | |
| 2008/0071855 A1 | 3/2008 | Farber et al. | |
| 2008/0082551 A1 | 4/2008 | Farber et al. | |

FOREIGN PATENT DOCUMENTS

| | | |
|---|---|---|
| EP | 0 315 425 | 5/1989 |
| EP | 0 558 945 A2 | 9/1993 |
| EP | 0 566 967 A2 | 10/1993 |
| EP | 0592045 | 4/1994 |
| EP | 0631 226 A1 | 12/1994 |
| EP | 0 654 920 A2 | 5/1995 |
| EP | 0 658 022 A2 | 6/1995 |
| GB | 2294132 A | 4/1996 |
| JP | 59058564 | 4/1984 |
| JP | 63-106048 | 5/1988 |
| JP | 63-273961 | 11/1988 |
| JP | 2-127755 | 5/1990 |
| JP | 05162529 | 6/1993 |
| JP | 06187384 A2 | 7/1994 |
| JP | 06348558 A | 12/1994 |
| WO | WO 92/20021 | 11/1992 |
| WO | WO 94/06087 | 3/1994 |
| WO | WO 94/20913 | 9/1994 |
| WO | WO 95/01599 | 1/1995 |
| WO | WO 97/43717 | 11/1997 |

OTHER PUBLICATIONS

Request for Reexamination of U.S. Patent No. 6,928,442: Reexam U.S. Appl. No. 90/010,260, filed on Aug. 29, 2008.
Advances in Cryptology-AUSCRYPT '92—Workshop on the Theory and Application of Cryptographic Techniques Gold Coast, Queensland, Australia Dec. 13-16, 1992 Proceedings.
Advances in Cryptology-EUROCRYPT '93, Workshop on the Theory and Application of Cryptographic Techniques Lofthus, Norway, May 23-27, 1993 Proceedings.
Affidavit of Timothy P. Walker in Support of CWIS' Opening Markman Brief Construing the Terms at Issue in U.S. Patent No. 6,415,280, dated Jul. 25, 2003, from Civil Action No. 02-11430 RWZ.
Akamai and MIT's Memorandum in Support of Their Claim Construction of USPAT 5,978,791, dated Aug. 31, 2001, from Civil Action No. 00-cv-11851RWZ.
Akamai's Answer, Affirmative Defenses and Counterclaims to Amended Complaint, filed Dec. 6, 2002, in Civil Action No. 02-CV-11430RWZ.
Akamai's Brief on Claim Construction, dated Aug. 8, 2003, from Civil Action No. 02-11430 RWZ.
Albert Langer (cmf851@anu.oz.au), http://groups.google.com/groups?selm=1991Aug7.225159.786%40newshost.anu.edu.au&oe=UTF-8&output=gplain, Aug. 7, 1991.
Alexander Dupuy (dupuy@smarts.com), "MD5 and LIFNs (was: Misc Comments)", www.acl.lanl.gov/URI/archive/uri-94q2.messages/0081.html, Apr. 17, 1994.
Alexander Dupuy (dupuy@smarts.com), "RE: MD5 and LIFNs (was: Misc Comments)", www.acl.lanl.gov/URI/archive/uri-94q2.messages/0113.html, Apr. 26, 1994.
Answer of Defendant RIAA to First Amended Complaint and Counterclaim, dated Feb. 8, 2005, from Civil Action No. CV04-7456 JFW (CTx).
Berners-Lee, T. et al., "Hypertext Transfer Protocol—HTTP/1.0," May 1996, pp. 1-54.
Berners-Lee, T. et al., "Uniform Resource Locators (URL)," pp. 1-25, Dec. 1994.
Berners-Lee, T., "Universal Resource Identifiers in WWW," Jun. 1994, pp. 1-25.
Bert dem Boer, et al., Collisions for the compression function of MD.sub.5 pp. 292-304, 1994.

Birgit Pfitzman, Sorting Out Signature Schemes, Nov. 1993, 1.sup.st Conf. Computer & Comm. Security '93, p. 74-85.
Birgit Pfitzmann, Sorting Out Signature Schemes, Nov. 1993, 1st Conf. Computer & Comm. Security '93 pp. 74-85.
Bowman, C. Mic, et al., "Harvest: A Scalable, Customizable Discovery and Access System," Aug. 4, 1994, pp. 1-27.
Bowman, C. Mic, et al., "Harvest: A Scalable, Customizable Discovery and Access System," Mar. 12, 1995, pp. 1-29.
Brisco, T., "DNS Support for Load Balancing," Apr. 1995, pp. 1-7.
Browne, Shirley et al., "Location-Independent Naming for Virtual Distributed Software Repositories," 1995, 7 pages.
Browne, Shirley et al., "Location-Independent Naming for Virtual Distributed Software Repositories," 1995, printed from http:/www.netlib.org/utk/papers/lifn/main.html on Mar. 22, 2006, 18 pages.
Carter, J. Lawrence, et al. "Universal Classes of Hash Functions." Journal of Computer and System Sciences, vol. 18, No. 2, Apr. 1979, pp. 143-154.
Chris Charnes and Josef Pieprzky, Linear Nonequivalence versus Nonlinearity, Pieprzky, pp. 156-164, 1993.
Civil Minutes General dated Jan. 25, 2005, from Civil Action No. CV 04-7456-JFW (CTx).
Clifford Lynch (Calur@uccmvsa.bitnet), "ietf url/uri overview draft paper (long)", www.acl.lanl.gov/URI/archive/uri-93q1.messages/0015.html, Mar. 25, 1993.
Complaint for Patent Infringement, Permanent Injunction, and Damages, dated Sep. 8, 2004, from Civil Action No. CV 04-7456 JFW (AJWx).
Cormen, Thomas H., et al. Introduction to Algorithms, The MIT Press, Cambridge, Massachusetts, 1994, pp. 219-243, 991-993.
CWIS' Opening Markman Brief Construing the Terms at Issue in U.S. Patent No. 6,415,280, dated Jul. 25, 2003, from Civil Action No. 02-11430 RWZ.
CWIS' Reply Markman Brief Construing the Terms at Issue in U.S. Patent No. 6,415,280, dated Aug. 15, 2003, from Civil Action No. 02-11430 RWZ.
Danzig, P.B., et al., ""Distributed Indexing: A Scalable Mechanism For Distributed Information Retrieval,"" Proceedings of the 14th Annual International ACM SIGIR Conference on Research and Development in Information Retrieval, pp. 220-229, Oct. 13-16, 1991.
Davis, James R., "A Server for a Distributed Digital Technical Report Library," Jan. 15, 1994, pp. 1-8.
Declaration of Robert B.K. Dewar in Support of CWIS' Construction of the Terms at Issue in U.S. Patent No. 6,415,280, dated Jul. 25, 2003, from Civil Action No. 02-cv-11430RWZ.
Deering, Stephen, et al. "Multicast Routing in Datagram Internetworks and Extended LANs." ACM Transactions on Computer Systems, vol. 8, No. 2, May 1990, pp. 85-110.
Defendant Digital Island's Opening Brief on Claim Construction Issues dated Aug. 17, 2001, from Civil Action No. 00-cv-11851-RWZ.
Defendant Lime Wire, LLC's Answer, Affirmative Defenses and Counterclaims dated Nov. 15, 2007, from Civil Action No. 07-06161 VBF (PLAx).
Defendant Media Sentry, Inc.'s Reply Memorandum of Points and Authorities in Further Support of Its Motion to Dismiss, dated Nov. 15, 2004, from Civil Action No. CV04-7456 JFW (CTx).
Defendant MediaSentry Inc.'s Notice of Motion and Motion to Dismiss First Amended Complaint; Memorandum of Points and Authorities in Support Thereof, dated Dec. 13, 2004, from Civil Action No. CV04-7456 JFW.
Defendant MediaSentry, Inc.'s Answer to Plaintiffs' First Amended Complaint and Counterclaims, dated Feb. 8, 2005, from Civil Action No. CV04-7456 JFW (CTx).
Defendant RIAA's Notice of Motion and Motion to Dismiss First Amended Complaint; Memorandum of Points and Authorities in Support Thereof, dated Dec. 13, 2004, from Civil Action No. CV04-7456 JFW (CTx).
Defendants Loudeye Corp.'s and Overpeer, Inc.'s Answer to Plaintiffs' First Amended Complaint and Counterclaim, dated Feb. 8, 2005, from Civil Action No. 04-7456 JFW (AJWx).
Defendants' Preliminary Invalidity Contentions dated Dec. 14, 2006, from Civil Action No. CV 06-5086 SJO (Ex).

Devine, Robert. "Design and Implementation of DDH: A Distributed Dynamic Hashing Algorithm." In Proc. of 4th International Conference on Foundations of Data Organizations and Algorithms, 1993, pp. 101-114.

European Search Report issued Dec. 23, 2004 in corresponding European Application No. 96910762.2-2201.

Expert Report of Professor Ellis Horowitz, dated Mar. 6, 2006, from Civil Action No. 04-7456 JFW (CTx).

Expert Report of the Honorable Gerald J. Mossinghoff, dated Mar. 13, 2006, from Civil Action No. 04-7456 JFW (CTx).

Faltstrom, P. et al., "How to Interact with a Whois++ Mesh," Feb. 1996, pp. 1-9.

Feeley, Michael, et al. "Implementing Global Memory Management in a Workstation Cluster." In Proc. of the 15th ACM Symp. on Operating Systems Principles, 1995, pp. 201-212.

Fielding, R. et al., "Hypertext Transfer Protocol—HTTP/1.1," Jan. 1997, pp. 1-163.

Fielding, R. et al., "Hypertext Transfer Protocol—HTTP/1.1," Jun. 1999, pp. 1-157.

First Amended Complaint for Patent Infringement, Permanent Injunction and Damages, dated Nov. 24, 2004, from Civil Action No. CV 04-7456 JFW (CTx).

Floyd, Sally, et al. "A reliable Multicast Framework for Light-Weight Sessions and Application Level Framing." In Proceeding of ACM SIGCOMM '95, pp. 342-356.

Fredman, Michael, et al. "Storing a Sparse Table with 0(1) Worst Case Access Time." Journal of the Association for Computing Machinery, vol. 31, No. 3, Jul. 1984, pp. 538-544.

G. L. Friedman, Digital Camera With Apparatus for Authentication of Images Produced From an Image File, NASA Case No. NPO-19108-1-CU, U.S. Appl. No. 08/159,980, Nov. 24, 1993.

Grigni, Michelangelo, et al. "Tight Bounds on Minimum Broadcasts Networks." SIAM Journal of Discrete Mathematics, vol. 4, No. 2, May 1991, pp. 207-222.

Gwertzman, James, et al. "The Case for Geographical Push-Caching." Technical Report HU TR 34-94 (excerpt), Harvard University, DAS, Cambridge, MA 02138, 1994, 2 pgs.

H. Goodman, Ada, Object-Oriented Techniques, and Concurrency in Teaching Data Structures and File Management Report Documentation p. Ad-A275 385-94-04277.

H. Goodman, Feb. 9, 1994 Ada, Object-Oriented Techniques, and Concurrency in Teaching Data Sructures and File Management Report Documentation P. AD-A275 385-94-04277.

Hauzeur, B. M., "A Model for Naming, Addressing, and Routing," ACM Trans. Inf. Syst. 4, Oct. 4, 1986), 293-311.

International Search Report dated Jun. 24, 1996 in corresponding international application PCT/US1996/004733.

K. Sollins and L. Masinter, "Functional Requirements for Uniform Resource Names", www.w3.org/Addressing/rfc1737.txt, Dec. 1994, pp. 1-7.

Khare, R. and Lawrence, S., "Upgrading to TLS Within HTTP/1.1," May 2000, pp. 1-12.

Khoshafian, S. N. et al. 1986. Object identity. In Conf. Proc. On Object-Oriented Programming Systems, Languages and Applications (Portland, Oregon, United States, Sep. 29-Oct. 2, 1986). N. Meyrowitz, Ed. OOPLSA '86. ACM Press, New York, NY, 406-416.

Kim et al., "Experiences with Tripwire: Using Integrity Checkers for Intrusion Detection", COAST Labs. Dept. of Computer Sciences Purdue University, Feb. 22, 1995, pp. 1-12.

Kim et al., "The Design and Implementation of Tripwire: A file System Integrity Checker", COAST Labs. Dept. of Computer Sciences Purdue University, Feb. 23, 1995, pp. 1-18.

Kim et al., "The Design and Implementation of Tripwire: A file System Integrity Checker", COAST Labs. Dept. of Computer Sciences Purdue University, Nov. 19, 1993, pp. 1-21.

Kim, Gene H., and Spafford, Eugene H., "Writing, Supporting, and Evaluating Tripwire: A Publicly Available Security Tool." COAST Labs. Dept. of Computer Sciences Purdue University, Mar. 12, 1994, pp. 1-23.

Knuth, Donald E., "The Art of Computer Programming," 1973, vol. 3, Ch. 6.4, pp. 506-549.

Lantz, K. A., et al., "Towards a universal directory service." In Proc. 4th Annual ACM Symp. on Principles of Distributed Computing (Minaki, Ontario, Canada). PODC '85. ACM Press, New York, NY, 250-260.

Leach, P. J., et al.. The file system of an integrated local network. In Proc. 1985 ACM 13th Annual Conf. on Comp. Sci. CSC '85. ACM Press, NY, NY, 309-324.

Leach, P.J., et al., "UIDs as Internal Names in a Distributed File System," In Proc. 1st ACM SIGACT-SIGOPS Symp. on Principles of Distributed Computing (Ottawa, Canada, Aug. 18-20, 1982). PODC '82. ACM Press, New York, NY, 34-41.

Ma, C. 1992. On building very large naming systems. In Proc. 5th Workshop on ACM SIGOPS European Workshop: Models and Paradigms For Distributed Systems Structuring (France, Sep. 21-23, 1992). EW 5. ACM Press, New York, NY, 1-5.

Memorandum of Points and Authorities in Support of Loudeye's and Overpeer's Motion to Dismiss the First Amended Complaint for Failure to State a Claim or, In the Alternative, for a More Definitive Statement, dated Dec. 13, 2004, from Civil Action No. CV-04-7456 JFW (AJWX).

Ming-Ling Lo et al., On Optimal Processor Allocation to Support Pipelined Hash Joins, ACM SIGMOD, pp. 69-78, May 1993.

Moats, R., "URN Syntax," May 1997, pp. 1-8.

Murlidhar Koushik, Dynamic Hashing With Distributed Overflow Space: A File Organization With Good Insertion Performance, 1993, Info. Sys., vol. 18, No. 5, pp. 299-317.

Myers, J. and Rose, M., "The Content-MD5 Header Field," Oct. 1995, pp. 1-4.

Naor, Moni, et al. "The Load, Capacity and Availability of Quorum Systems." In Proceedings of the 35th IEEE Symposium on Foundations of Computer Science, Nov. 1994, pp. 214-225.

Nisan, Noam. "Psuedorandom Generators for Space-Bounded Computation." In Proceedings of the Twenty-Second Annual ACM Symposium on Theory of Computing, May 1990, pp. 204-212.

Office Action in corresponding Japanese Application No. 531,073/1996 mailed on Apr. 25, 2006.

Office Communication in corresponding European Application No. 96910762.2-1225 dated Jan. 17, 2007.

Order Re Claim Construction dated Nov. 8, 2001, from Civil Action No. 00-11851-RWZ.

Palmer, Mark, et al. "Fido: A Cache that Learns to Fetch." In Proceedings of the 17th International Conference on Very Large Data Bases, Sep. 1991, pp. 255-264.

Patent Abstracts of Japan, "Device for Generating Database and Method for the Same," Application No. 03-080504, Sun Microsyst. Inc., published Jun. 1993, 38 pages.

Patent Abstracts of Japan, "Electronic Mail Multiplexing System and Communication Control Method in The System." Jun. 30, 1993, JP 051625293.

Patent Abstracts of Japan, "Method for Registering and Retrieving Data Base," Application No. 03-187303, Nippon Telegr. & Teleph. Corp., published Feb. 1993, 11 pages.

Peleg, David, et al. "The Availability of Quorum Systems." Information and Computation 123, 1995, 210-223.

Peter Deutsch (peterd@bunyip.com), "Re: MD5 and LiFNs (was: Misc Comments)", www.acl.lanl.gov/URI/archive/uri-94q2.messages/0106.html, Apr. 26, 1994.

Peterson, L. L. 1988. A yellow-pages service for a local-area network. In Proc. ACM Workshop on Frontiers in Computer Communications Technology (Vermont, 1987). J. J. Garcia-Luna-Aceves, Ed. SIGCOMM '87. ACM Press, New York, NY, 235-242.

Plaintiffs' Memorandum of Points and Authorities in Opposition to Loudeye Defendants' Motion to Dismiss, dated Nov. 8, 2004, from Civil Action No. CV-04-7456 JFW (AJWX).

Plaintiffs' Opposition to Media Sentry's Motion to Dismiss; Memorandum of Points and Authorities in Support Thereof, dated Nov. 8, 2004, from Civil Action No. CV 04-7456 JFW (CTx).

Plaintiff's Opposition to Recording Industry Association of America's Motion to Dismiss; Memorandum of Points and Authorities in Support Thereof, dated Nov. 8, 2004, from Civil Action No. CV-04-7456 JFW (CTx).

Plaintiff's Reply to Defendant Loudeye Corp.'s and Overpeer, Inc.'s Counterclaims, dated Mar. 3, 2005, from Civil Action No. CV 04-7456 JFW (CTx).

Plaintiff's Reply to Defendant MediaSentry's Counterclaims, dated Mar. 3, 2005, from Civil Action No. CV 04-7456 JFW (CTx).

Plaintiff's Reply to Defendant RIAA's Counterclaims, dated Mar. 3, 2005, from Civil Action No. 04-7456 JFW (CTx).

Proceedings of the 1993 ACM SIGMOD International Conference on Management of Data, vol. 22, Issue 2, Jun. 1993.

Rabin, Michael. "Efficient Dispersal of Information for Security, Load Balancing, and Fault Tolerance." Journal of the ACM, vol. 36, No. 2, Apr. 1989, pp. 335-348.

Ravi, R., "Rapid Rumor Ramification: Approximating the Minimum Broadcast Time." In Proc. of the 35th IEEE Symp. on Foundation of Computer Science, Nov. 1994, pp. 202-213.

Ravindran, K. and Ramakrishnan, K. K. 1991. A naming system for feature-based service specification in distributed operating systems. SIGSMALL/PC Notes 17, 3-4 (Sep. 1991), 12-21.

Reed Wade (wade@cs.utk.edu), "re: Dienst and BFD/LIFN document," Aug. 8, 1994, printed from http://www.webhistory.org/www.lists/www-talk1994q3/0416.html on Mar. 22, 2006, (7 pages).

Rivest, R., "The MD5 Message-Digest Algorithm," Apr. 1992, pp. 1-19 and errata sheet (1 page).

Rose, M., "The Content-MD5 Header Field," Nov. 1993, pp. 1-3.

Ross, K., "Hash-Routing for Collections of Shared Web Caches," IEEE Network Magazine, pp. 37-44, Nov.-Dec. 1997.

Sakti Pramanik et al., Multi-Directory Hasing, 1993, Info. Sys., vol. 18, No. 1, pp. 63-74.

Schmidt, Jeanette, et al. "Chernoff-Hoeffding Bounds for Applications with Limited Independence." In Proceedings of the 4th ACS-SIAM Symposium on Discrete Algorithms, 1993, pp. 331-340.

Schneier, Bruce, "One-Way Hash Functions, Using Crypographic Algorithms for Hashing," 1991, printed from http://202.179135.4/data/DDJ/articles/1991/9109/91909g/9109g.htm on Mar. 22, 2006.

Schwartz, M., et al. 1987. A name service for evolving heterogeneous systems. In Proc. 11th ACM Symp. on OS Principles (Texas, Nov. 8-11, 1987). SOSP '87. ACM Press, NY, NY 52-62.

Search Report dated Jun. 24, 1996.

Shaheen-Gouda, A. And Loucks, L. 1992. Name borders. In Proc. 5th Workshop on ACM SIGOPS European Workshop: Models and Paradigms For Distributed Systems Structuring (Mont Saint-Michel, France, Sep. 21-23, 1992). EW 5. ACM Press, NY, NY, 1-6.

Sun Microsystems, Inc., "NFS: Network File System Protocol Specification," Mar. 1989, pp. 1-25.

Tarjan, Robert Endre, et al. "Storing a Sparse Table." Communications of the ACM, vol. 22, No. 11, Nov. 1979, pp. 606-611.

Terry, D. B. 1984. An analysis of naming conventions for distributed computer systems. In Proc. ACM SIGCOMM Symp. on Communications Architectures and Protocols: Tutorials & Symp. SIGCOMM '84. ACM Press, NY, NY, 218-224.

Thomas A. Berson, Differential Cryptanalysis Mod $2^{32}$ with Applications to MD5, pp. 69-81, 1992.

Vijay Kumar, A Concurrency Control Mechanism Based on Extendible Hashing for Main Memory Database Systems, ACM, vol. 3, 1989, pp. 109-113.

Vijay Kumar, A concurrency Control Mechanism based on Extendible Hashing for Main Memory Database Systems, pp. 109-113, ACM, vol. 3, 1989.

Vincenzetti, David and Cotrrozzi, Massimo, "Anti Tampering Program," Proceedings of the Fourth {USENIX} Security Symposium, Santa Clara, CA, 1993, 11 pages.

Vincenzetti, David and Cotrrozzi, Massimo, "Anti Tampering Program," Proceedings of the Fourth {USENIX} Security Symposium, Santa Clara, CA, undated, printed from http://www.ja.net/CERI/Vincenzetti_and_Cotrozzi/ATP_Anti_Tamp on Mar. 22, 2006, 8 pages.

Vitter, Jeffrey Scott, et al. "Optimal Prefetching via Data Compression." In Proceedings of 32nd IEEE Symposium on Foundations of Computer Science, Nov. 1991, pp. 121-130.

W3C:ID, HTTP: A protocol for networked information, "Basic HTTP as defined in 1992", www.w3.org/Protocols/HTTP2.html, 1992.

Wegman, Mark, et al. "New Hash Functions and Their Use in Authentication and Set Equality." Journal of Computer and System Sciences vol. 22, Jun. 1981, pp. 265-279.

William Perrizo, et al., Distributed Join Processing Performance Evaluation, 1994. Twenty-Seventh Hawaii International Conference on System Sciences, vol. II, pp. 236-244.

Witold Litwin et al., LH.sup.—Linear Hashing for Distributed Files, HP Labs Tech. Report No. HPL-93-21, Jun. 1993, pp. 1-22.

Witold Litwin et al., Linear Hashing for Distributed Files, ACM SIGMOD, May 1993, pp. 327-336.

Witold Litwin, et al., LH—Linear Hashing for Distributed Files, HP Labs Tech. Report No. HPL-93-21 Jun. 1993, pp. 1-22.

Yao, Andrew Chi-Chih. "Should Tables be Sorted?" Journal of the Association for Computing Machinery, vol. 28, No. 3, Jul. 1981, pp. 615-628.

Yuliang Zheng et al., Haval—A One-Way Hashing Algorithm with Variable Length of Output (Extended Abstract), pp. 83-105.

Yuliang Zheng, et al., Haval—A One-Way Hashing Algorithm with Variable Length of Output (Extended Abstract), pp. 83-105, Advances in Cryptology, AUSCRIPT '92, 1992.

Zhiyu Tian, et al., A New Hashing Function: Statistical Behaviour and Algorithm, pp. 3-13, SIGIR Forum, 1993.

Zhiyu Tian, et al., A New Hashing Function: Statistical Behaviour and Algorithm, pp. 3-13, SIGIR Forum, Spring 1993.

[Proposed] Order Regarding Construction of Terms, filed Mar. 29, 2007 in C.D. Cal. case No. CV 06-5086 SJO (Ex) [9 pgs.].

Analysis of Plaintiffs' Claim Chart for the '280 Patent As Against Defendant Media Sentry, Inc. 11 pages.

Analysis of Plaintiffs' Claim Chart for the '791 Patent As Against Defendant Media Sentry, Inc. (11916.001.0150.a) pp. 1-48.

Analysis of Plaintiffs' Claim Chart for the '791 Patent As Against Defendant Overpeer pp. 1-40.

Barbara, D., et al., "Exploiting symmetries for low-cost comparison of file copies", 8th Int'l Conf. on Distributed Computing Systems, Jun. 1988, pp. 471-479, San Jose, CA.

Campbell, M., "The Design of Text Signatures for Text Retrieval Systems," Tech. Report, Sep. 5, 1994, Deakin University, School of Computing & Math., Geelong, Australia.

Chang, W. W. et al., "A signature access method for the Starburst database system," in Proc. 15th Int'l Conf. on Very Large Data Bases (Amsterdam, The Netherlands), pp. 145-153.

Changes to Mar. 23, 2007 Deposition of Robert B. K. Dewar, in C.D Cal. case No. CV 06-5086 SJO (Ex) [3 pgs + cover letter.].

Communication from EPO in European Application No. 96 910 762.2-1225 dated May 8, 2009 [4 pgs.].

Communication pursuant to Article 96(2) EPC from EPO (Examination Report), Jan. 17, 2007, in Application No. EP 96 910 762.2-1225 [1 pg. with 5 pg. annex].

Complaint for Patent Infringement, Permanent Injunction and Damages, Aug. 8, 2006, in C.D. Cal. case No. CV 06-5086 SJO (Ex) [11 pgs.].

Complaint for Patent Infringement, Permanent Injunction and Damages, filed Sep. 21, 2007 in C.D. Cal. Case No. Cv 07-06161 VBF (PLAx) [10 pgs.].

Declaration of Charles S. Baker in Support of Defendant Lime Wire's Motion to Stay Pending Reexamination of Patent and Request for Extension of Deadlines, Aug. 29, 2008, in C.D. Cal. Case No. CV 07-06161 VBF (PLAx) [2 pgs.].

Defendant Lime Wire, LLC's First Amended Answer, Affirmative Defenses and Counterclaims, Oct. 2, 2008, C.D. Cal. case No. 07-06161 VBF (PLAx) [13 pgs.].

Defendant Lime Wire, LLC's Second Amended Answer, Affirmative Defenses and Counterclaims, Oct. 27, 2008, From C.D. Cal. case No. 07-06161 VBF (PLAx) [13 pgs.].

Defendant Michael Weiss's Answer to Plaintiff's Complaint for Patent Infringement, Permanent Injunction and Damages; Demand for Jury Trial, Sep. 15, 2006, case No. CV 06-5086 SJO (Ex) [10 pgs.].

Defendant Recording Industry Association of America's Amended Notice of Motion and Motion for Partial Summary Judgment on Plaintiffs' Claims for Patent Infringement and Inducing Patent Infringement, Memorandum of Points and Authorities, May 22, 2006, redacted, original confidential, filed under seal, in C.D. Cal. case No. CV 04-7456 JFW (CTx) [19 pgs ].

Defendant Recording Industry Association of America's and Mediasentry, Inc.'s Notice of Motion and Motion for Partial Summary Judgment Based on Implied License or, In the Alternative, Based on Patent Misuse and Unclean Hands, May 22, 2006, Redacted, in C.D. Cal. case No. CV 04-7456 JFW (CTx) [21 pgs.].
Defendant Recording Industry Association of America's and Mediasentry, Inc's Notice of Motion and Motion for Partial Summary Judgment Based on Implied License or, In the Alternative, Based on Patent Misuse and Unclean Hands, May 8, 2006, in C.D. Cal. case No. CV 04-7456 JFW (CTx) [20 pgs.].
Defendant StreamCast Networks Inc.'s Answer to Plaintiff's Complaint for Patent Infringement, Permanent Injunction and Damages; Demand for Jury Trial, Sep. 5, 2006, C.D. Cal. case No. CV 06-5086 SJO (Ex) [10 pgs.].
Defendants' Amended Preliminary Claim Constructions [Patent Rule 4-2], filed Feb. 7, 2007 in C.D. Cal. case No. CV 06-5086 SJO (Ex) [10 pgs.].
Defendant's Second Amended Preliminary Claim Constructions [Patent Rule 4-2], filed Feb. 9, 2007 in C.D. Cal. case No. CV 06-5086 SJO (Ex) [10 pgs.].
Dewar, Rebuttal Expert Report of Robert B.K. Dewar, in C.D. Cal. case No. CV 04-7456 JFW (CTx), Apr. 10, 2006 [87 pgs].
Faloutsos, C. "Access methods for text," ACM Comput. Surv. 17, 1 (Mar. 1985), 49-74.
Faloutsos, C. et al., "Description and performance analysis of signature file methods for office filing," ACM Trans. Inf. Syst. 5, 3 (Jul. 1987), 237-257.
Faloutsos, C. et al., "Signature files: an access method for documents and its analytical performance evaluation," ACM Trans. Inf. Syst. 2, 4 (Oct. 1984), 267-288.
Federal Information Processing Standards (FIPS) Publication 180-1; Secure Hash Standard, Apr. 17, 1995 [17 pgs.].
Feigenbaum, J. et al., "Cryptographic protection of databases and software," in Distributed Computing and Cryptography: Proc. DIMACS Workshop, Apr. 1991, pp. 161-172, American Mathematical Society, Boston, Mass.
First Amended Answer of Defendant Mediasentry to Second Amended Complaint and Counterclaim, Apr. 24, 2006, in C.D. Cal. case No. CV 04-7456 JFW (CTx) [29 pgs.].
First Amended Answer of Defendant RIAA to Second Amended Complaint and Counterclaim, Apr. 24, 2006, in C.D. Cal. Case No. CV 04-7456 JFW (CTx) [27 pgs.].
First Amended Complaint for Patent Infringement, Permanent Injunction and Damages, filed Sep. 8, 2008 in C.D. Cal. Case No. CV 07-06161 VBF (PLAx) [10 pgs.].
Harrison, M. C., "Implementation of the substring test by hashing," Commun. ACM 14, 12 (Dec. 1971), 777-779.
IEEE, The Authoritative Dictionary of IEEE Standards Terms, 7th ed., Copyright 2000, pp. 107, 176, 209, 240, 241, 432, 468, 505, 506, 682, 1016, 1113, 1266, and 1267.
Ishikawa, Y., et al., "Evaluation of signature files as set access facilities in OODBs," In Proc. of the 1993 ACM SIGMOD Inter. Conf. on Management of Data (Washington, D.C., U.S., May 1993). P. Buneman & S. Jajodia, Eds. SIGMOD '93. ACM, NY, NY, 247-256.
Joint Claim Construction and Prehearing Statement, N. D. Cal. Rule 4-3, Feb. 12, 2007, in C.D. Cal. case No. CV 06-5086 SJO (Ex) [20 pgs.].
Karp, R. M. and Rabin, M. O., "Efficient randomized pattern-matching algorithms," IBM J. Res. Dev. 31, 2 (Mar. 1987), 249-260.
List of Asserted Claims and Infringement Chart for Each Asserted Claim, Jul. 28, 2008, in C.D. Cal. Case No. CV 07-06161 VBF (PLAx) [31 pgs.].
McGregor D. R. And Mariani, J. A. "Fingerprinting—A technique for file identification and maintenance," Software: Practice and Experience, vol. 12, No. 12, Dec. 1982, pp. 1165-1166.
Notice of Interested Parties, filed Sep. 21, 2007 in C.D. Cal. Case No. CV 07-06161 VBF (PLAx) [2 pgs.].
Notice of Motion and Motion of Defendant Lime Wire to Stay Litigation Pending Reexamination of Patent and Request for Extension of Deadlines, Sep. 22, 2008, C.D. Cal. Case No. CV 07-06161 VBF (PLAx) [11 pgs.].
Notice of Related Cases, filed Sep. 21, 2007 in C.D. Cal. Case No. CV 07-06161 VBF (PLAx) [2 pgs.].

Office Action from PTO in U.S. Appl. No. 11/980,679, May 6, 2009.
Panagopoulos, G., et al., "Bit-sliced signature files for very large text databases on a parallel machine architecture," In Proc. of the 4th Inter. Conf. on Extending Database Technology (EDBT), Cambridge, U.K., Mar. 1994, pp. 379-392 (Proc. LNCS 779 Springer 1994, ISBN 3-540-57818-8) [14 pgs.].
Patent Abstract, " Management System for Plural Versions," Pub. No. 63273961 A, published Nov. 11, 1988, NEC Corp.
Patent Abstracts of Japan, "Data Processor," Appin. No. 05135620, filed Jun. 7, 1993, Toshiba Corp.
Plaintiff Kinetech, Inc.'s Responses to Defendant Mediasentry's First set of Interrogatories, May 1, 2006, in C.D. Cal. Case No. CV 04-7456 JFW (CTx) [14 pgs.].
Plaintiff-Counterclaim Defendant Altnet, Inc.'s Supplemental Responses to Defendant-Counterclaim Plaintiff Overpeer Inc.'s First Set of Interrogatories, Mar. 8, 2006, redacted, in C.D. Cal. case No. CV 04-7456 JFW (CTx) [24 pgs.].
Plaintiff-Counterclaim Defendant Brilliant Digital Entertainment, Inc.'s Supplemental Responses to Defendant-Counterclaim Plaintiff Overpeer Inc.'s First Set of Interrogatories, Mar. 8, 2006, redacted, in C.D. Cal. case No. CV 04-7456 JFW (CTx) [24 pgs.].
Plaintiff-Counterclaim Defendant Kinetech, Inc.'s Supplemental Responses to Defendant-Counterclaim Plaintiff Overpeer Inc.'s First Set of Interrogatories Mar. 8, 2006, redacted, in C.D. Cal. case No. CV 04-7456 JFW (CTx) [24 pgs.].
Plaintiffs Altnet, Inc., Brilliant Digital, Inc , and Kinetech, Inc.'s Responses to Defendant Recording Industry Association of America's First Set of Requests for Admissions, Jan. 6, 2006, in C.D. Cal. case No. CV 04-7456 JFW (CTx) [26 pgs.].
Plaintiffs' Claim Construction Opening Brief and Exhibits A-D, F, G; May 7, 2007, in C.D. Cal. case No. CV 06-5086 SJO (Ex) [112 pgs.].
Plaintiffs' Preliminary Claim Constructions and Extrinsic Evidence, Feb. 6, 2006, in case CV 06-5086 SJO (Ex) [20 pgs.].
Plaintiff's Reply to Defendant Mediasentry's Counterclaims in its Answer to the Second Amended Complaint, May 1, 2006, in C.D. Cal. Case No. CV 04-7456 JFW (CTx) [11 pgs.].
Plaintiff's Reply to Defendant RIAA's Counterclaims in its Answer to the Second Amended Complaint, May 1, 2006, in C.D. Cal. case No. CV 04-7456 JFW (CTx) [11 pgs.].
Plaintiffs' Reply to Defendants' Claim Construction Brief, filed Apr. 23, 2007 in C.D Cal. case No. CV 06-5086 ODW (Ex) [15 pgs.].
Reply to Examination Report, Jul. 19, 2007, in Application No. EP 96 910 762.2-1225 [7 pgs.].
Response to Non-Final Office Action filed May 19, 2009 in U.S. Appl. No. 11/017,650 [19 pgs.].
Rivest, R., RFC 1320, "The MD4 Message-Digest Algorithm," Apr. 1992.
Sacks-Davis, R., et al., "Multikey access methods based on superimposed coding techniques," ACM Trans. Database Syst. 12, 4 (Nov. 1987), 655-696.
Siegel, A., et al., "Deceit: a Flexible Distributed File System," Proc. Workshop on the Management of Replicated Data, Houston, TX, pp. 15-17, Nov. 8-9, 1990.
Siegel, A., et al., "Deceit: a Flexible Distributed File System," Technical Report, TR89-1042, Cornell University, Nov. 1989.
Stipulation and Proposed order to (1) Amend the Complaint, (2) Amend pretrial Schedule, and (3) Withdraw Motion to Stay, filed Sep. 8, 2008 in C.D. Cal. Case No. CV 07-06161 VBF (PLAx) [6 pgs.].
Streamcast Networks Inc.'s Supplemental Responses to Certain of Plaintiffs' First Set of Interrogatories, Apr. 16, 2007, in C.D. Cal. case No. CV 06-5086 SJO (Ex) [61 pgs.].
StreamCast's Brief Re Claim Construction, Apr. 12, 2007, in C.D. Cal, case No. CV 06-5086 SJO (Ex) [11 pgs.].
Transcript of Deposition of David Farber, Feb. 16, 2006, in C.D. Cal. case No. CV 04-7456 JFW (CTx) [94 pgs.].
Transcript of Deposition of Robert B. K. Dewar, Mar. 23, 2007, in C.D. Cal. case No. CV 06-5086 SJO (Ex) [61 pgs.].
Transcript of Deposition of Ronald Lachman, Feb 1, 2006, C.D. Cal. case No. CV 04-7456 JFW (CTx) [96 pgs.].
USPTO, Final Office Action mailed Aug. 18, 2009 in U.S. Appl. No. 11/017,650.
USPTO, Final Office Action mailed Sep. 30, 2009 in U.S. Appl. No. 11/724,232.

USPTO, Non-Final Office action mailed Jun. 18, 2009 in U.S. Appl. No. 90/010,260.
Fowler, et al. "A User-Level Replicated File System," AT&T Bell Laboratories Technical Memorandum 0112670-930414-05, Apr. 1993, and USENIX 1993 Summer Conference Proceedings, Cincinnati, OH, Jun. 1993.
Greene, D., et al., "Multi-Index Hashing for Information Retrieval", Nov. 20-22, 1994, Proceedings, 35th Annual Symp on Foundations of Computer Science, IEEE, pp. 722-731.
Hirano, et al, "Extendible hashing for concurrent insertions and retrievals," in Proc 4th Euromicro Workshop on Parallel and Distributed Processing, 1996 (PDP '96), Jan. 24, 1996 to Jan. 26, 1996, pp. 235-242, Braga , Portugal.
Preneel et al., "The Cryptographic Hash Function RIPEMD-160", appeared in CryptoBytes RSA Laboratories, vol. 3, No. 2, pp. 9-14, Fall, 1997 (also Bosselaers et al., "The RIPEMD-160 Cryptographic Hash Function", Jan. 1997, Dr. Dobb's Journal, pp. 24-28).
Prusker et al., "The Siphon: Managing Distant Replicated Repositories" Nov. 8-9, 1990, Proc. Management of Replicated Data IEEE.
Reply to Examination Report, Munich, Nov. 18, 2009, in Application No. EP 96 910 762.2 [19 pgs.].
Rich, K. et al, "Hobgoblin: A File and Directory Auditor", Sep. 30-Oct. 3, 1991, Lisa V., San Diego, CA.
U.S. Reexam U.S. Appl. No. 90/010,260—Apr. 8, 2010 PTO Notice of Intent to Issue Ex Parte Reexamination Certificate.
USPTO Final Office Action in U.S. Appl. No. 10/742,972, Dec. 22, 2009.
USPTO, Advisory Action, Mar. 23, 2010, in U.S. Appl. No. 11/980,679.
USPTO, Final Office Action in U.S. Reexam U.S. Appl. No. 90/010,260, Jan. 29, 2010.
USPTO, Final Office Action mailed Jan. 12, 2010 in U.S. Appl. No. 11/980,679.
WIPO, International Preliminary Examination Report (IPER), Jul. 1997, PCT/US96/04733 [5 pgs.].
USPTO, Non-Final Office Action in U.S. Appl. No. 11/980,677, Jun. 4, 2010.
USPTO, Non-Final Office Action mailed Jul. 2, 2010 in U.S. Appl. No. 11/980,688.
USPTO, U.S. Reexam Control No. 90/010,260, Notice of Intent to Issue Ex Parte Reexamination Certificate, Apr. 8, 2010.
WIPO, International Preliminary Examination Report (IPER), Jul. 1997, PCT/US96/04733 [5 pgs.].
Karp, R. M. and Rabin, M. O., "Efficient randomized pattern-matching algorithms," IBM J. Res. Dev. 31, 2 (Mar. 1987), 249-260.
List of Asserted Claims and Infringement Chart for Each Asserted Claim, Jul. 28, 2008, in C.D. Cal. Case No. CV 07-06161 VBF (PLAx) [31 pgs.].
McGregor D. R. and Mariani, J. A. "Fingerprinting—A technique for file identification and maintenance," Software: Practice and Experience, vol. 12, No. 12, Dec. 1982, pp. 1165-1166.
Notice of Interested Parties, filed Sep. 21, 2007 in C.D. Cal. Case No. CV 07-06161 VBF (PLAx) [2 pgs.].
Notice of Motion and Motion of Defendant Lime Wire to Stay Litigation Pending Reexamination of Patent and Request for Extension of Deadlines, Sep. 22, 2008, C.D. Cal. Case No. CV 07-06161 VBF (PLAx) [11 pgs.].
Notice of Related Cases, filed Sep. 21, 2007 in C.D. Cal. Case No. CV 07-06161 VBF (PLAx) [2 pgs.].
Panagopoulos, G., et al., "Bit-sliced signature files for very large text databases on a parallel machine architecture," In Proc. of the 4th Inter. Conf. on Extending Database Technology (EDBT), Cambridge, U.K., Mar. 1994, pp. 379-392 (Proc. LNCS 779 Springer 1994, ISBN 3-540-57818-8) [14 pgs.].
Patent Abstract, "Management System for Plural Versions," Pub. No. 63273961 A, published Nov. 11, 1988, NEC Corp.
Patent Abstracts of Japan, "Data Processor," Appln. No. 05135620, filed Jun. 7, 1993, Toshiba Corp.
Plaintiff Kinetech, Inc.'s Responses to Defendant Mediasentry's First set of Interrogatories, May 1, 2006, in C.D. Cal. Case No. CV 04-7456 JFW (CTx) [14 pgs.].

Plaintiff-Counterclaim Defendant Altnet, Inc.'s Supplemental Responses to Defendant-Counterclaim Plaintiff Overpeer Inc.'s First Set of Interrogatories, Mar. 8, 2006, redacted, in C.D. Cal. case No. CV 04-7456 JFW(CTx) [24 pgs.].
Plaintiff-Counterclaim Defendant Brilliant Digital Entertainment, Inc.'s Supplemental Responses to Defendant-Counterclaim Plaintiff Overpeer Inc.'s First Set of Interrogatories, Mar. 8, 2006, redacted, in C.D. Cal. case No. CV 04-7456 JFW (CTx) [24 pgs.].
Plaintiff-Counterclaim Defendant Kinetech, Inc.'s Supplemental Responses to Defendant-Counterclaim Plaintiff Overpeer Inc.'s First Set of Interrogatories Mar. 8, 2006, redacted, in C.D. Cal. case No. CV 04-7456 JFW (CTx) [24 pgs.].
Plaintiffs Altnet, Inc., Brilliant Digital, Inc., and Kinetech, Inc.'s Responses to Defendant Recording Industry Association of America's First Set of Requests for Admissions, Jan. 6, 2006, in C.D. Cal. case No. CV 04-7456 JFW (CTx) [26 pgs.].
Plaintiffs' Claim Construction Opening Brief and Exhibits A-D, F, G; May 7, 2007, in C.D. Cal. case No. CV 06-5086 SJO (Ex) [112 pgs.].
Plaintiffs' Preliminary Claim Constructions and Extrinsic Evidence, Feb. 6, 2006, in case CV 06-5086 SJO (Ex) [20 pgs.].
Plaintiffs Reply to Defendant Mediasentry's Counterclaims in its Answer to the Second Amended Complaint, May 1, 2006, in C.D. Cal. Case No. CV 04-7456 JFW (CTx) [11 pgs.].
Plaintiffs Reply to Defendant RIAA's Counterclaims in its Answer to the Second Amended Complaint, May 1, 2006, in C.D. Cal. case No. CV 04-7456 JFW (CTx) [11 pgs.].
Plaintiffs' Reply to Defendants' Claim Construction Brief, filed Apr. 23, 2007 in C.D. Cal. case No. CV 06-5086 ODW (Ex) [15 pgs.].
Reply to Examination Report, Jul. 19, 2007, in Application No. EP 96 910 762.2-1225 [7 pgs.].
Response to Non-Final Office Action filed May 19, 2009 in U.S. Appl. No. 11/017,650 [19 pgs.].
Rivest, R., RFC 1320, "The MD4 Message-Digest Algorithm," the Internet Engineering Task Force (IETF), Apr. 1992.
Sacks-Davis, R., et al., "Multikey access methods based on superimposed coding techniques," ACM Trans. Database Syst. 12, 4 (Nov. 1987), 655-696.
Siegel, A., et al., "Deceit: a Flexible Distributed File System," Proc. Workshop on the Management of Replicated Data, Houston, TX, pp. 15-17, Nov. 8-9, 1990.
Siegel, A., et al., "Deceit: a Flexible Distributed File System," Technical Report, TR89-1042, Cornell University, Nov. 1989.
Stipulation and Proposed order to (1) Amend the Complaint, (2) Amend pretrial Schedule, and (3) Withdraw Motion to Stay, filed Sep. 8, 2008 in C.D. Cal. Case No. CV 07-06161 VBF(PLAx) [6 pgs.].
Streamcast Networks Inc.'s Supplemental Responses to Certain of Plaintiffs' First Set of Interrogatories, Apr. 16, 2007, in C.D. Cal. case No. CV 06-5086 SJO (Ex) [61 pgs.].
StreamCast's Brief Re Claim Construction, Apr. 12, 2007, in C.D. Cal. case No. CV 06-5086 SJO (Ex) [11 pgs.].
Transcript of Deposition of David Farber, Feb. 16, 2006, in C.D. Cal. case No. CV 04-7456 JFW (CTx) [94 pgs.].
Transcript of Deposition of Robert B. K. Dewar, Mar. 23, 2007, in C.D. Cal. case No. CV 06-5086 SJO (Ex) [61 pgs.].
Transcript of Deposition of Ronald Lachman, Feb. 1, 2006, C.D. Cal. case No. CV 04-7456 JFW (CTx) [96 pgs.].
USPTO, Non-Final Office Action mailed May 6, 2009 in U.S. Appl. No. 11/980,679.
USPTO, Non-Final Office action mailed Jun. 15, 2009 in U.S. Appl. No. 11/980,687.
USPTO, Non-Final Office action mailed Jun. 18, 2009 in Reexam No. 90/010,260.
Cheriton, David R. and Mann, Timothy P., "Decentralizing a global naming service for improved performance and fault tolerance", ACM Transactions on Computer Systems, vol. 7, No. 2, May 1989, pp. 147-183.
Request for Reexamination of U.S. Patent No. 6,928,442: Reexam Control No. 90/010,260, filed on Aug. 29, 2008.

* cited by examiner

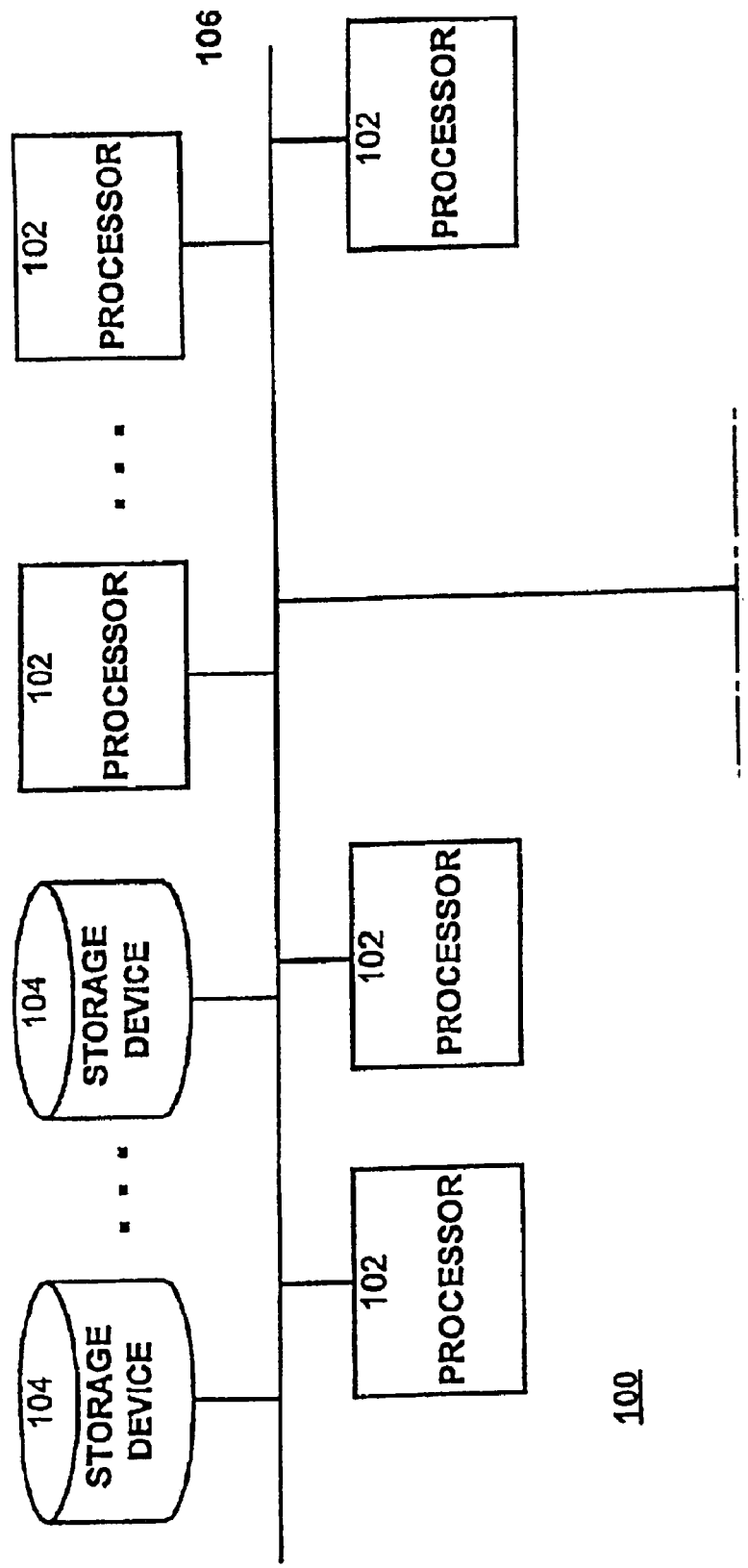

| Region ID |
|---|
| Pathname |
| True Name |
| Type |
| File ID |
| Time of last access |
| Time of last modification |
| Safe flag |
| Lock flag |
| Size |
| Owner |

| True Name |
|---|
| File ID |
| Compressed File ID |
| Source IDs |
| Dependent processors |
| Use count |
| Time of last access |
| Expiration |
| Grooming delete count |

142

| Region ID |
|---|
| Region file system |
| Region pathname |
| Region status |
| Mirror processor(s) |
| Mirror duplication count |
| Policy |

FIG. 5

FIG. 6 (144)
- Source ID
- source type
- source rights
- source availability
- source location

FIG. 7 (146)
- Original Name
- Operation
- Type
- Processor ID
- Timestamp
- Pathname
- True Name

FIG. 8 (148)
- date of entry
- type of entry
- True Name

FIG. 9 (150)
- True Name
- licensee

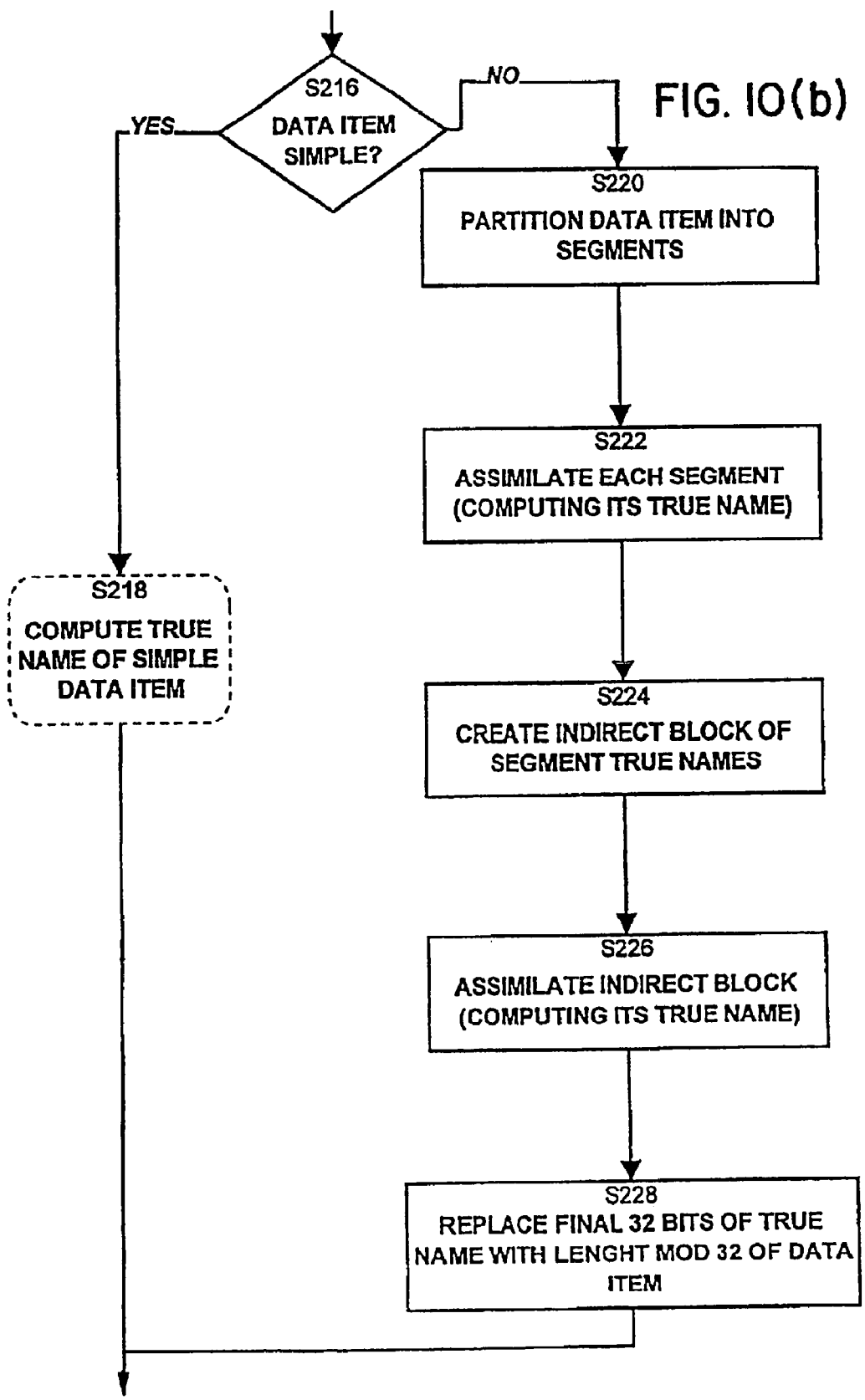

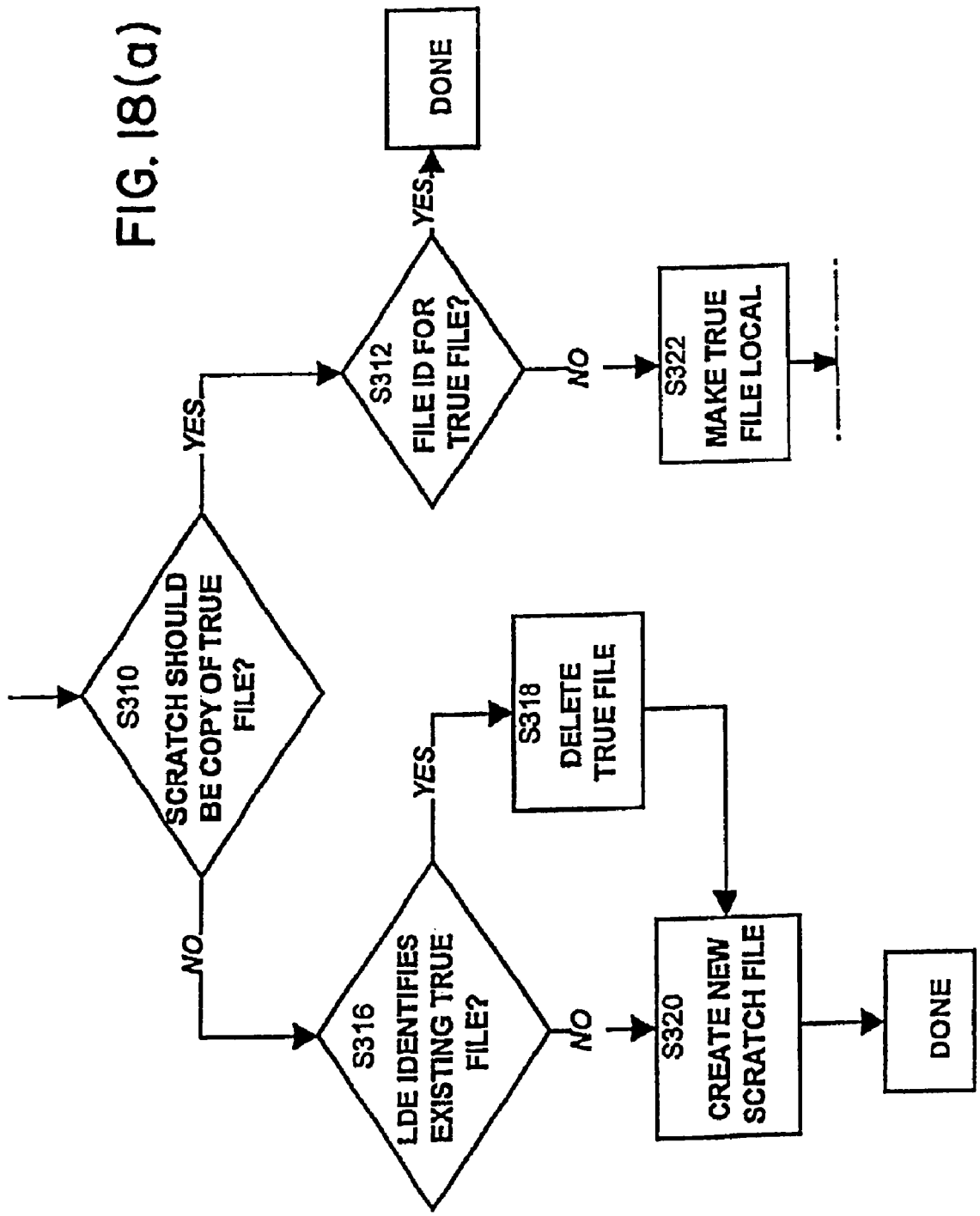

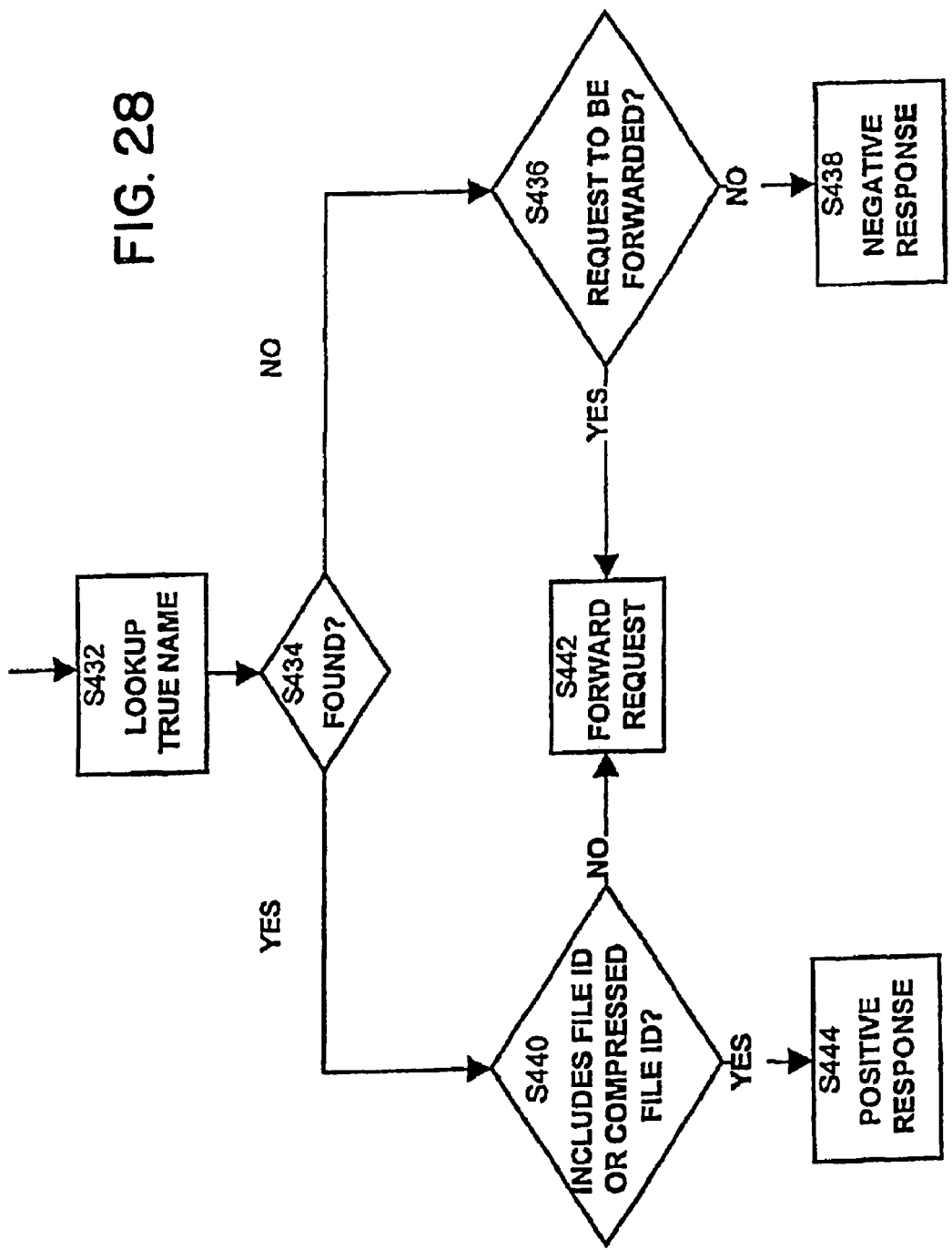

CONTROLLING ACCESS TO DATA IN A DATA PROCESSING SYSTEM

RELATED APPLICATIONS

This application is a continuation of an claims priority to pending U.S. patent application Ser. No. 11/724,232, which is a continuation of application Ser. No. 11/017,650, filed Dec. 22, 2004, which is a continuation of pending application Ser. No. 10/742,972, filed Dec. 23, 2003, which is a continuation of Ser. No. 09/987,723, filed Nov. 15, 2001, patented as U.S. Pat. No. 6,928,442; which is a which is a continuation of application Ser. No. 09/283,160, filed Apr. 1, 1999, now U.S. Pat. No. 6,415,280, which is a division of application Ser. No. 08/960,079, filed Oct. 24, 1997, now U.S. Pat. No. 5,978,791, which is a continuation of Ser. No. 08/425,160, filed Apr. 11, 1995, now abandoned, the contents of which each of these applications are hereby incorporated herein by reference. This application is a continuation of and claims priority to application Ser. No. 11/017,650, filed Dec. 22, 2004, which is a continuation of application Ser. No. 09/987,723, filed Nov. 15, 2001, now U.S. Pat. No. 6,928,442, which is a continuation of application Ser. No. 09/283,160, filed Apr. 1, 1999, now U.S. Pat. No. 6,415,280, which is a division of application Ser. No. 08/960,079, filed Oct. 24, 1997, now U.S. Pat. No. 5,978,791, which is a continuation of Ser. No. 08/425,160, filed Apr. 11, 1995, now abandoned, the contents of which each of these applications are hereby incorporated herein by reference. This is also a continuation of and claims priority to application Ser. No. 10/742,972, filed Dec. 23, 2003, which is a division of application Ser. No. 09/987,723, filed Nov. 15, 2001, now U.S. Pat. No. 6,928,442, which is a continuation of application Ser. No. 09/283,160, filed Apr. 1, 1999, now U.S. Pat. No. 6,415,280, which is a division of application Ser. No. 08/960,079, filed Oct. 24, 1997, now U.S. Pat. No. 5,978,791, which is a continuation of Ser. No. 08/425,160, filed Apr. 11, 1995, now abandoned, the contents of which each of these applications are hereby incorporated herein by reference.

BACKGROUND OF THE INVENTION

1. Field of the Invention

This invention relates to data processing systems and, more particularly, to data processing systems wherein data items are identified by substantially unique identifiers which depend on all of the data in the data items and only on the data in the data items.

2. Background of the Invention

Data processing (DP) systems, computers, networks of computers, or the like, typically offer users and programs various ways to identify the data in the systems.

Users typically identify data in the data processing system by giving the data some form of name. For example, a typical operating system (OS) on a computer provides a file system in which data items are named by alphanumeric identifiers. Programs typically identify data in the data processing system using a location or address. For example, a program may identify a record in a file or database by using a record number which serves to locate that record.

In all but the most primitive operating systems, users and programs are able to create and use collections of named data items, these collections themselves being named by identifiers. These named collections can then, themselves, be made part of other named collections. For example, an OS may provide mechanisms to group files (data items) into directories (collections). These directories can then, themselves, be made part of other directories. A data item may thus be identified relative to these nested directories using a sequence of names, or a so-called pathname, which defines a path through the directories to a particular data item (file or directory).

As another example, a database management system may group data records (data items) into tables and then group these tables into database files (collections). The complete address of any data record can then be specified using the database file name, the table name, and the record number of that data record.

Other examples of identifying data items include: identifying files in a network file system, identifying objects in an object-oriented database, identifying images in an image database, and identifying articles in a text database.

In general, the terms "data" and "data item" as used herein refer to sequences of bits. Thus a data item may be the contents of a file, a portion of a file, a page in memory, an object in an object-oriented program, a digital message, a digital scanned image, a part of a video or audio signal, or any other entity which can be represented by a sequence of bits. The term "data processing" herein refers to the processing of data items, and is sometimes dependent on the type of data item being processed. For example, a data processor for a digital image may differ from a data processor for an audio signal.

In all of the prior data processing systems the names or identifiers provided to identify data items (the data items being files, directories, records in the database, objects in object-oriented programming, locations in memory or on a physical device, or the like) are always defined relative to a specific context. For instance, the file identified by a particular file name can only be determined when the directory containing the file (the context) is known. The file identified by a pathname can be determined only when the file system (context) is known. Similarly, the addresses in a process address space, the keys in a database table, or domain names on a global computer network such as the Internet are meaningful only because they are specified relative to a context.

In prior art systems for identifying data items there is no direct relationship between the data names and the data item. The same data name in two different contexts may refer to different data items, and two different data names in the same context may refer to the same data item.

In addition, because there is no correlation between a data name and the data it refers to, there is no a priori way to confirm that a given data item is in fact the one named by a data name. For instance, in a DP system, if one processor requests that another processor deliver a data item with a given data name, the requesting processor cannot, in general, verify that the data delivered is the correct data (given only the name). Therefore it may require further processing, typically on the part of the requester, to verify that the data item it has obtained is, in fact, the item it requested.

A common operation in a DP system is adding a new data item to the system. When a new data item is added to the system, a name can be assigned to it only by updating the context in which names are defined. Thus such systems require a centralized mechanism for the management of names. Such a mechanism is required even in a multi-processing system when data items are created and identified at separate processors in distinct locations, and in which there is no other need for communication when data items are added.

In many data processing systems or environments, data items are transferred between different locations in the system. These locations may be processors in the data processing system, storage devices, memory, or the like. For example, one processor may obtain a data item from another processor or from an external storage device, such as a floppy disk, and may incorporate that data item into its system (using the name provided with that data item).

However, when a processor (or some location) obtains a data item from another location in the DP system, it is possible that this obtained data item is already present in the system (either at the location of the processor or at some other location accessible by the processor) and therefore a duplicate of the data item is created. This situation is common in a network data processing environment where proprietary software products are installed from floppy disks onto several processors sharing a common file server. In these systems, it is often the case that the same product will be installed on several systems, so that several copies of each file will reside on the common file server.

In some data processing systems in which several processors are connected in a network, one system is designated as a cache server to maintain master copies of data items, and other systems are designated as cache clients to copy local copies of the master data items into a local cache on an as-needed basis. Before using a cached item, a cache client must either reload the cached item, be informed of changes to the cached item, or confirm that the master item corresponding to the cached item has not changed. In other words, a cache client must synchronize its data items with those on the cache server. This synchronization may involve reloading data items onto the cache client. The need to keep the cache synchronized or reload it adds significant overhead to existing caching mechanisms.

In view of the above and other problems with prior art systems, it is therefore desirable to have a mechanism which allows each processor in a multiprocessor system to determine a common and substantially unique identifier for a data item, using only the data in the data item and not relying on any sort of context.

It is further desirable to have a mechanism for reducing multiple copies of data items in a data processing system and to have a mechanism which enables the identification of identical data items so as to reduce multiple copies. It is further desirable to determine whether two instances of a data item are in fact the same data item, and to perform various other systems' functions and applications on data items without relying on any context information or properties of the data item.

It is also desirable to provide such a mechanism in such a way as to make it transparent to users of the data processing system, and it is desirable that a single mechanism be used to address each of the problems described above.

SUMMARY OF THE INVENTION

This invention provides, in a data processing system, a method and apparatus for identifying a data item in the system, where the identity of the data item depends on all of the data in the data item and only on the data in the data item. Thus the identity of a data item is independent of its name, origin, location, address, or other information not derivable directly from the data, and depends only on the data itself.

This invention further provides an apparatus and a method for determining whether a particular data item is present in the system or at a location in the system, by examining only the data identities of a plurality of data items.

Using the method or apparatus of the present invention, the efficiency and integrity of a data processing system can be improved. The present invention improves the design and operation of a data storage system, file system, relational database, object-oriented database, or the like that stores a plurality of data items, by making possible or improving the design and operation of at least some or all of the following features:

the system stores at most one copy of any data item at a given location, even when multiple data names in the system refer to the same contents;

the system avoids copying data from source to destination locations when the destination locations already have the data;

the system provides transparent access to any data item by reference only to its identity and independent of its present location, whether it be local, remote, or offline;

the system caches data items from a server, so that only the most recently accessed data items need be retained;

when the system is being used to cache data items, problems of maintaining cache consistency are avoided;

the system maintains a desired level of redundancy of data items in a network of servers, to protect against failure by ensuring that multiple copies of the data items are present at different locations in the system;

the system automatically archives data items as they are created or modified;

the system provides the size, age, and location of groups of data items in order to decide whether they can be safely removed from a local file system;

the system can efficiently record and preserve any collection of data items;

the system can efficiently make a copy of any collection of data items, to support a version control mechanism for groups of the data items;

the system can publish data items, allowing other, possibly anonymous, systems in a network to gain access to the data items and to rely on the availability of the data items;

the system can maintain a local inventory of all the data items located on a given removable medium, such as a diskette or CD-ROM, the inventory is independent of other properties of the data items such as their name, location, and date of creation;

the system allows closely related sets of data items, such as matching or corresponding directories on disconnected computers, to be periodically resynchronized with one another;

the system can verify that data retrieved from another location is the desired or requested data, using only the data identifier used to retrieve the data;

the system can prove possession of specific data items by content without disclosing the content of the data items, for purposes of later legal verification and to provide anonymity;

the system tracks possession of specific data items according to content by owner, independent of the name, date, or other properties of the data item, and tracks the uses of specific data items and files by content for accounting purposes.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

BRIEF DESCRIPTION OF THE DRAWINGS

FIGS. 1(a) and 1(b) depict a typical data processing system in which a preferred embodiment of the present invention operates;

FIGS. 3-9 depict data structures used to implement an embodiment of the present invention; and FIGS. 10(a)-28 are flow charts depicting operation of various aspects of the present invention.

DETAILED DESCRIPTION OF THE PRESENTLY PREFERRED EXEMPLARY EMBODIMENTS

Figure 1B:
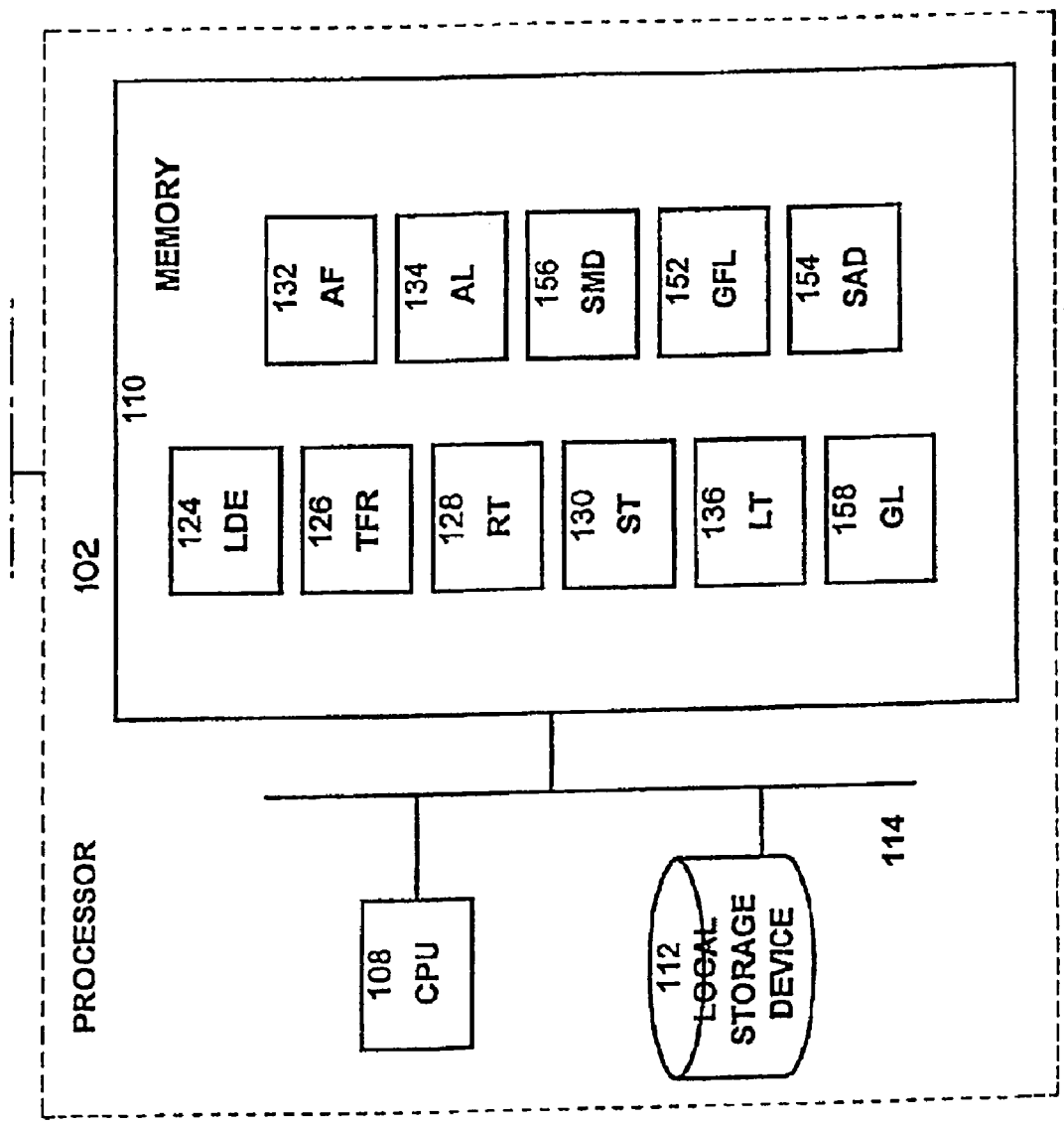

An embodiment of the present invention is now described with reference to a typical data processing system 100, which, with reference to FIGS. 1(a) and 1(b), includes one or more processors (or computers) 102 and various storage devices 104 connected in some way, for example by a bus 106.

Each processor 102 includes a CPU 108, a memory 110 and one or more local storage devices 112. The CPU 108, memory 110, and local storage device 112 may be internally connected, for example by a bus 114. Each processor 102 may also include other devices (not shown), such as a keyboard, a display, a printer, and the like.

In a data processing system 100, wherein more than one processor 102 is used, that is, in a multiprocessor system, the processors may be in one of various relationships. For example, two processors 102 may be in a client/server, client/client, or a server/server relationship. These inter-processor relationships may be dynamic, changing depending on particular situations and functions. Thus, a particular processor 102 may change its relationship to other processors as needed, essentially setting up a peer-to-peer relationship with other processors. In a peer-to-peer relationship, sometimes a particular processor 102 acts as a client processor, whereas at other times the same processor acts as a server processor. In other words, there is no hierarchy imposed on or required of processors 102.

In a multiprocessor system, the processors 102 may be homogeneous or heterogeneous. Further, in a multiprocessor data processing system 100, some or all of the processors 102 may be disconnected from the network of processors for periods of time. Such disconnection may be part of the normal operation of the system 100 or it may be because a particular processor 102 is in need of repair.

Figure 2:
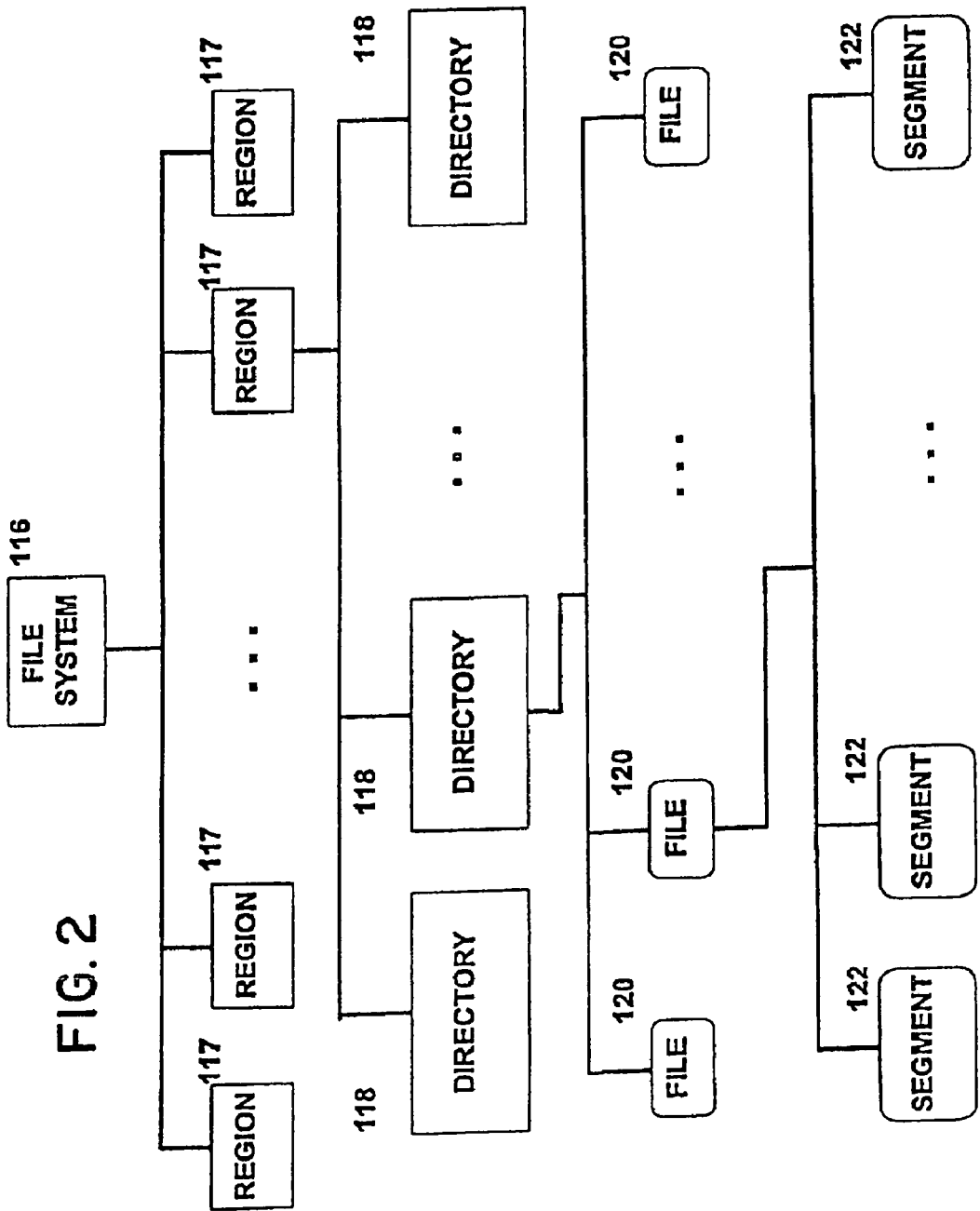
FIG. 2 depicts a hierarchy of data items stored at any location in such a data processing system.

Within a data processing system 100, the data may be organized to form a hierarchy of data storage elements, wherein lower level data storage elements are combined to form higher level elements. This hierarchy can consist of, for example, processors, file systems, regions, directories, data files, segments, and the like. For example, with reference to FIG. 2, the data items on a particular processor 102 may be organized or structured as a file system 116 which comprises regions 117, each of which comprises directories 118, each of which can contain other directories 118 or files 120. Each file 120 being made up of one or more data segments 122.

In a typical data processing system, some or all of these elements can be named by users given certain implementation specific naming conventions, the name (or pathname) of an element being relative to a context. In the context of a data processing system 100, a pathname is fully specified by a processor name, a filesystem name, a sequence of zero or more directory names identifying nested directories, and a final file name. (Usually the lowest level elements, in this case segments 122, cannot be named by users.)

In other words, a file system 116 is a collection of directories 118. A directory 118 is a collection of named files 120—both data files 120 and other directory files 118. A file 120 is a named data item which is either a data file (which may be simple or compound) or a directory file 118. A simple file 120 consists of a single data segment 122. A compound file 120 consists of a sequence of data segments 122. A data segment 122 is a fixed sequence of bytes. An important property of any data segment is its size, the number of bytes in the sequence.

A single processor 102 may access one or more file systems 116, and a single storage device 104 may contain one or more file systems 116, or portions of a file system 116. For instance, a file system 116 may span several storage devices 104.

In order to implement controls in a file system, file system 116 may be divided into distinct regions, where each region is a unit of management and control. A region consists of a given directory 118 and is identified by the pathname (user defined) of the directory.

In the following, the term "location", with respect to a data processing system 100, refers to any of a particular processor 102 in the system, a memory of a particular processor, a storage device, a removable storage medium (such as a floppy disk or compact disk), or any other physical location in the system. The term "local" with respect to a particular processor 102 refers to the memory and storage devices of that particular processor.

In the following, the terms "True Name", "data identity" and "data identifier" refer to the substantially unique data identifier for a particular data item. The term "True File" refers to the actual file, segment, or data item identified by a True Name.

A file system for a data processing system 100 is now described which is intended to work with an existing operating system by augmenting some of the operating system's file management system codes. The embodiment provided relies on the standard file management primitives for actually storing to and retrieving data items from disk, but uses the mechanisms of the present invention to reference and access those data items.

The processes and mechanisms (services) provided in this embodiment are grouped into the following categories: primitive mechanisms, operating system mechanisms, remote mechanisms, background mechanisms, and extended mechanisms.

Primitive mechanisms provide fundamental capabilities used to support other mechanisms. The following primitive mechanisms are described:

1. Calculate True Name;
2. Assimilate Data Item;
3. New True File;
4. Get True Name from Path;
5. Link path to True Name;
6. Realize True File from Location;
7. Locate Remote File;
8. Make True File Local;
9. Create Scratch File;
10. Freeze Directory;
11. Expand Frozen Directory;
12. Delete True File;
13. Process Audit File Entry;
14. Begin Grooming;
15. Select For Removal; and
16. End Grooming.

Operating system mechanisms provide typical familiar file system mechanisms, while maintaining the data structures required to offer the mechanisms of the, present invention. Operating system mechanisms are designed to augment existing operating systems, and in this way to make the present invention compatible with, and generally transparent to, existing applications. The following operating system mechanisms are described:

1. Open File;
2. Close File;
3. Read File;

4. Write File;
5. Delete File or Directory;
6. Copy File or Directory;
7. Move File or Directory;
8. Get File Status; and
9. Get Files in Directory.

Remote mechanisms are used by the operating system in responding to requests from other processors. These mechanisms enable the capabilities of the present invention in a peer-to-peer network mode of operation. The following remote mechanisms are described:

1. Locate True File;
2. Reserve True File;
3. Request True File;
4. Retire True File;
5. Cancel Reservation;
6. Acquire True File;
7. Lock Cache;
8. Update Cache; and
9. Check Expiration Date.

Background mechanisms are intended to run occasionally and at a low priority. These provide automated management capabilities with respect to the present invention. The following background mechanisms are described:

1. Mirror True File;
2. Groom Region;
3. Check for Expired Links; and
4. Verify Region; and
5. Groom Source List.

Extended mechanisms run within application programs over the operating system. These mechanisms provide solutions to specific problems and applications. The following extended mechanisms are described:

1. Inventory Existing Directory;
2. Inventory Removable, Read-only Files;
3. Synchronize directories;
4. Publish Region;
5. Retire Directory;
6. Realize Directory at location;
7. Verify True File;
8. Track for accounting purposes; and
9. Track for licensing purposes.

The file system herein described maintains sufficient information to provide a variety of mechanisms not ordinarily offered by an operating system, some of which are listed and described here. Various processing performed by this embodiment of the present invention will now be described in greater detail.

In some embodiments, some files 120 in a data processing system 100 do not have True Names because they have been recently received or created or modified, and thus their True Names have not yet been computed. A file that does not yet have a True Name is called a scratch file. The process of assigning a True Name to a file is referred to as assimilation, and is described later. Note that a scratch file may have a user provided name.

Some of the processing performed by the present invention can take place in a background mode or on a delayed or as-needed basis. This background processing is used to determine information that is not immediately required by the system or which may never be required. As an example, in some cases a scratch file is being changed at a rate greater than the rate at which it is useful to determine its True Name. In these cases, determining the True Name of the file can be postponed or performed in the background.

Data Structures

The following data structures, stored in memory 110 of one of more processors 102 are used to implement the mechanisms described herein. The data structures can be local to each processor 102 of the system 100, or they can reside on only some of the processors 102.

The data structures described are assumed to reside on individual peer processors 102 in the data processing system 100. However, they can also be shared by placing them on a remote, shared file server (for instance, in a local area network of machines). In order to accommodate sharing data structures, it is necessary that the processors accessing the shared database use the appropriate locking techniques to ensure that changes to the shared database do not interfere with one another but are appropriately serialized. These locking techniques are well understood by ordinarily skilled programmers of distributed applications.

It is sometimes desirable to allow some regions to be local to a particular processor 102 and other regions to be shared among processors 102. (Recall that a region is a unit of file system management and control consisting of a given directory identified by the pathname of the directory.) In the case of local and shared regions, there would be both local and shared versions of each data structure. Simple changes to the processes described below must be made to ensure that appropriate data structures are selected for a given operation.

The local directory extensions (LDE) table 124 is a data structure which provides information about files 120 and directories 118 in the data processing system 100. The local directory extensions table 124 is indexed by a pathname or contextual name (that is, a user provided name) of a file and includes the True Name for most files. The information in local directory extension table 124 is in addition to that provided by the native file system of the operating system.

The True File registry (TFR) 126 is a data store for listing actual data items which have True Names, both files 120 and segments 122. When such data items occur in the True File registry 126 they are known as True Files. True Files are identified in True File registry 126 by their True Names or identities. The table True File registry 126 also stores location, dependency, and migration information about True Files.

The region table (RT) 128 defines areas in the network storage which are to be managed separately. Region table 128 defines the rules for access to and migration of files 120 among various regions with the local file system 116 and remote peer file systems.

The source table (ST) 130 is a list of the sources of True Files other than the current True File registry 126. The source table 130 includes removable volumes and remote processors.

The audit file (AF) 132 is a list of records indicating changes to be made in local or remote files, these changes to be processed in background.

The accounting log (AL) 134 is a log of file transactions used to create accounting information in a manner which preserves the identity of files being tracked independent of their name or location.

The license table (LT) 136 is a table identifying files, which may only be used by licensed users, in a manner independent of their name or location, and the users licensed to use them.

Detailed Descriptions of the Data Structures

The following table summarizes the fields of an local directory extensions table entry, as illustrated by record 138 in FIG. 3.

Each record of the True File registry 126 has the fields shown in the True File registry record 140 in FIG. 4. The True File registry 126 consists of the database described in the table below as well as the actual True Files identified by the True File IDs below.

| Field | Description |
| --- | --- |
| Region ID | identifies the region in which this file is contained. |
| Pathname | the user provided name or contextual name of the file or directory, relative to the region in which it occurs. |
| True Name | the computed True Name or identity of the file or directory. This True Name is not always up to date, and it is set to a special value when a file is modified and is later recomputed in the background. |
| Type | indicates whether the file is a data file or a directory. |
| Scratch File ID | the physical location of the file in the file system, when no True Name has been calculated for the file. As noted above, such a file is called a scratch file. |
| Time of last access | the last access time to this file. If this file is a directory, this is the last access time to any file in the directory. |
| Time of last modification | the time of last change of this file. If this file is a directory, this is the last modification time of any file in the directory. |
| Safe flag | indicates that this file (and, if this file is a directory, all of its subordinate files) have been backed up on some other system, and it is therefore safe to remove them. |
| Lock flag | indicates whether a file is locked, that is, it is being modified by the local processor or a remote processor. Only one processor may modify a file at a time. |
| Size | the full size of this directory (including all subordinate files), if all files in it were fully expanded and duplicated. For a file that is not a directory this is the size of the actual True File. |
| Owner | the identity of the user who owns this file, for accounting and license tracking purposes. |

Each record of the True File registry 126 has the fields shown in the True File registry record 140 in FIG. 4. The True File registry 126 consists of the database described in the table below as well as the actual True Files identified by the True File IDs below.

| Field | Description |
| --- | --- |
| True Name | computed True Name or identity of the file. |
| Compressed File ID | compressed version of the True File may be stored instead of, or in addition to, an uncompressed version. This field provides the identity of the actual representation of the compressed version of the file. |
| Grooming delete count | tentative count of how many references have been selected for deletion during a grooming operation. |
| Time of last access | most recent date and time the content of this file was accessed. |
| Expiration | date and time after which this file may be deleted by this server. |
| Dependent processors | processor IDs of other processors which contain references to this True File. |
| Source IDs | source ID(s) of zero or more sources from which this file or data item may be retrieved. |
| True File ID | identity or disk location of the actual physical representation of the file or file segment. It is sufficient to use a filename in the registration directory of the underlying operating system. The True File ID is absent if the actual file is not currently present at the current location. |
| Use count | number of other records on this processor which identify this True File. |

A region table 128, specified by a directory pathname, records storage policies which allow files in the file system to be stored, accessed and migrated in different ways. Storage policies are programmed in a configurable way using a set of rules described below.

Each region table record 142 of region table 128 includes the fields described in the following table (with reference to FIG. 5):

| Field | Description |
| --- | --- |
| Region ID | internally used identifier for this region. |
| Region file system | file system on the local processor of which this region is a part. |
| Region pathname | a pathname relative to the region file system which defines the location of this region. The region consists of all files and directories subordinate to this pathname, except those in a region subordinate to this region. |
| Mirror processor(s) | zero or more identifiers of processors which are to keep mirror or archival copies of all files in the current region. Multiple mirror processors can be defined to form a mirror group. |
| Mirror duplication count | number of copies of each file in this region that should be retained in a mirror group. |
| Region status | specifies whether this region is local to a single processor 102, shared by several processors 102 (if, for instance, it resides on a shared file server), or managed by a remote processor. |
| Policy | the migration policy to apply to this region. A single region might participate in several policies. The policies are as follows (parameters in brackets are specified as part of the policy): region is a cached version from [processor ID]; region is a member of a mirror set defined by [processor ID]. region is to be archived on [processor ID]. region is to be backed up locally, by placing new copies in [region ID]. region is read only and may not be changed. region is published and expires on [date]. Files in this region should be compressed. |

A source table 130 identifies a source location for True Files. The source table 130 is also used to identify client processors making reservations on the current processor. Each source record 144 of the source table 130 includes the fields summarized in the following table, with reference to FIG. 6:

| Field | Description |
| --- | --- |
| source ID | internal identifier used to identify a particular source. |
| source type | type of source location: Removable Storage Volume Local Region Cache Server Mirror Group Server Cooperative Server Publishing Server Client |
| source rights | includes information about the rights of this processor, such as whether it can ask the local processor to store data items for it. |
| source availability | measurement of the bandwidth, cost, and reliability of the connection to this source of True Files. The availability is used to select from among several possible sources. |
| source location | information on how the local processor is to access the source. This may be, for example, the name of a removable storage volume, or the processor ID and region path of a region on a remote processor. |

The audit file 132 is a table of events ordered by timestamp, each record 146 in audit file 132 including the fields summarized in the following table (with reference to FIG. 7):

| Field | Description |
| --- | --- |
| Original Name | path of the file in question. |
| Operation | whether the file was created, read, written, copied or deleted. |
| Type | specifies whether the source is a file or a directory. |
| Processor ID | ID of the remote processor generating this event (if not local). |
| Timestamp | time and date file was closed (required only for accessed/modified files). |
| Pathname | Name of the file (required only for rename). |
| True Name | computed True Name of the file. This is used by remote systems to mirror changes to the directory and is filled in during background processing. |

Each record 148 of the accounting log 134 records an event which may later be used to provide information for billing mechanisms. Each accounting log entry record 148 includes at least the information summarized in the following table, with reference to FIG. 8:

| Field | Description |
| --- | --- |
| date of entry | date and time of this log entry. |
| type of entry | Entry types include create file, delete file, and transmit file. |
| True Name | True Name of data item in question. |
| owner | identity of the user responsible for this action. |

Each record 150 of the license table 136 records a relationship between a licensable data item and the user licensed to have access to it. Each license table record 150 includes the information summarized in the following table, with reference to FIG. 9:

| Field | Description |
| --- | --- |
| True Name | True Name of a data item subject to license validation. |
| licensee | identity of a user authorized to have access to this object. |

Various other data structures are employed on some or all of the processors 102 in the data processing system 100. Each processor 102 has a global freeze lock (GFL) 152 (FIG. 1), which is used to prevent synchronization errors when a directory is frozen or copied. Any processor 102 may include a special archive directory (SAD) 154 into which directories may be copied for the purposes of archival. Any processor 102 may include a special media directory (SMD) 156, into which the directories of removable volumes are stored to form a media inventory. Each processor has a grooming lock 158, which is set during a grooming operation. During this period the grooming delete count of True File registry entries 140 is active, and no True Files should be deleted until grooming is complete. While grooming is in effect, grooming information includes a table of pathnames selected for deletion, and keeps track of the amount of space that would be freed if all of the files were deleted.

Primitive Mechanisms

The first of the mechanisms provided by the present invention, primitive mechanisms, are now described. The mechanisms described here depend on underlying data management mechanisms to create, copy, read, and delete data items in the True File registry 126, as identified by a True File ID. This support may be provided by an underlying operating system or disk storage manager.

The following primitive mechanisms are described:
1. Calculate True Name;
2. Assimilate Data Item;
3. New True File;
4. Get True Name from Path;
5. Link Path to True Name;
6. Realize True File from Location;
7. Locate Remote File;
8. Make True File Local;
9. Create Scratch File;
10. Freeze Directory;
11. Expand Frozen Directory;
12. Delete True File;
13. Process Audit File Entry;
14. Begin Grooming;
15. Select For Removal; and
16. End Grooming.

1. Calculate True Name

A True Name is computed using a function, MD, which reduces a data block B of arbitrary length to a relatively small, fixed size identifier, the True Name of the data block, such that the True Name of the data block is virtually guaranteed to represent the data block B and only data block B.

The function MD must have the following properties:
1. The domain of the function MD is the set of all data items. The range of the function MD is the set of True Names.
2. The function MD must take a data item of arbitrary length and reduce it to an integer value in the range 0 to N−1, where N is the cardinality of the set of True Names. That is, for an arbitrary length data block B, $0 \leq MD(B) < N$.
3. The results of MD(B) must be evenly and randomly distributed over the range of N, in such a way that simple or regular changes to B are virtually guaranteed to produce a different value of MD(B).
4. It must be computationally difficult to find a different value B' such that MD(B)=MD(B').
5. The function MD(B) must be efficiently computed.

A family of functions with the above properties are the so-called message digest functions, which are used in digital security systems as techniques for authentification of data. These functions (or algorithms) include MD4, MD5, and SHA.

In the presently preferred embodiments, either MD5 or SHA is employed as the basis for the computation of True Names. Whichever of these two message digest functions is employed, that same function must be employed on a system-wide basis.

It is impossible to define a function having a unique output for each possible input when the number of elements in the range of the function is smaller than the number of elements in its domain. However, a crucial observation is that the actual data items that will be encountered in the operation of any system embodying this invention form a very sparse subset of all the possible inputs.

A colliding set of data items is defined as a set wherein, for one or more pairs x and y in the set, MD(x)=MD(y). Since a function conforming to the requirements for MD must evenly and randomly distribute its outputs, it is possible, by making the range of the function large enough, to make the probability arbitrarily small that actual inputs encountered in the operation of an embodiment of this invention will form a colliding set.

To roughly quantify the probability of a collision, assume that there are no more than $2^{30}$ storage devices in the world, and that each storage device has an average of at most $2^{20}$ different data items. Then there are at most $2^{50}$ data items in the world. If the outputs of MD range between 0 and $2^{128}$, it can be demonstrated that the probability of a collision is approximately 1 in $2^{29}$. Details on the derivation of these probability values are found, for example, in P. Flajolet and A. M. Odlyzko, "Random Mapping Statistics," *Lecture Notes in Computer Science* 434: *Advances in Cryptology—Eurocrypt '89 Proceedings*, Springer-Verlag, pp. 329-354.

Note that for some less preferred embodiments of the present invention, lower probabilities of uniqueness may be acceptable, depending on the types of applications and mechanisms used. In some embodiments it may also be useful to have more than one level of True Names, with some of the True Names having different degrees of uniqueness. If such a scheme is implemented, it is necessary to ensure that less unique True. Names are not propagated in the system.

While the invention is described herein using only the True Name of a data item as the identifier for the data item, other preferred embodiments use tagged, typed, categorized or classified data items and use a combination of both the True Name and the tag, type, category or class of the data item as an identifier. Examples of such categorizations are files, directories, and segments; executable files and data files, and the like. Examples of classes are classes of objects in an object-oriented system. In such a system, a lower degree of True Name uniqueness is acceptable over the entire universe of data items, as long as sufficient uniqueness. is provided per category of data items. This is because the tags provide an additional level of uniqueness.

Figure 10A:
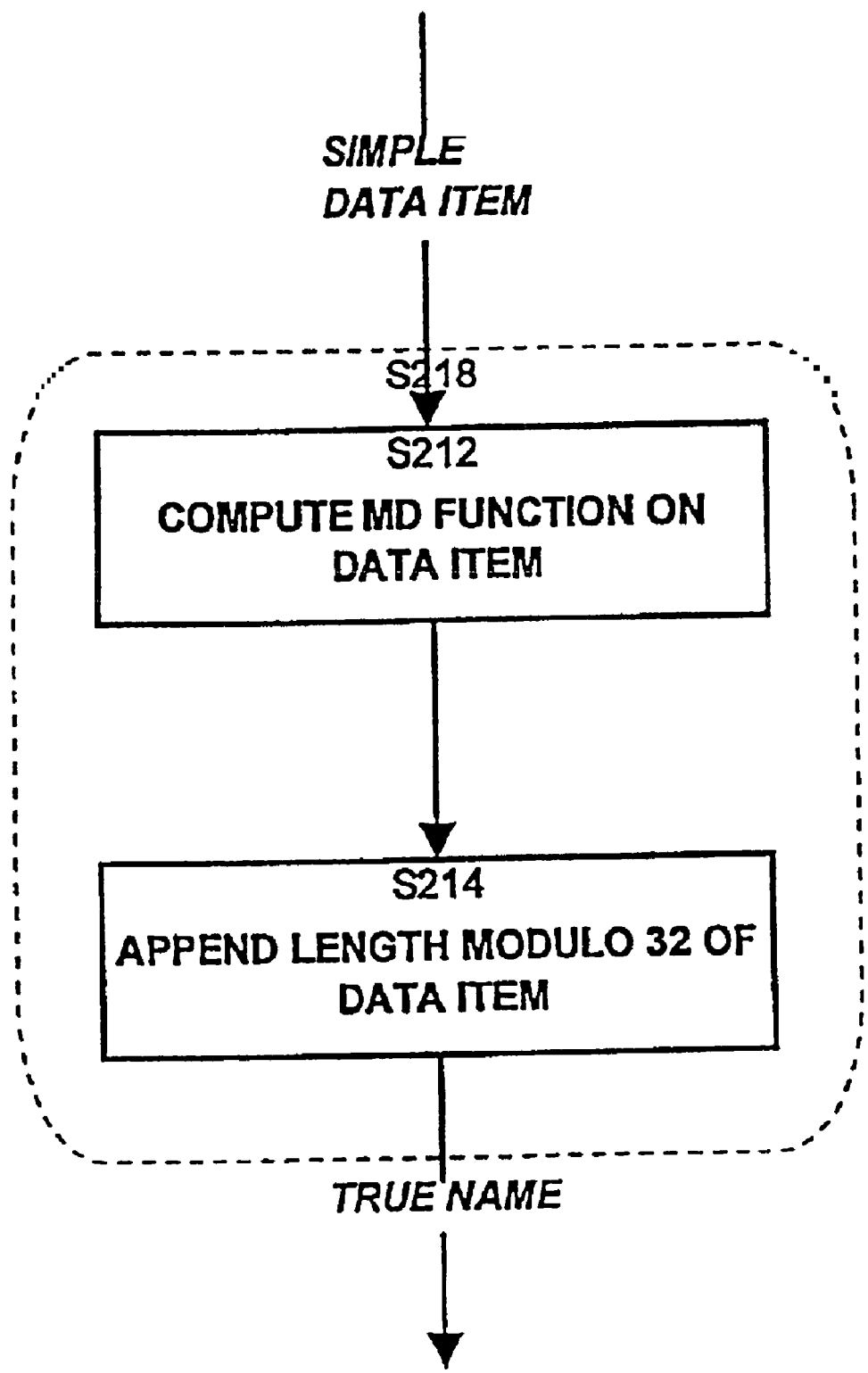

A mechanism for calculating a True Name given a data item is now described, with reference to FIGS. 10(*a*) and 10(*b*).

A simple data item is a data item whose size is less than a particular given size (which must be defined in each particular implementation of the invention). To determine the True Name of a simple data item, with reference to FIG. 10(*a*), first compute the MD function (described above) on the given simple data item (Step S212). Then append to the resulting 128 bits, the byte length modulo 32 of the data item (Step S214). The resulting 160-bit value is the True Name of the simple data item.

A compound data item is one whose size is greater than the particular given size of a simple data item. To determine the True Name of an arbitrary (simple or compound) data item, with reference to FIG. 10(*b*), first determine if the data item is a simple or a compound data item (Step S216). If the data item is a simple data item, then compute its True Name in step S218 (using steps S212 and S214 described above), otherwise partition the data item into segments (Step S220) and assimilate each segment (Step S222) (the primitive mechanism, Assimilate a Data Item, is described below), computing the True Name of the segment. Then create an indirect block consisting of the computed segment True Names (Step S224). An indirect block is a data item which consists of the sequence of True Names of the segments. Then, in step S226, assimilate the indirect block and compute its True Name. Finally, replace the final thirty-two (32) bits of the resulting True Name (that is, the length of the indirect block) by the length modulo 32 of the compound data item (Step S228). The result is the True Name of the compound data item.

Note that the compound data item may be so large that the indirect block of segment True Names is itself a compound data item. In this case the mechanism is invoked recursively until only simple data items are being processed.

Both the use of segments and the attachment of a length to the True Name are not strictly required in a system using the present invention, but are currently considered desirable features in the preferred embodiment.

2. Assimilate Data Item

Figure 11:
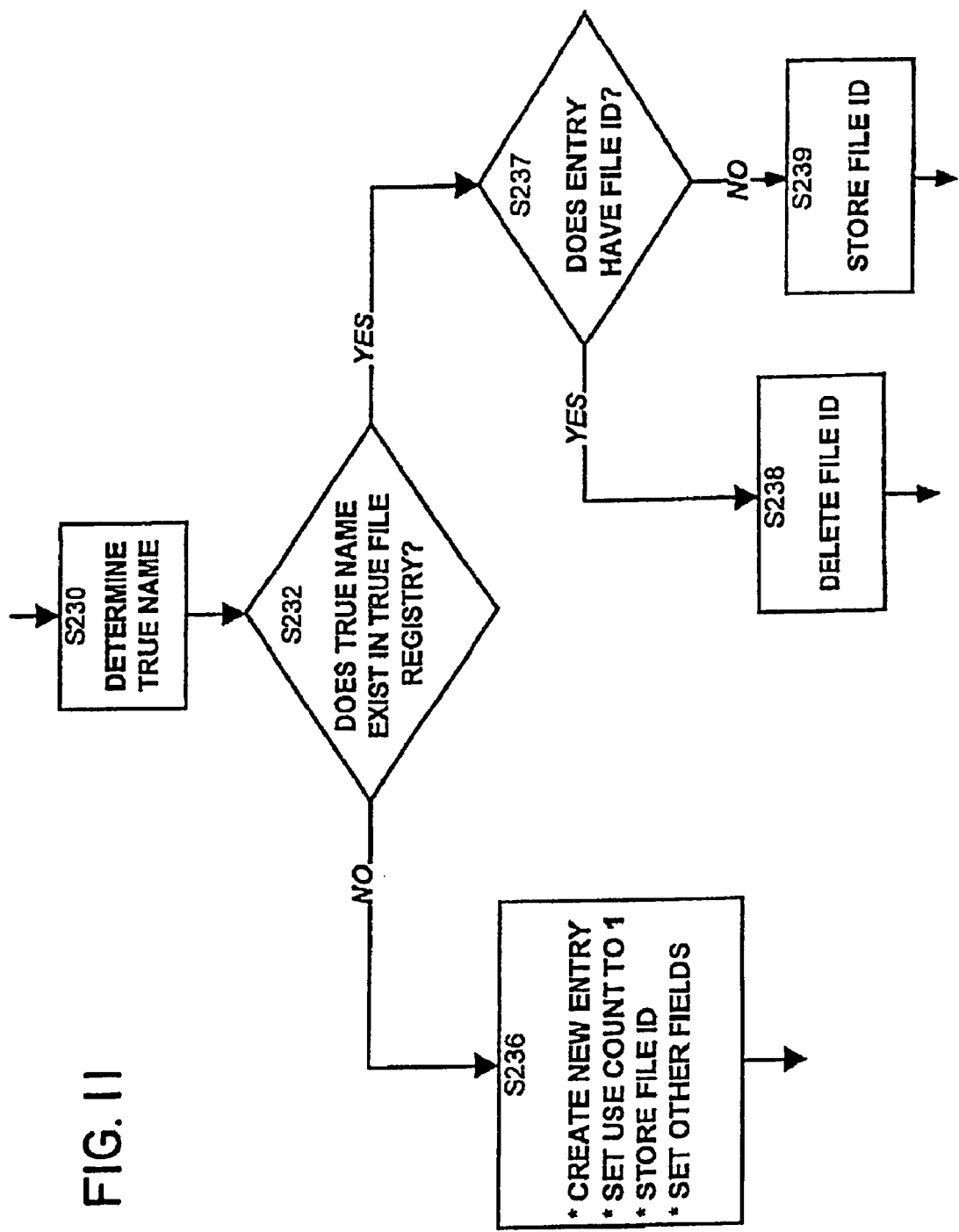

A mechanism for assimilating a data item (scratch file or segment) into a file system, given the scratch file ID of the data item, is now described with reference to FIG. 11. The purpose of this mechanism is to add a given data item to the True File registry 126. If the data item already exists in the True File registry 126, this will be discovered and used during this process, and the duplicate will be eliminated.

Thereby the system stores at most one copy of any data item or file by content, even when multiple names refer to the same content.

First, determine the True Name of the data item corresponding to the given scratch File ID using the Calculate True Name primitive mechanism (Step S230). Next, look for an entry for the True Name in the True File registry 126 (Step S232) and determine whether a True Name entry, record 140, exists in the True File registry 126. If the entry record includes a corresponding True File ID or compressed File ID (Step S237), delete the file with the scratch File ID (Step S238). Otherwise store the given True File ID in the entry record (step S239).

If it is determined (in step S232) that no True Name entry exists in the True File registry 126, then, in Step S236, create a new entry in the True File registry 126 for this True Name. Set the True Name of the entry to the calculated True Name, set the use count for the new entry to one, store the given True File ID in the entry and set the other fields of the entry as appropriate.

Because this procedure may take some time to compute, it is intended to run in background after a file has ceased to change. In the meantime, the file is considered an unassimilated scratch file.

3. New True File

Figure 12:
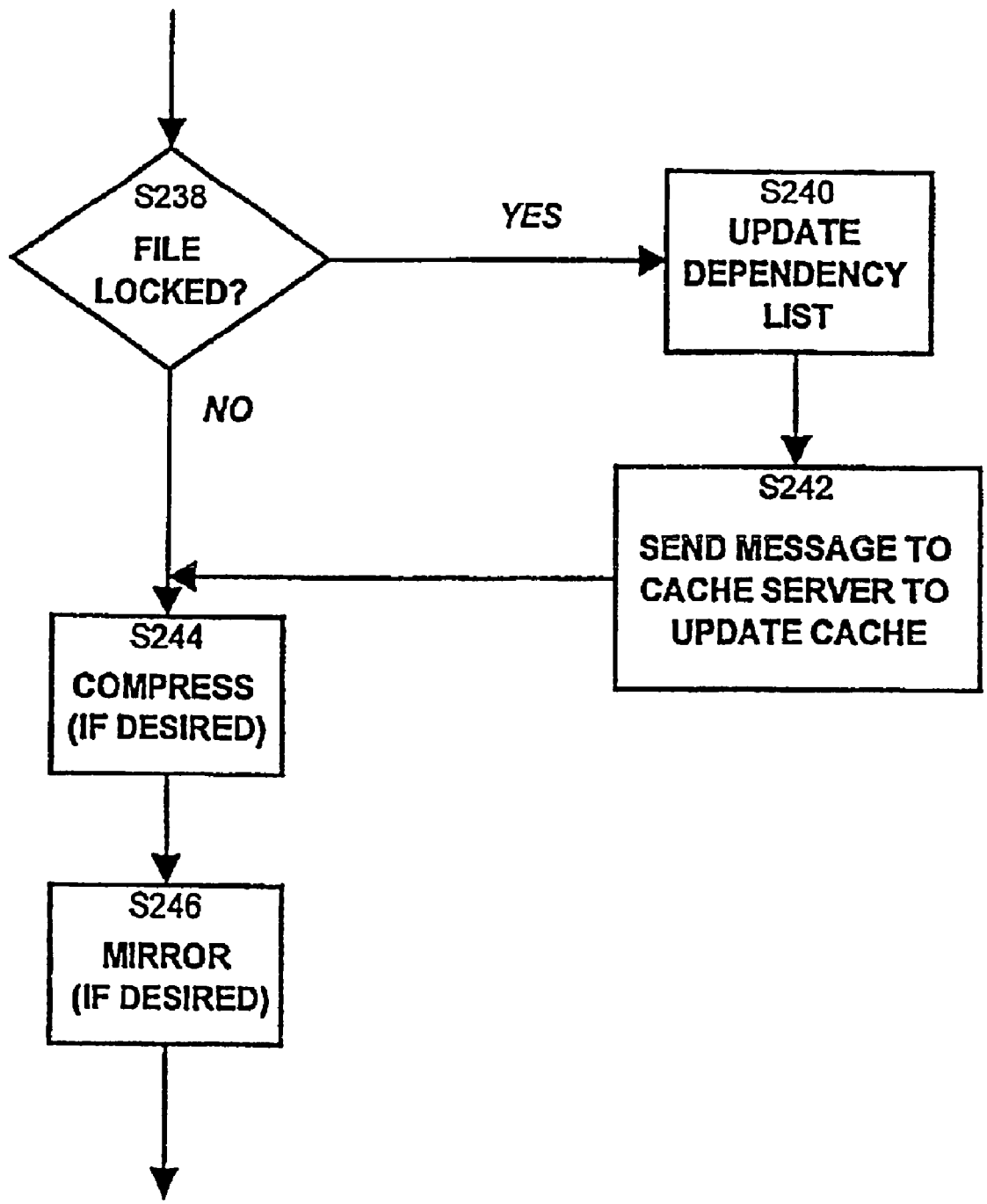

The New True File process is invoked when processing the audit file 132, some time after a True File has been assimilated (using the Assimilate Data Item primitive mechanism). Given a local directory extensions table entry record 138 in the local directory extensions table 124, the New True File process can provide the following steps (with reference to FIG. 12), depending on how the local processor is configured:

First, in step S238, examine the local directory extensions table entry record 138 to determine whether the file is locked by a cache server. If the file is locked, then add the ID of the cache server to the dependent processor list of the True File registry table 126, and then send a message to the cache server to update the cache of the current processor using the Update Cache remote mechanism (Step 242).

If desired, compress the True File (Step S246), and, if desired, mirror the True File using the Mirror True File background mechanism (Step S248).

4. Get True Name from Path

Figure 13:
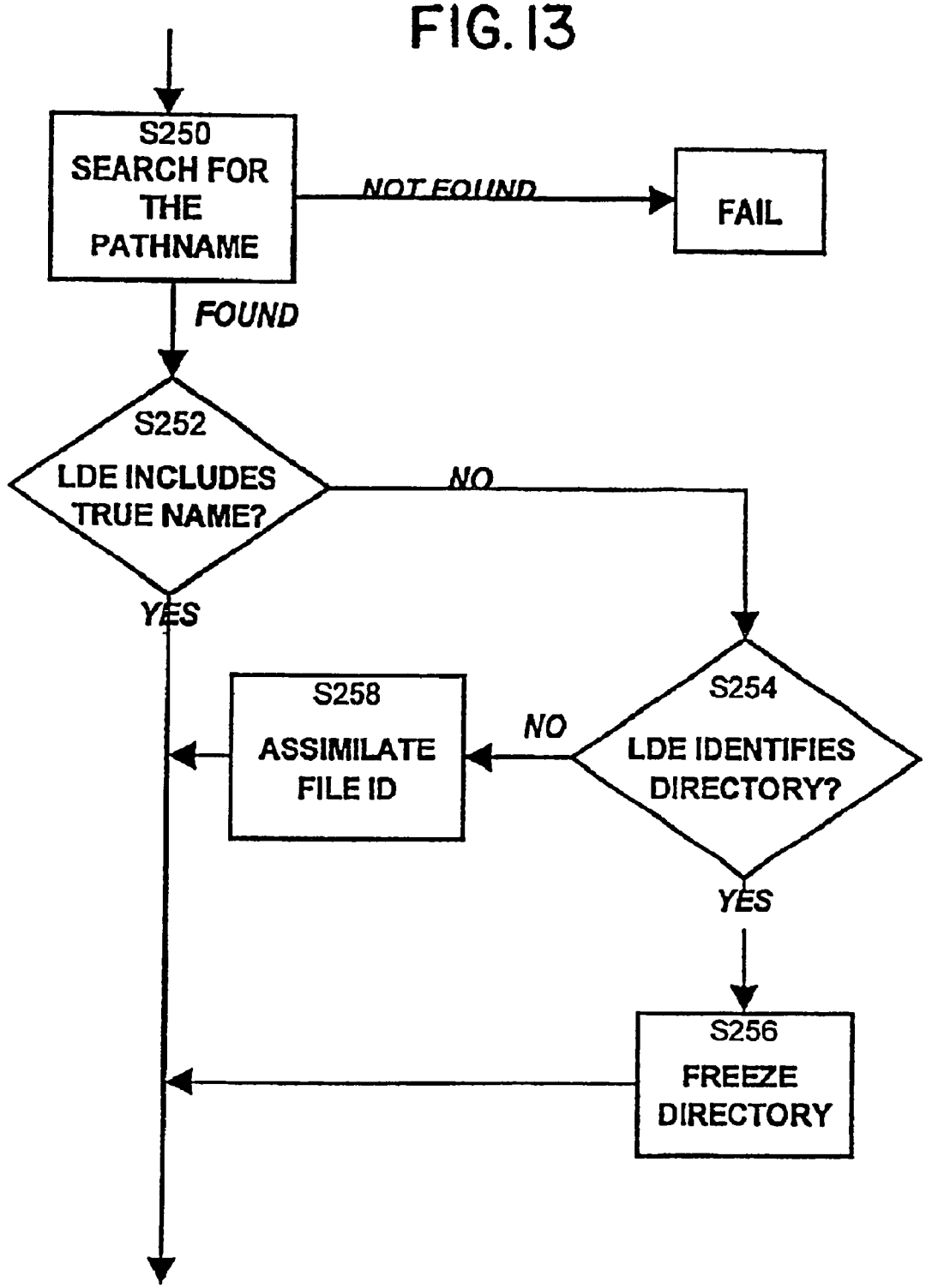

The True Name of a file can be used to identify a file by contents, to confirm that a file matches its original contents, or to compare two files. The mechanism to get a True Name given the pathname of a file is now described with reference to FIG. 13.

First, search the local directory extensions table 124 for the entry record 138 with the given pathname (Step S250). If the pathname is not found, this process fails and no True Name corresponding to the given pathname exists. Next, determine whether the local directory extensions table entry record 138 includes a True Name (Step S252), and if so, the mechanism's task is complete. Otherwise, determine whether the local directory extensions table entry record 138 identifies a directory (Step S254), and if so, freeze the directory (Step S256) (the primitive mechanism Freeze Directory is described below).

Otherwise, in step S258, assimilate the file (using the Assimilate Data Item primitive mechanism) defined by the File ID field to generate its True Name and store its True Name in the local directory extensions entry record. Then return the True Name identified by the local directory extensions table 124.

5. Link Path to True Name

Figure 14:
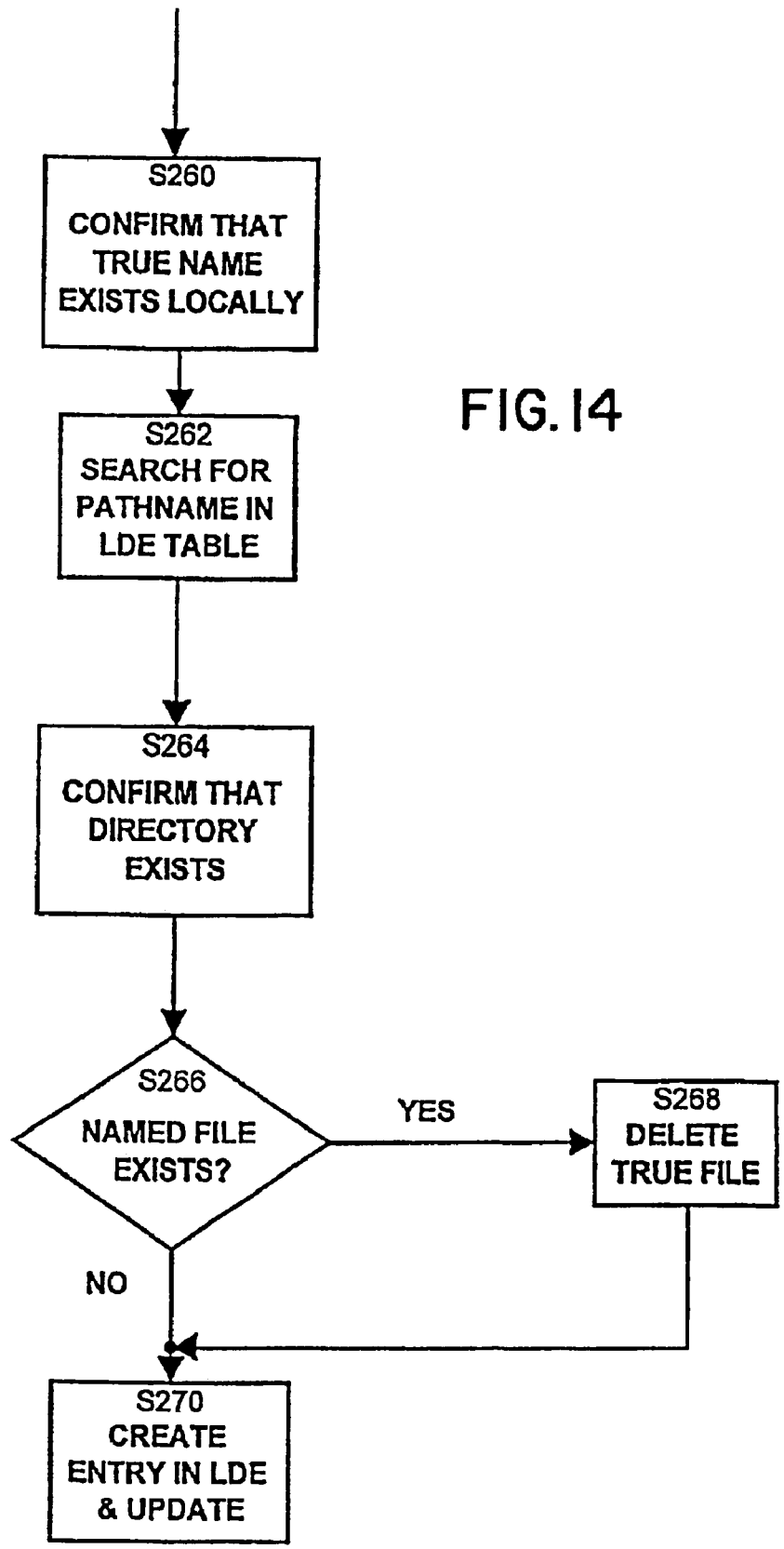

The mechanism to link a path to a True Name provides a way of creating a new directory entry record identifying an existing, assimilated file. This basic process may be used to copy, move, and rename files without a need to copy their contents. The mechanism to link a path to a True Name is now described with reference to FIG. 14.

First, if desired, confirm that the True Name exists locally by searching for it in the True Name registry or local directory extensions table 135 (Step S260). Most uses of this mechanism will require this form of validation. Next, search for the path in the local directory extensions table 135 (Step S262). Confirm that the directory containing the file named in the path already exists (Step S264). If the named file itself exists, delete the File using the Delete True File operating system mechanism (see below) (Step S268).

Then, create an entry record in the local directory extensions with the specified path (Step S270) and update the entry record and other data structures as follows: fill in the True Name field of the entry with the specified True Name; increment the use count for the True File registry entry record 140 of the corresponding True Name; note whether the entry is a directory by reading the True File to see if it contains a tag (magic number) indicating that it represents a frozen directory (see also the description of the Freeze Directory primitive mechanism regarding the tag); and compute and set the other fields of the local directory extensions appropriately. For instance, search the region table 128 to identify the region of the path, and set the time of last access and time of last modification to the current time.

6. Realize True File from Location

Figure 15:
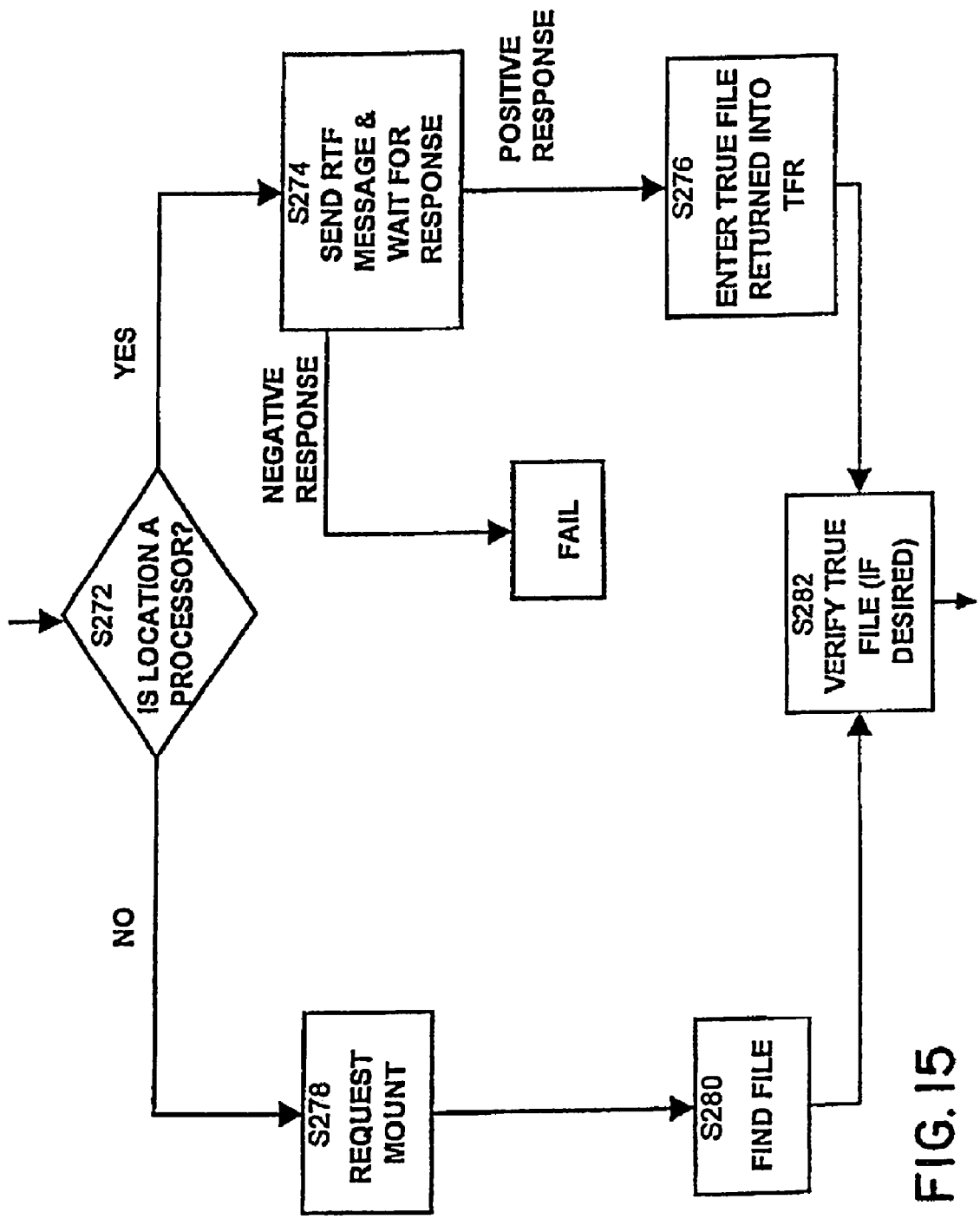

This mechanism is used to try to make a local copy of a True File, given its True Name and the name of a source location (processor or media) that may contain the True File. This mechanism is now described with reference to FIG. 15.

First, in step S272, determine whether the location specified is a processor. If it is determined that the location specified is a processor, then send a Request True File message (using the Request True File remote mechanism) to the remote processor and wait for a response (Step S274). If a negative response is received or no response is received after a timeout period, this mechanism fails. If a positive response is received, enter the True File returned in the True File registry 126 (Step S276). (If the file received was compressed, enter the True File ID in the compressed File ID field.)

If, on the other hand, it is determined in step S272 that the location specified is not a processor, then, if necessary, request the user or operator to mount the indicated volume (Step S278). Then (Step S280) find the indicated file on the given volume and assimilate the file using the Assimilate Data Item primitive mechanism. If the volume does not contain a True File registry 126, search the media inventory to find the path of the file on the volume. If no such file can be found, this mechanism fails.

At this point, whether or not the location is determined (in step S272) to be a processor, if desired, verify the True File (in step S282).

7. Locate Remote File

Figure 16A:
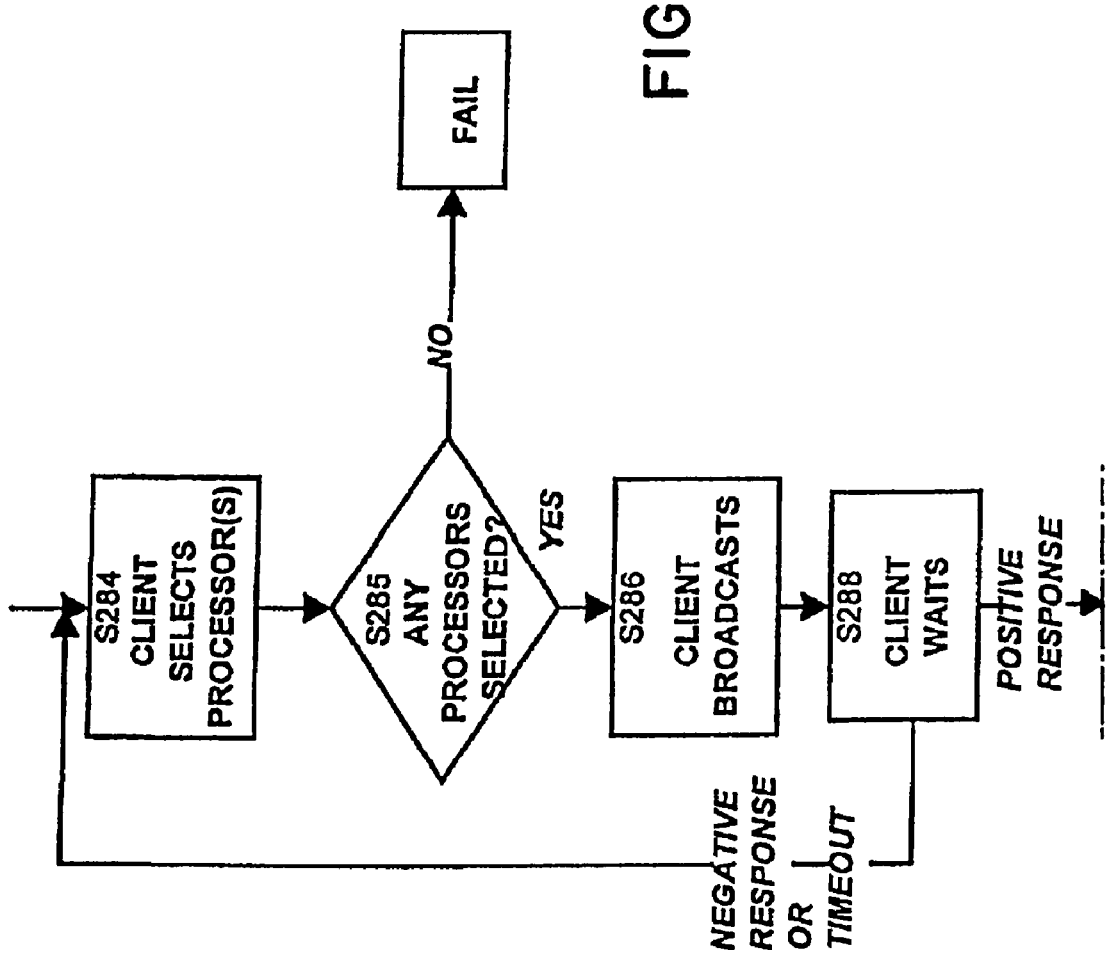
Figure 16B:
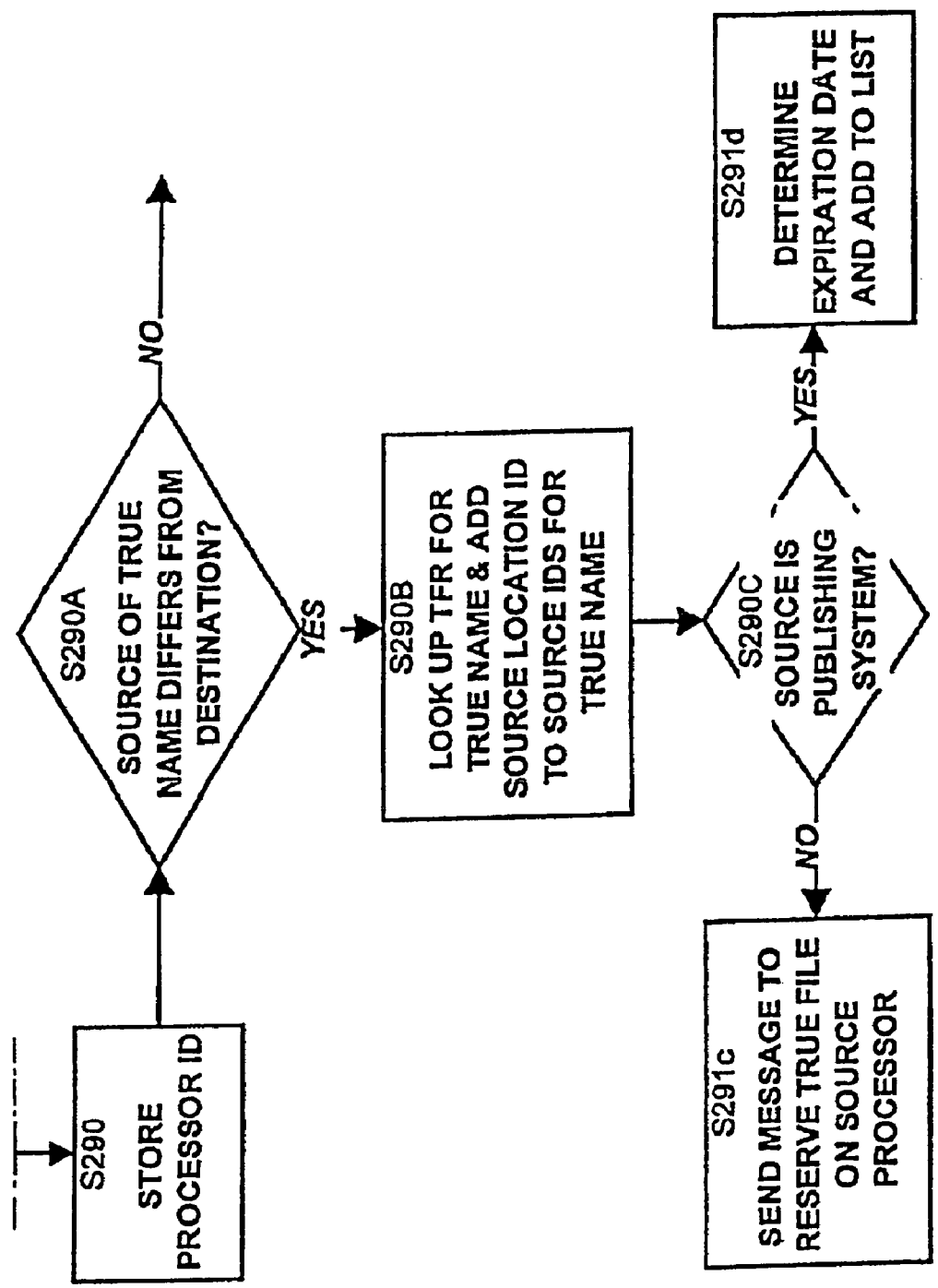

This mechanism allows a processor to locate a file or data item from a remote source of True Files, when a specific source is unknown or unavailable. A client processor system may ask one of several or many sources whether it can supply a data object with a given True Name. The steps to perform this mechanism are as follows (with reference to FIGS. 16(a) and 16(b)).

The client processor 102 uses the source table 145 to select one or more source processors (Step S284). If no source processor can be found, the mechanism fails. Next, the client processor 102 broadcasts to the selected sources a request to locate the file with the given True Name using the Locate True File remote mechanism (Step S286). The request to locate may be augmented by asking to propagate this request to distant servers. The client processor then waits for one or more servers to respond positively (Step S288). After all servers respond negatively, or after a timeout period with no positive response, the mechanism repeats selection (Step S284) to attempt to identify alternative sources. If any selected source processor responds, its processor ID is the result of this mechanism. Store the processor ID in the source field of the True File registry entry record 140 of the given True Name (Step S290).

If the source location of the True Name is a different processor or medium than the destination (Step S290a), perform the following steps:

(i) Look up the True File registry entry record 140 for the corresponding True Name, and add the source location ID to the list of sources for the True Name (Step S290b); and (ii) If the source is a publishing system, determine the expiration date on the publishing system for the True Name and add that to the list of sources. If the source is not a publishing system, send a message to reserve the True File on the source processor (Step S290c).

Source selection in step S284 may be based on optimizations involving general availability of the source, access time, bandwidth, and transmission cost, and ignoring previously selected processors which did not respond in step S288.

8. Make True File Local

Figure 17A:
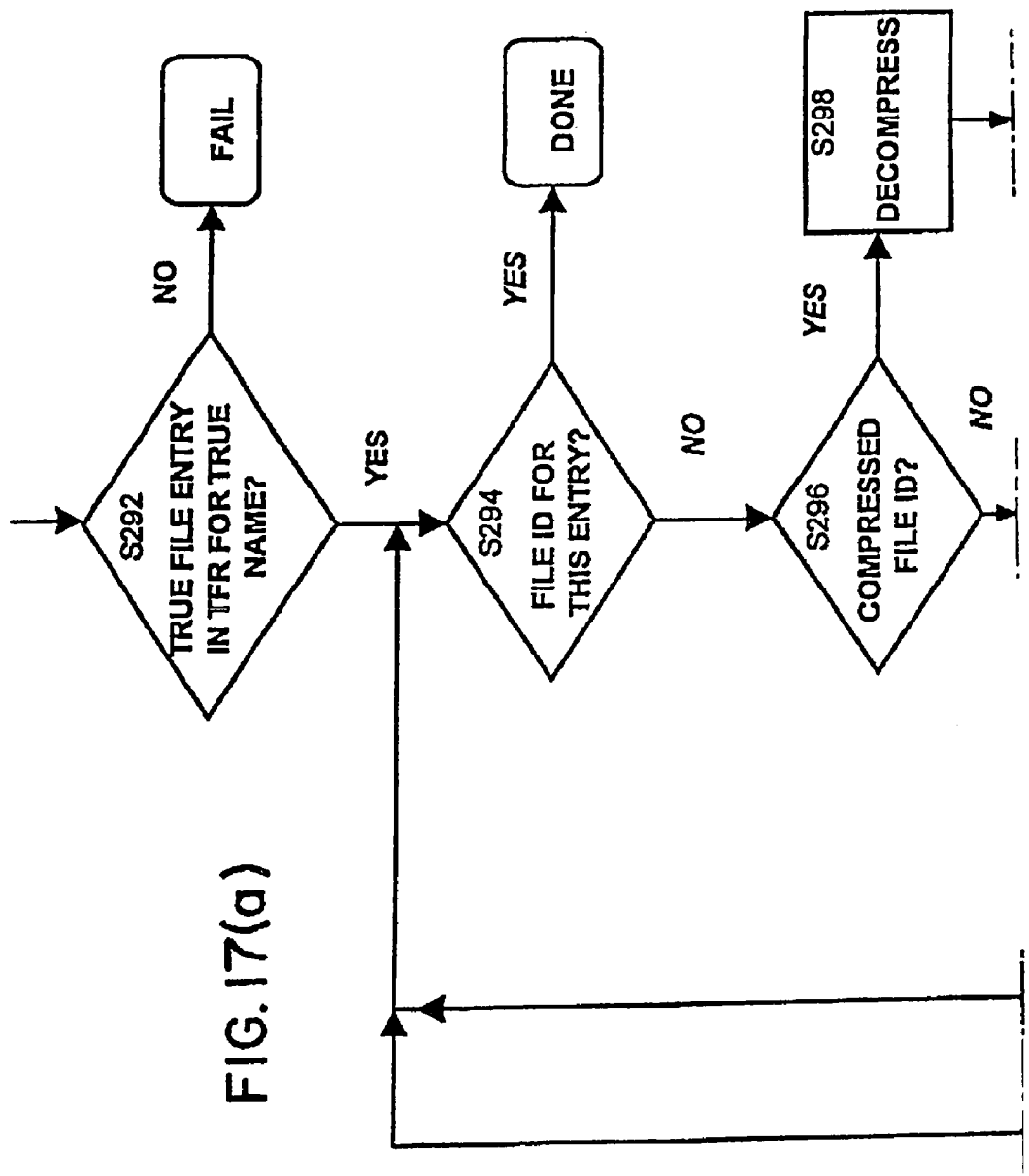
Figure 17B:
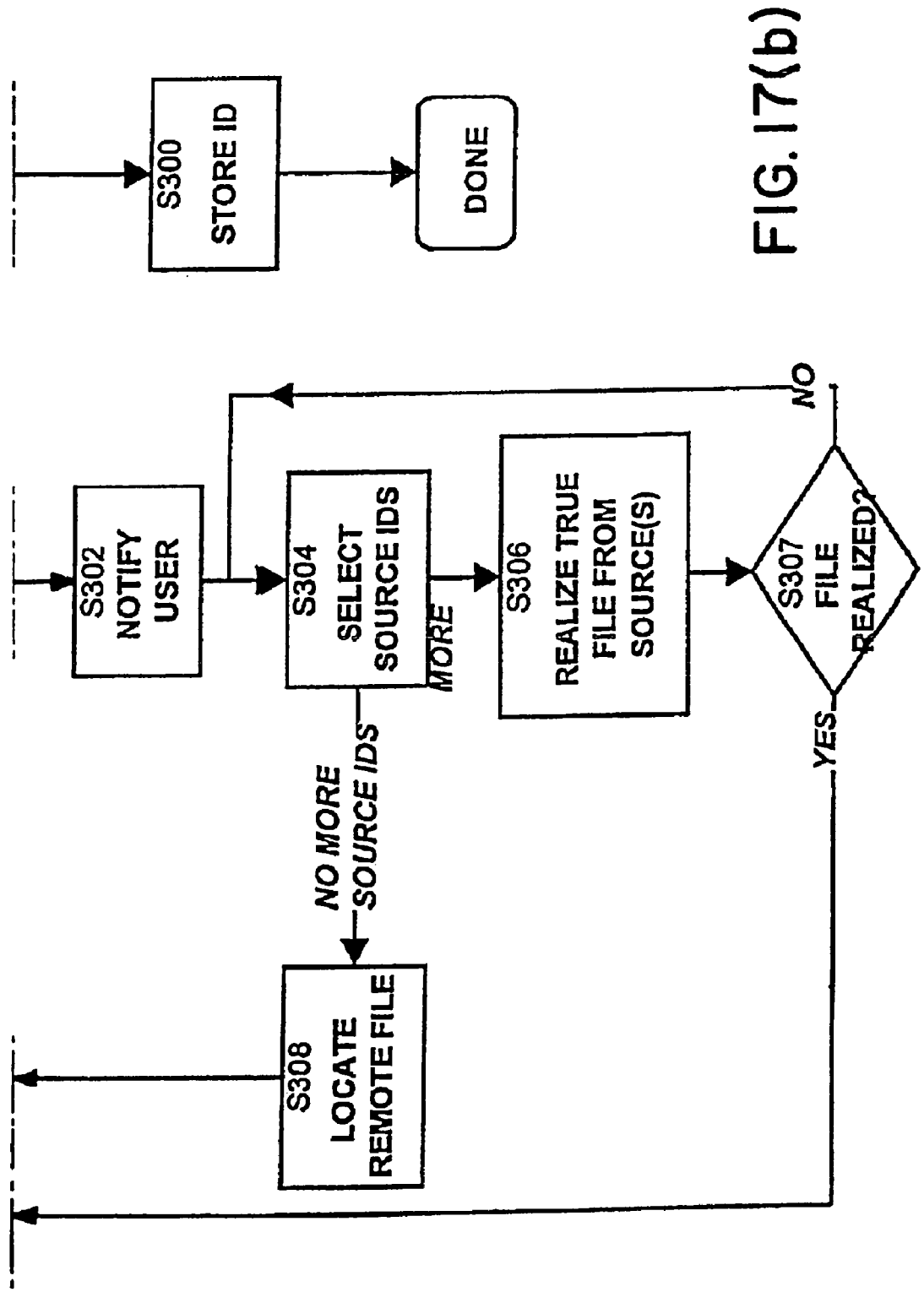

This mechanism is used when a True Name is known and a locally accessible copy of the corresponding file or data item is required. This mechanism makes it possible to actually read the data in a True File. The mechanism takes a True Name and returns when there is a local, accessible copy of the True File in the True File registry 126. This mechanism is described here with reference to the flow chart of FIGS. 17(a) and 17(b).

First, look in the True File registry 126 for a True File entry record 140 for the corresponding True Name (Step S292). If no such entry is found this mechanism fails. If there is already a True File ID for the entry (Step S294), this mechanism's task is complete. If there is a compressed file ID for the entry (Step S296), decompress the file corresponding to the file ID (Step S298) and store the decompressed file ID in the entry (Step S300). This mechanism is then complete.

If there is no True File ID for the entry (Step S294) and there is no compressed file ID for the entry (Step S296), then continue searching for the requested file. At this time it may be necessary to notify the user that the system is searching for the requested file.

If there are one or more source IDs, then select an order in which to attempt to realize the source ID (Step S304). The order may be based on optimizations involving general availability of the source, access time, bandwidth, and transmission cost. For each source in the order chosen, realize the True File from the source location (using the Realize True File from Location primitive mechanism), until the True File is realized (Step S306). If it is realized, continue with step S294.

If no known source can realize the True File, use the Locate Remote File primitive mechanism to attempt to find the True File (Step S308). If this succeeds, realize the True File from the identified source location and continue with step S296.

9. Create Scratch File

Figure 18B:
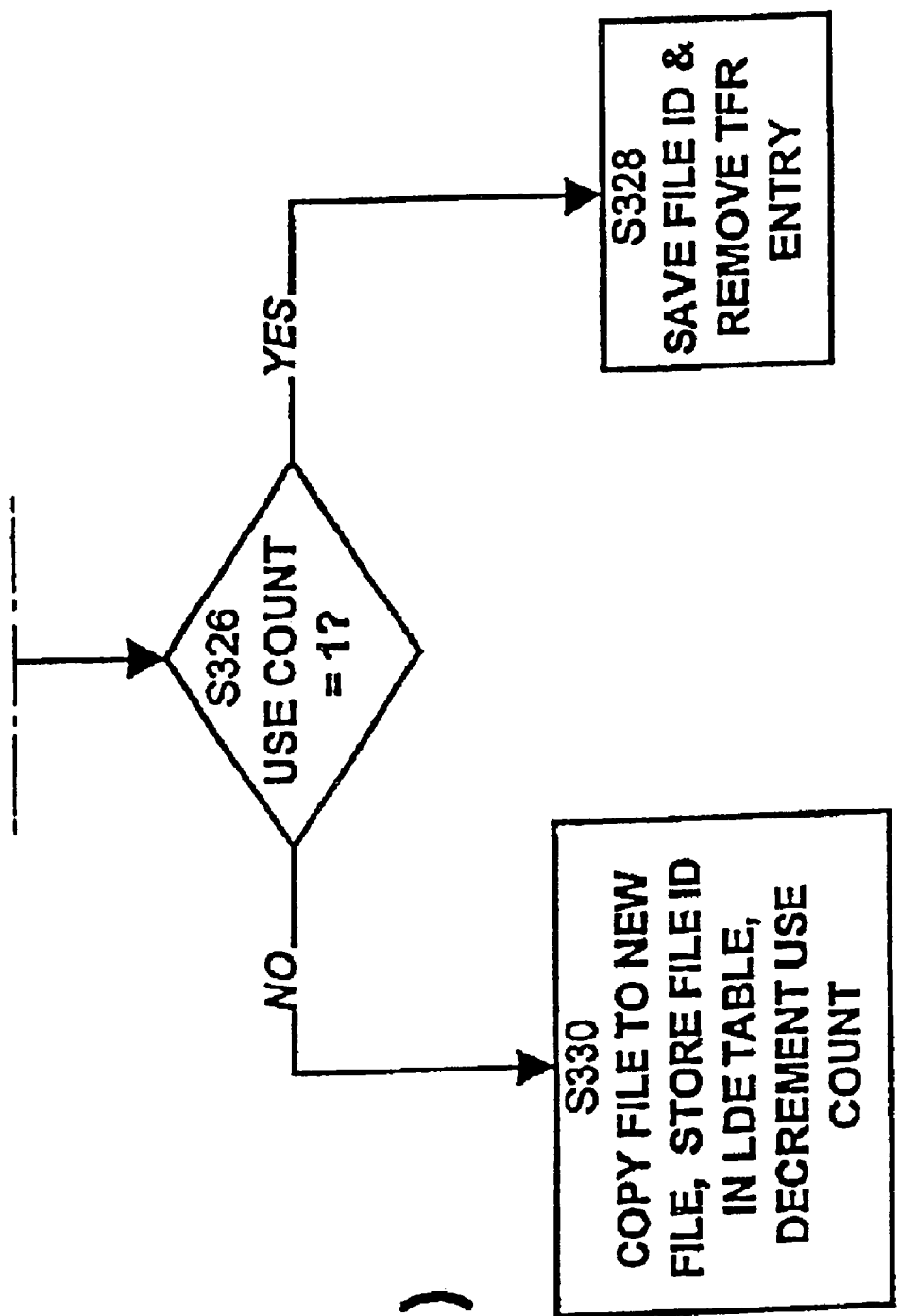

A scratch copy of a file is required when a file is being created or is about to be modified. The scratch copy is stored in the file system of the underlying operating system. The scratch copy is eventually assimilated when the audit file record entry 146 is processed by the Process Audit File Entry primitive mechanism. This Create Scratch File mechanism requires a local directory extensions table entry record 138. When it succeeds, the local directory extensions table entry record 138 contains the scratch file ID of a scratch file that is not contained in the True File registry 126 and that may be modified. This mechanism is now described with reference to FIGS. 18(*a*) and 18(*b*).

First determine whether the scratch file should be a copy of the existing True File (Step S310). If so, continue with step S312. Otherwise, determine whether the local directory extensions table entry record 138 identifies an existing True File (Step S316), and if so, delete the True File using the Delete True File primitive mechanism (Step S318). Then create a new, empty scratch file and store its scratch file ID in the local directory extensions table entry record 138 (step S320). This mechanism is then complete.

If the local directory extensions table entry record 138 identifies a scratch file ID (Step S312), then the entry already has a scratch file, so this mechanism succeeds.

If the local directory extensions table entry record 138 identifies a True File (S316), and there is no True File ID for the True File (S312), then make the True File local using the Make True File Local primitive mechanism (Step S322). If there is still no True File ID, this mechanism fails.

There is now a local True File for this file. If the use count in the corresponding True File registry entry record 140 is one (Step S326), save the True File ID in the scratch file ID of the local directory extensions table entry record 138, and remove the True File registry entry record 140 (Step S328). (This step makes the True File into a scratch file.) This mechanism's task is complete.

Otherwise, if the use count in the corresponding True File registry entry record 140 is not one (in step S326), copy the file with the given True File ID to a new scratch file, using the Read File OS mechanism and store its file ID in the local directory extensions table entry record 138 (Step S330), and reduce the use count for the True File by one. If there is insufficient space to make a copy, this mechanism fails.

10. Freeze Directory

Figure 19A:
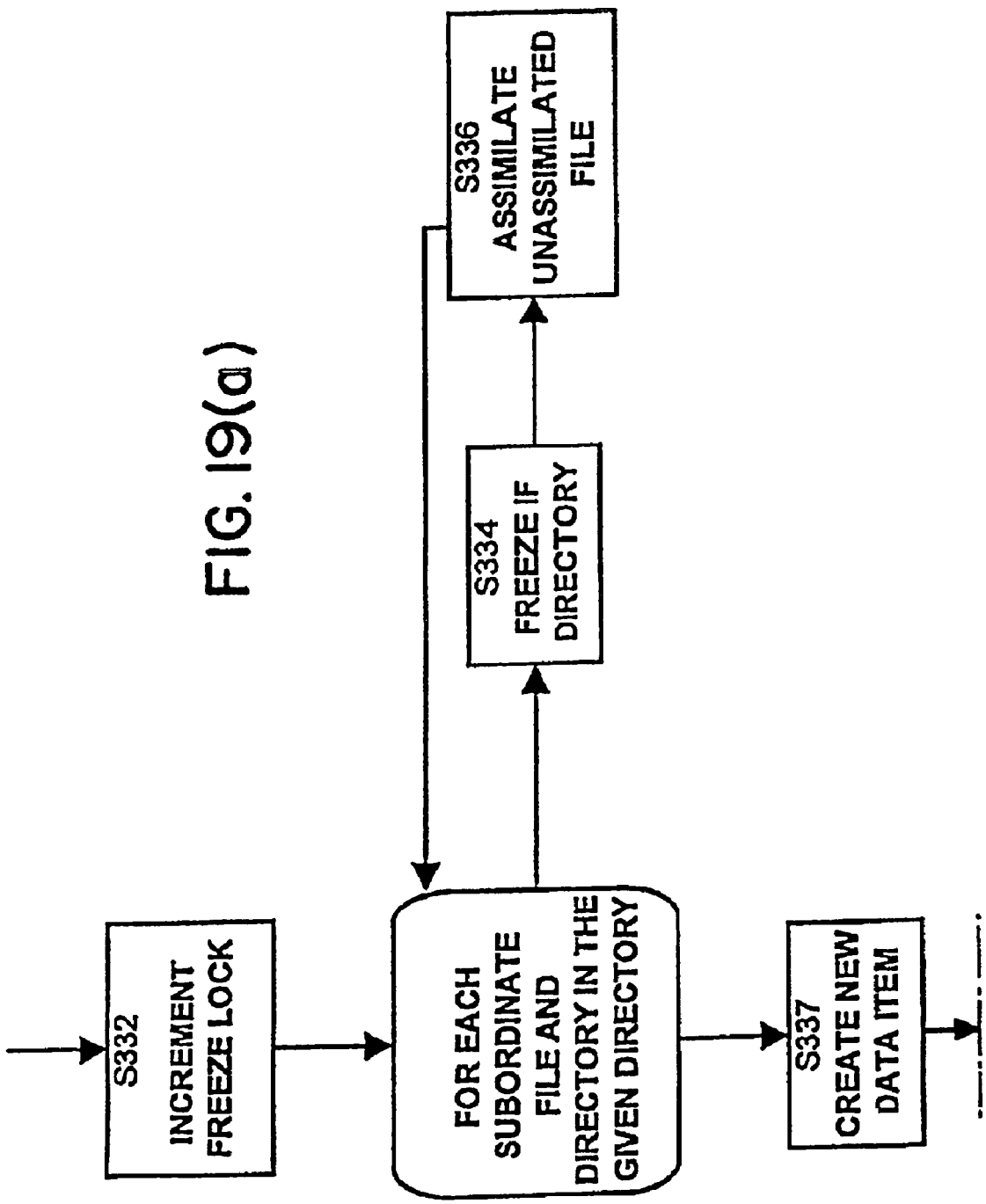
Figure 19B:
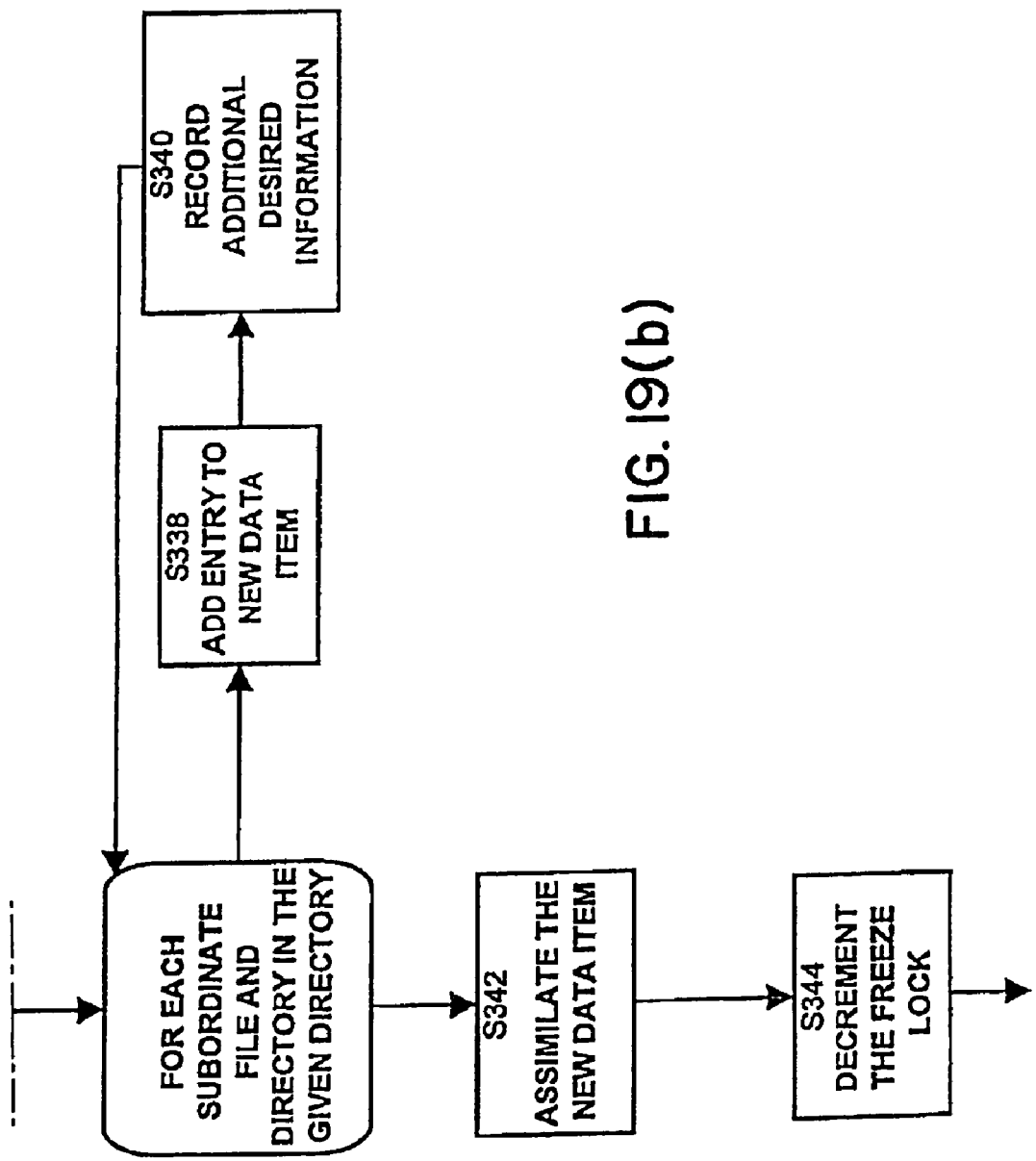

This mechanism freezes a directory in order to calculate its True Name. Since the True Name of a directory is a function of the files within the directory, they must not change during the computation of the True Name of the directory. This mechanism requires the pathname of a directory to freeze. This mechanism is described with reference to FIGS. 19(*a*) and 19(*b*).

In step S332, add one to the global freeze lock. Then search the local directory extensions table 124 to find each subordinate data file and directory of the given directory, and freeze each subordinate directory found using the Freeze Directory primitive mechanism (Step S334). Assimilate each unassimilated data file in the directory using the Assimilate Data Item primitive mechanism (Step S336). Then create a data item which begins with a tag or marker (a "magic number") being a unique data item indicating that this data item is a frozen directory (Step S337). Then list the file name and True Name for each file in the current directory (Step S338). Record any additional information required, such as the type, time of last access and modification, and size (Step S340). Next, in step S342, using the Assimilate Data Item primitive mechanism, assimilate the data item created in step S338. The resulting True Name is the True Name of the frozen directory. Finally, subtract one from the global freeze lock (Step S344).

11. Expand Frozen Directory

Figure 20:
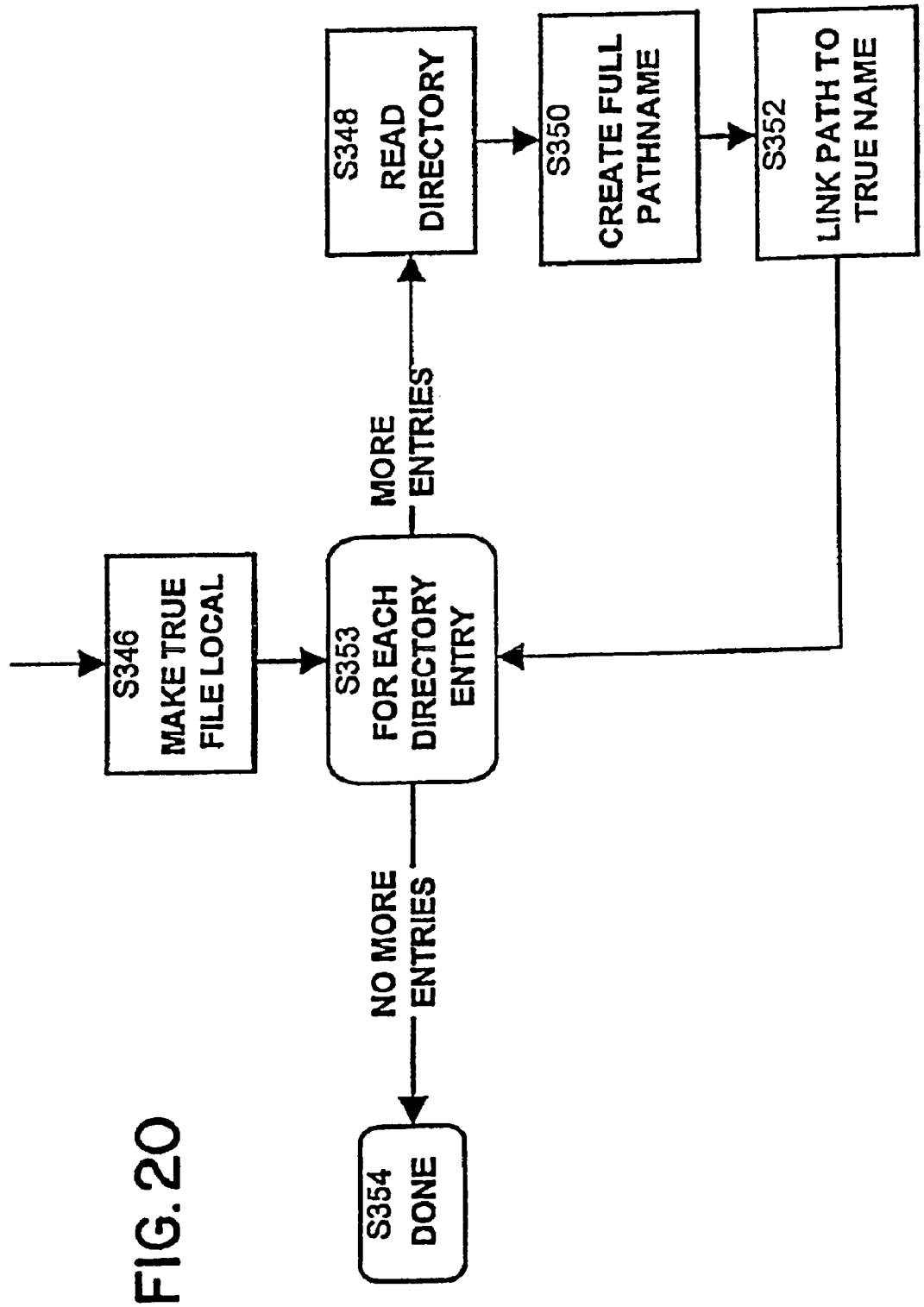

This mechanism expands a frozen directory in a given location. It requires a given pathname into which to expand the directory, and the True Name of the directory and is described with reference to FIG. 20.

First, in step S346, make the True File with the given True Name local using the Make True File Local primitive mechanism. Then read each directory entry in the local file created in step S346 (Step S348). For each such directory entry, do the following:

Create a full pathname using the given pathname and the file name of the entry (Step S350); and link the created path to the True Name (Step S352) using the Link Path to True Name primitive mechanism.

12. Delete True File

Figure 21:
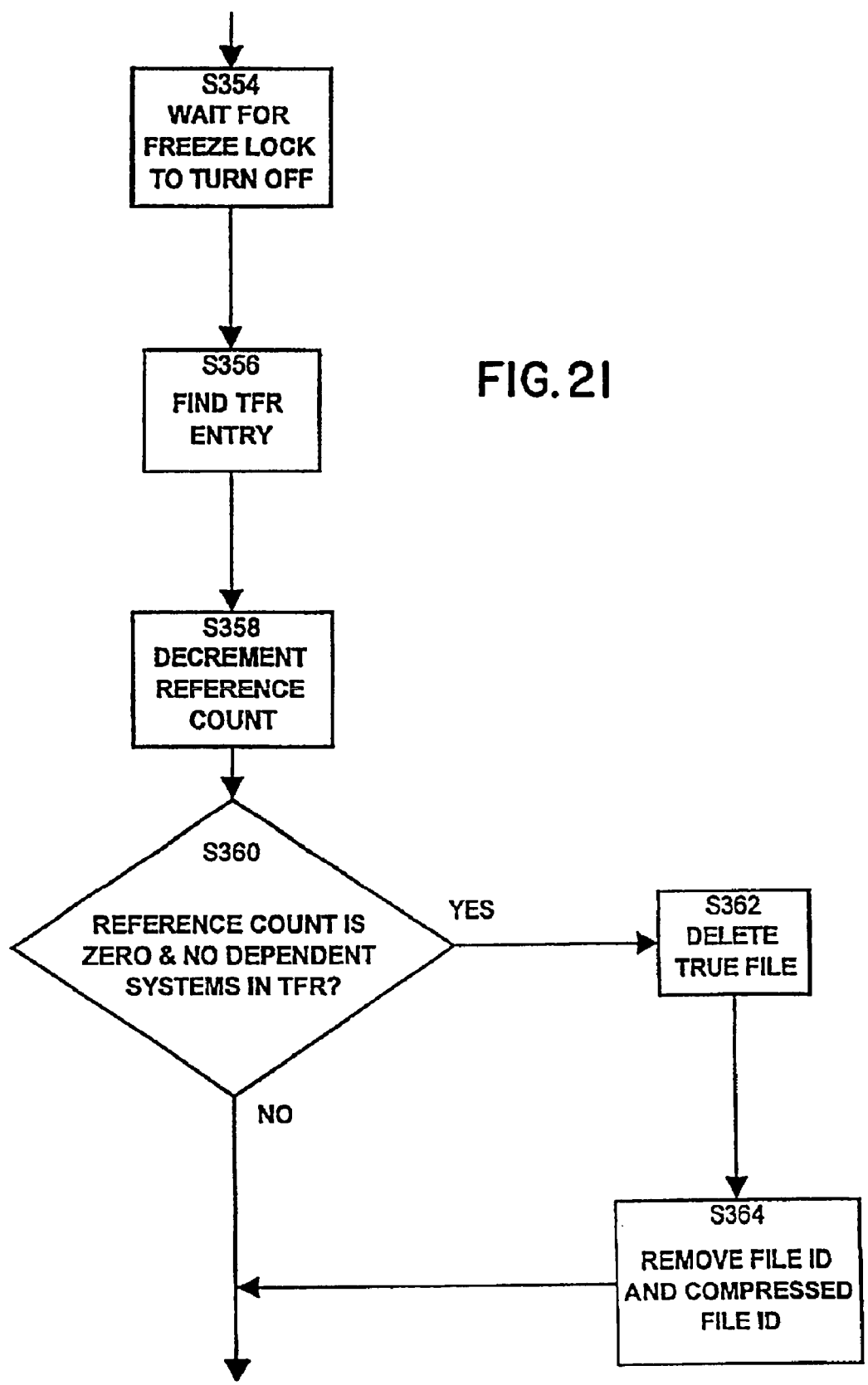

This mechanism deletes a reference to a True Name. The underlying True File is not removed from the True File registry 126 unless there are no additional references to the file. With reference to FIG. 21, this mechanism is performed as follows:

If the global freeze lock is on, wait until the global freeze lock is turned off (Step S354). This prevents deleting a True File while a directory which might refer to it is being frozen. Next, find the True File registry entry record 140 given the True Name (Step S356). If the reference count field of the True File registry 126 is greater than zero, subtract one from the reference count field (Step S358). If it is determined (in step S360) that the reference count field of the True File registry entry record 140 is zero, and if there are no dependent systems listed in the True File registry entry record 140, then perform the following steps:

(i) If the True File is a simple data item, then delete the True File, otherwise, (ii) (the True File is a compound data item) for each True Name in the data item, recursively delete the True File corresponding to the True Name (Step S362).

(iii) Remove the file indicated by the True File ID and compressed file ID from the True File registry 126, and remove the True File registry entry record 140 (Step S364).

13. Process Audit File Entry

Figure 22:
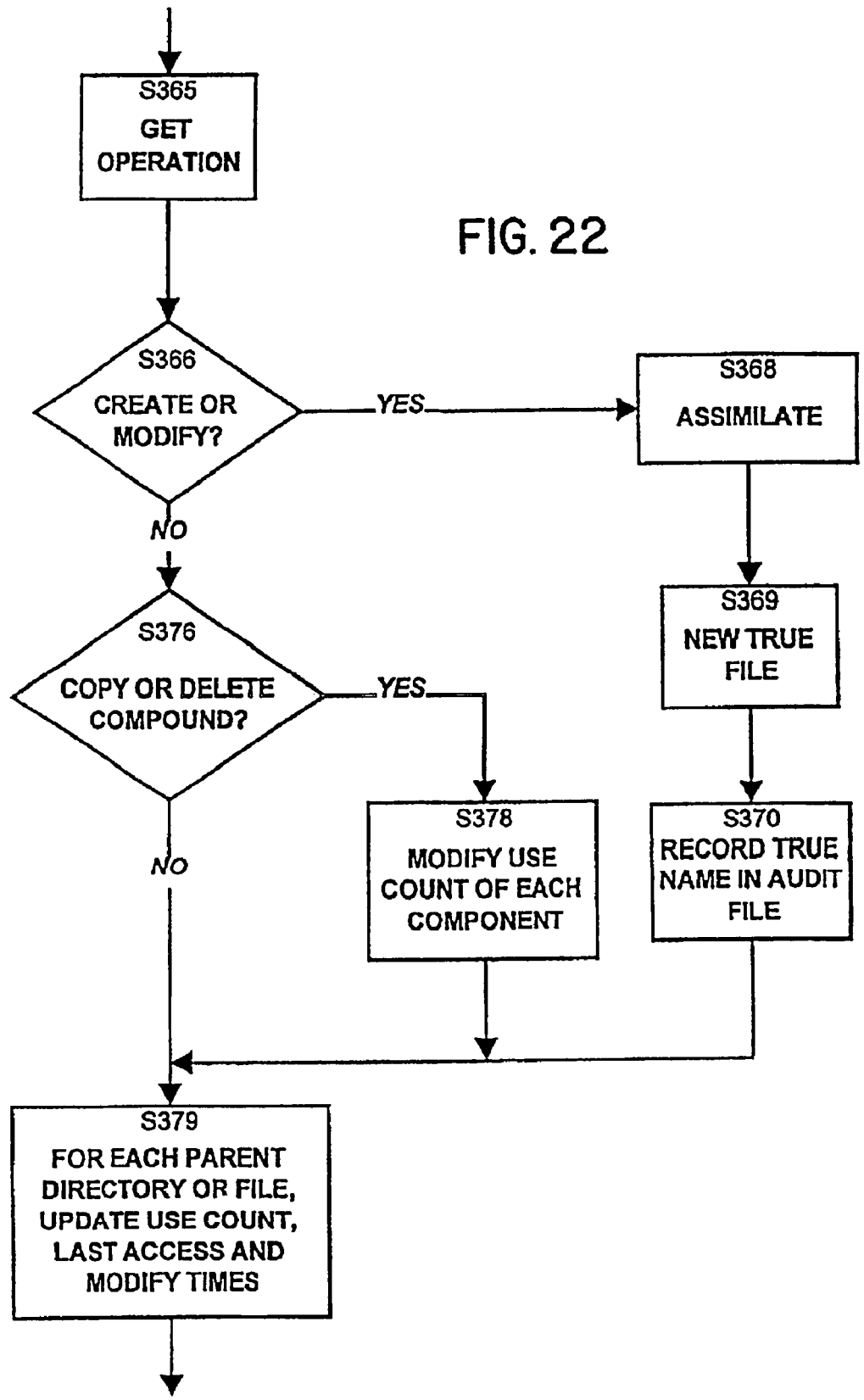

This mechanism performs tasks which are required to maintain information in the local directory extensions table 124 and True File registry 126, but which can be delayed while the processor is busy doing more time-critical tasks. Entries 142 in the audit file 132 should be processed at a background priority as long as there are entries to be processed. With reference to FIG. 22, the steps for processing an entry are as follows:

Determine the operation in the entry 142 currently being processed (Step S365). If the operation indicates that a file was created or written (Step S366), then assimilate the file using the Assimilate Data Item primitive mechanism (Step S368), use the New True File primitive mechanism to do additional desired processing (such as cache update, compression, and mirroring) (Step S369), and record the newly computed True Name for the file in the audit file record entry (Step S370).

Otherwise, if the entry being processed indicates that a compound data item or directory was copied (or deleted) (Step S376), then for each component True Name in the compound data item or directory, add (or subtract) one to the use count of the True File registry entry record 140 corresponding to the component True Name (Step S378).

In all cases, for each parent directory of the given file, update the size, time of last access, and time of last modification, according to the operation in the audit record (Step S379).

Note that the audit record is not removed after processing, but is retained for some reasonable period so that it may be used by the Synchronize Directory extended mechanism to allow a disconnected remote processor to update its representation of the local system.

14. Begin Grooming

Figure 23:
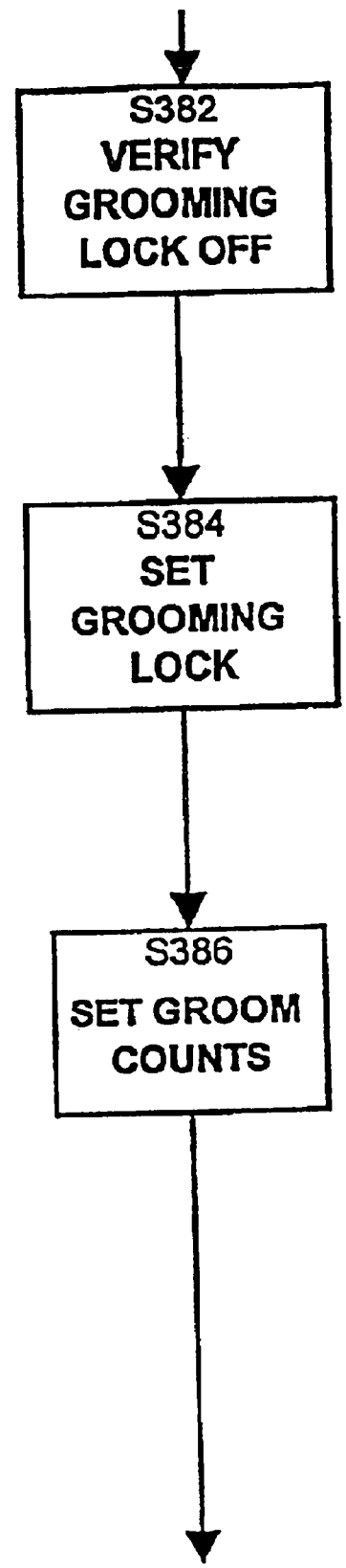

This mechanism makes it possible to select a set of files for removal and determine the overall amount of space to be recovered. With reference to FIG. 23, first verify that the global grooming lock is currently unlocked (Step S382). Then set the global grooming lock, set the total amount of space freed during grooming to zero and empty the list of files selected for deletion (Step S384). For each True File in the True File registry 126, set the delete count to zero (Step S386).

15. Select For Removal

Figure 24:
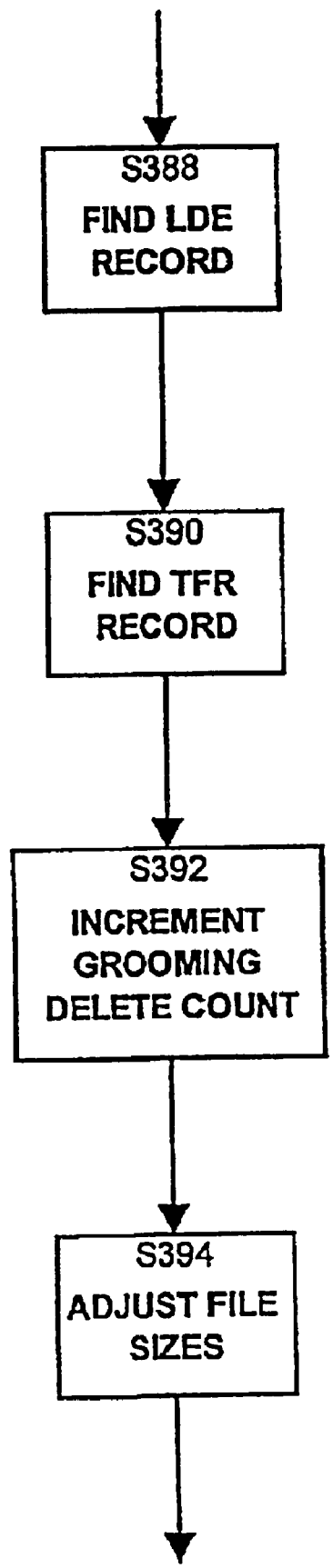

This grooming mechanism tentatively selects a pathname to allow its corresponding True File to be removed. With reference to FIG. 24, first find the local directory extensions table entry record 138 corresponding to the given pathname (Step S388). Then find the True File registry entry record 140 corresponding to the True File name in the local directory extensions table entry record 138 (Step S390). Add one to the grooming delete count in the True File registry entry record 140 and add the pathname to a list of files selected for deletion (Step S392). If the grooming delete count of the True File registry entry record 140 is equal to the use count of the True File registry entry record 140, and if the there are no entries in the dependency list of the True File registry entry record 140, then add the size of the file indicated by the True File ID and or compressed file ID to the total amount of space freed during grooming (Step S394).

16. End Grooming

Figure 25:
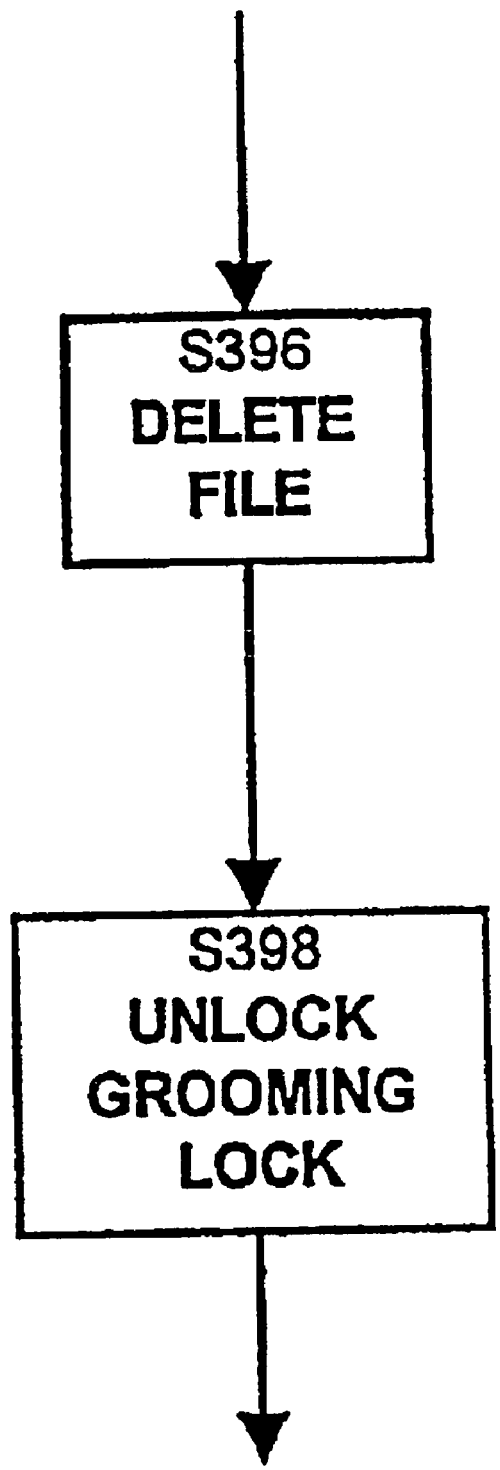

This grooming mechanism ends the grooming phase and removes all files selected for removal. With reference to FIG. 25, for each file in the list of files selected for deletion, delete the file (Step S396) and then unlock the global grooming lock (Step S398).

Operating System Mechanisms

The next of the mechanisms provided by the present invention, operating system mechanisms, are now described.

The following operating system mechanisms are described:
1. Open File;
2. Close File;
3. Read File;
4. Write File;
5. Delete File or Directory;
6. Copy File or Directory;
7. Move File or Directory;
8. Get File Status; and
9. Get Files in Directory.

1. Open File

Figure 26A:
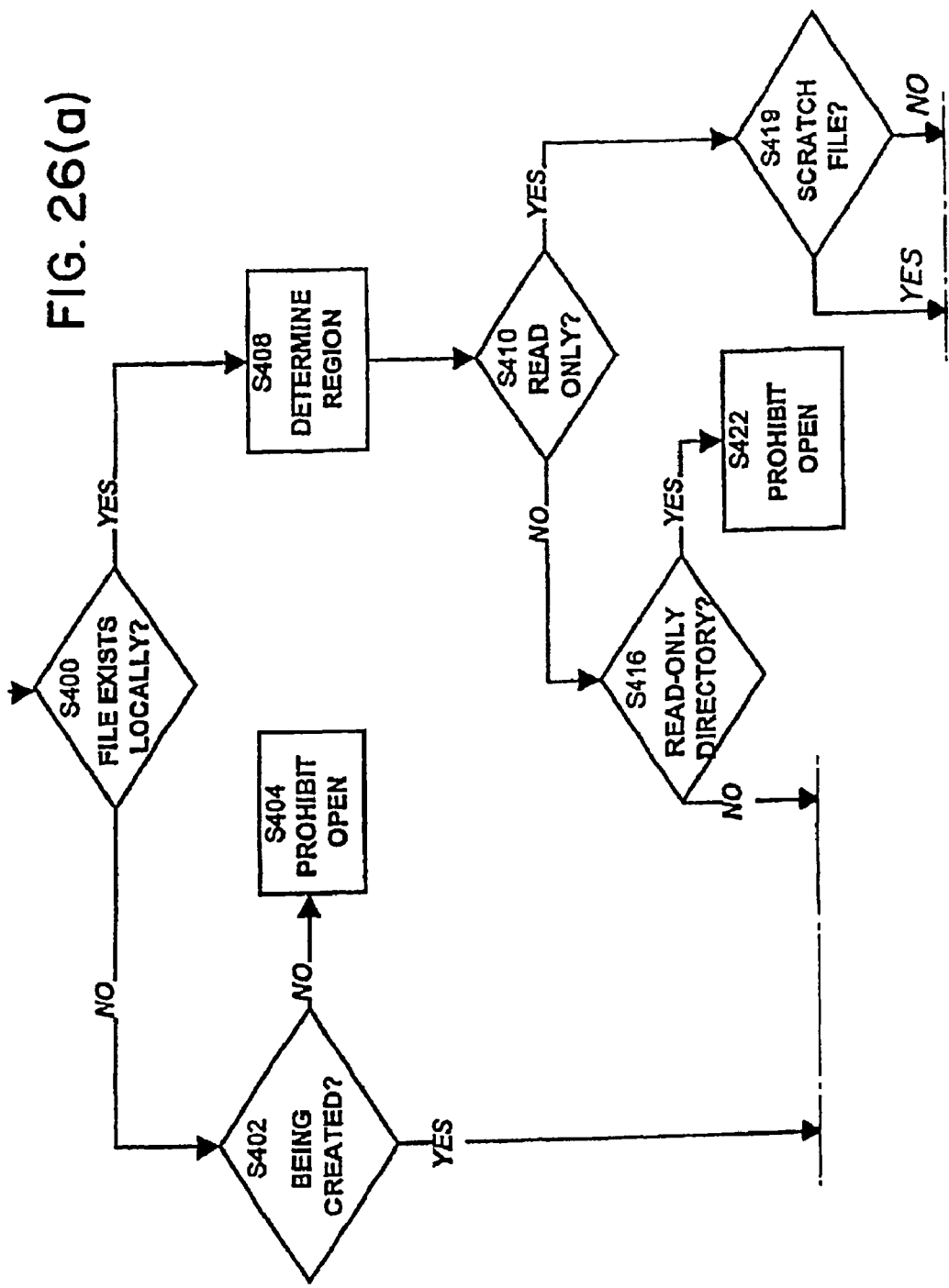
Figure 26B:
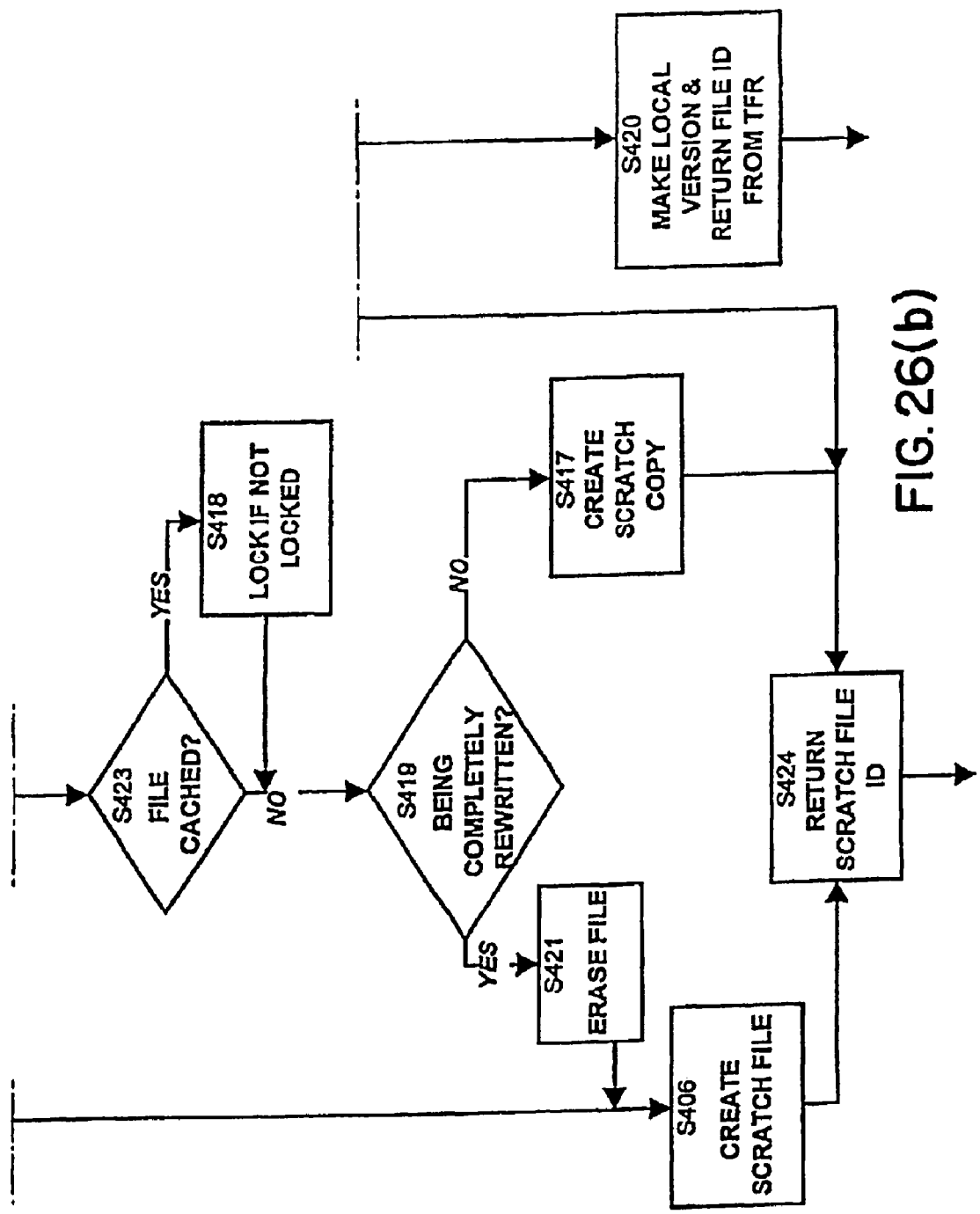

A mechanism to open a file is described with reference to FIGS. 26(a) and 26(b). This mechanism is given as input a pathname and the type of access required for the file (for example, read, write, read/write, create, etc.) and produces either the File ID of the file to be opened or an indication that no file should be opened. The local directory extensions table record 138 and region table record 142 associated with the opened file are associated with the open file for later use in other processing functions which refer to the file, such as read, write, and close.

First, determine whether or not the named file exists locally by examining the local directory extensions table 124 to determine whether there is an entry corresponding to the given pathname (Step S400). If it is determined that the file name does not exist locally, then, using the access type, determine whether or not the file is being created by this opening process (Step S402). If the file is not being created, prohibit the open (Step S404). If the file is being created, create a zero-length scratch file using an entry in local directory extensions table 124 and produce the scratch file ID of this scratch file as the result (Step S406).

If, on the other hand, it is determined in step S400 that the file name does exist locally, then determine the region in which the file is located by searching the region table 128 to find the record 142 with the longest region path which is a prefix of the file pathname (Step S408). This record identifies the region of the specified file.

Next, determine using the access type, whether the file is being opened for writing or whether it is being opened only for reading (Step S410). If the file is being opened for reading only, then, if the file is a scratch file (Step S419), return the scratch File ID of the file (Step S424). Otherwise get the True Name from the local directory extensions table 124 and make a local version of the True File associated with the True Name using the Make True File Local primitive mechanism, and then return the True File ID associated with the True Name (Step S420).

If the file is not being opened for reading only (Step S410), then, if it is determined by inspecting the region table entry record 142 that the file is in a read-only directory (Step S416), then prohibit the opening (Step S422).

If it is determined by inspecting the region table 128 that the file is in a cached region (Step S423), then send a Lock Cache message to the corresponding cache server, and wait for a return message (Step S418). If the return message says the file is already locked, prohibit the opening.

If the access type indicates that the file being modified is being rewritten completely (Step S419), so that the original data will not be required, then Delete the File using the Delete File OS mechanism (Step S421) and perform step S406. Otherwise, make a scratch copy of the file (Step S417) and produce the scratch file ID of the scratch file as the result (Step S424).

2. Close File

This mechanism takes as input the local directory extensions table entry record 138 of an open file and the data maintained for the open file. To close a file, add an entry to the audit file indicating the time and operation (create, read or write). The audit file processing (using the Process Audit File Entry primitive mechanism) will take care of assimilating the file and thereby updating the other records.

3. Read File

To read a file, a program must provide the offset and length of the data to be read, and the location of a buffer into which to copy the data read.

The file to be read from is identified by an open file descriptor which includes a File ID as computed by the Open File operating system mechanism defined above. The File ID may identify either a scratch file or a True File (or True File segment). If the File ID identifies a True File, it may be either a simple or a compound True File. Reading a file is accomplished by the following steps:

In the case where the File ID identifies a scratch file or a simple True File, use the read capabilities of the underlying operating system.

In the case where the File ID identifies a compound file, break the read operation into one or more read operations on component segments as follows:

A. Identify the segment(s) to be read by dividing the specified file offset and length each by the fixed size of a segment (a system dependent parameter), to determine the segment number and number of segments that must be read.

B. For each segment number computed above, do the following:
  i. Read the compound True File index block to determine the True Name of the segment to be read.

ii. Use the Realize True File from Location primitive mechanism to make the True File segment available locally. (If that mechanism fails, the Read File mechanism fails).
iii. Determine the File ID of the True File specified by the True Name corresponding to this segment.
iv. Use the Read File mechanism (recursively) to read from this segment into the corresponding location in the specified buffer.

4. Write File

File writing uses the file ID and data management capabilities of the underlying operating system. File access (Make File Local described above) can be deferred until the first read or write.

5. Delete File or Directory

Figure 27A:
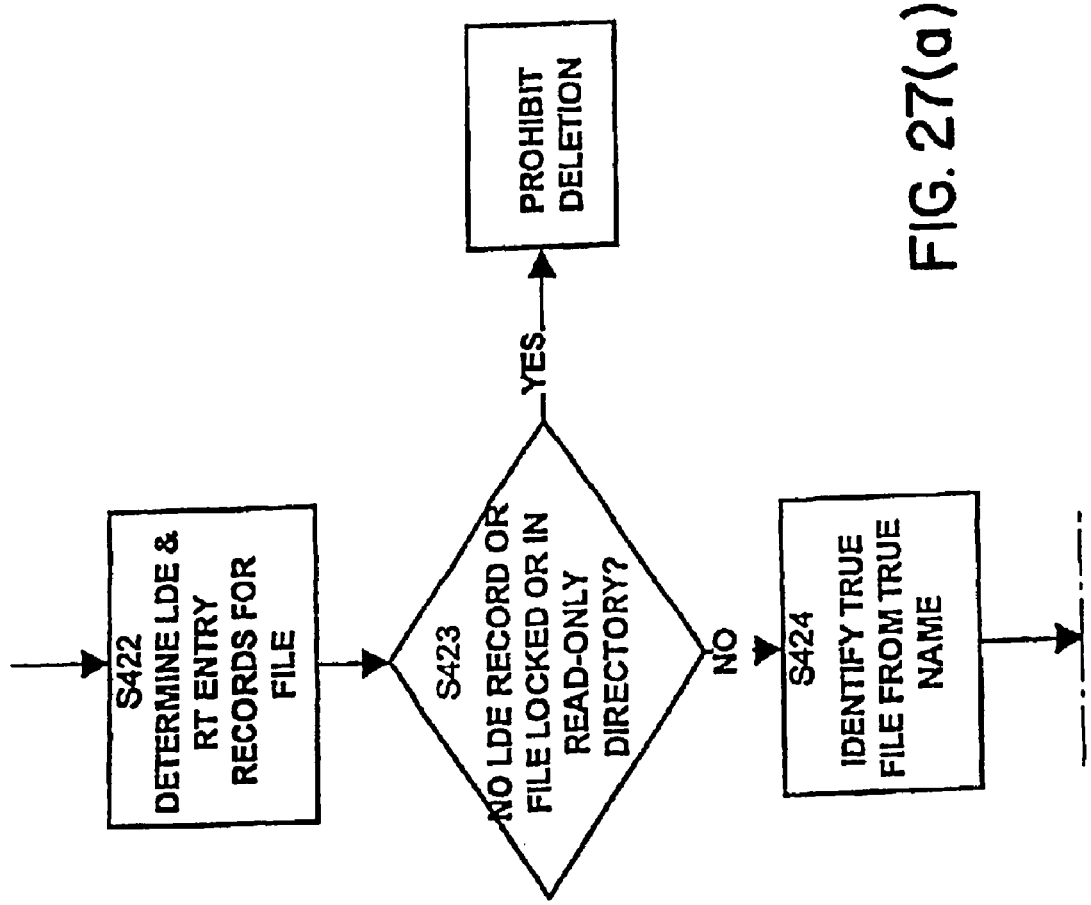
Figure 27B:
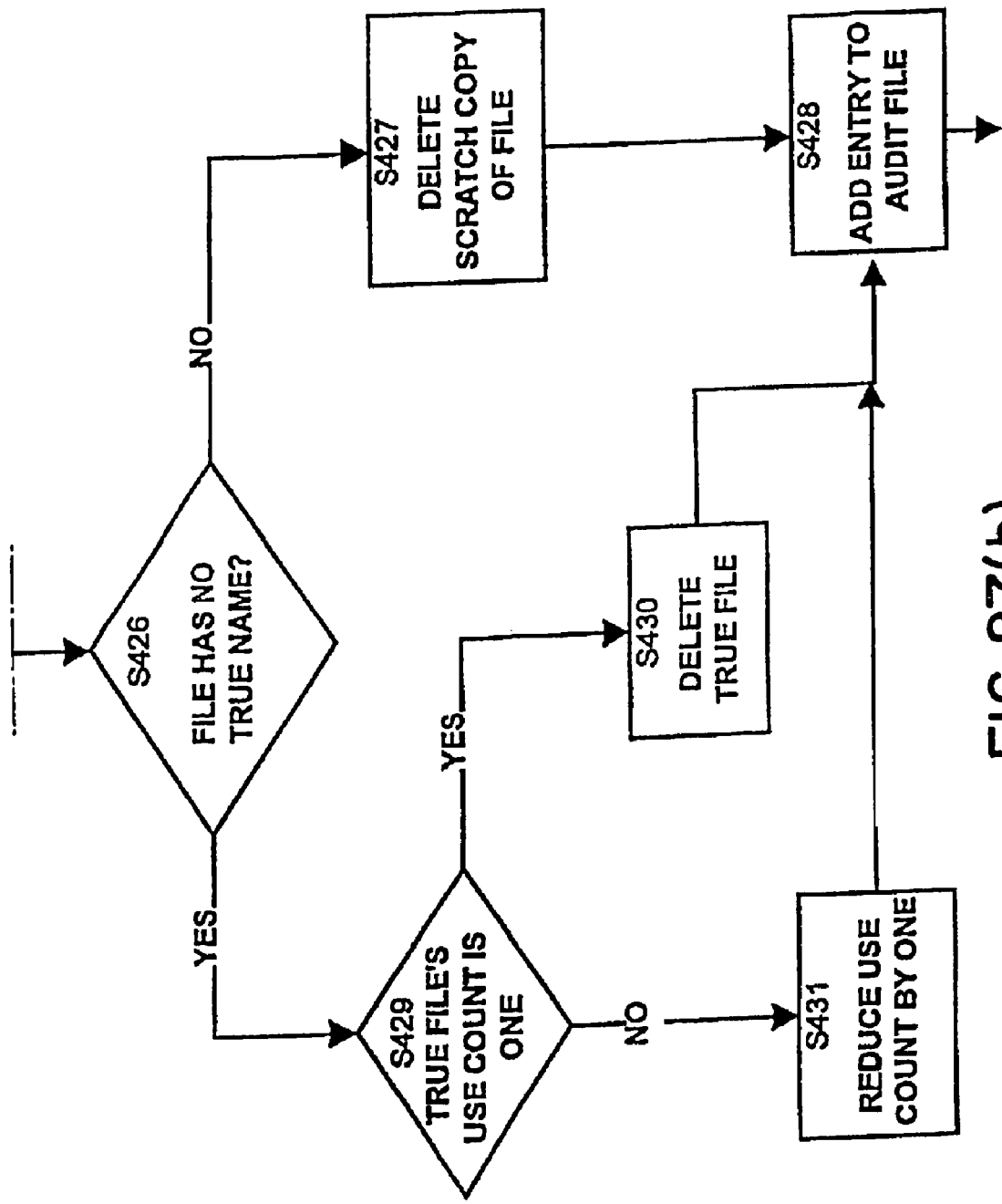

The process of deleting a file, for a given pathname, is described here with reference to FIGS. 27(a) and 27(b).

First, determine the local directory extensions table entry record 138 and region table entry record 142 for the file (Step S422). If the file has no local directory extensions table entry record 138 or is locked or is in a read-only region, prohibit the deletion.

Identify the corresponding True File given the True Name of the file being deleted using the True File registry 126 (Step S424). If the file has no True Name, (Step S426) then delete the scratch copy of the file based on its scratch file ID in the local directory extensions table 124 (Step S427), and continue with step S428.

If the file has a True Name and the True File's use count is one (Step S429), then delete the True File (Step S430), and continue with step S428.

If the file has a True Name and the True File's use count is greater than one, reduce its use count by one (Step S431). Then proceed with step S428.

In Step S428, delete the local directory extensions table entry record, and add an entry to the audit file 132 indicating the time and the operation performed (delete).

6. Copy File or Directory

A mechanism is provided to copy a file or directory given a source and destination processor and pathname. The Copy File mechanism does not actually copy the data in the file, only the True Name of the file. This mechanism is performed as follows:

(A) Given the source path, get the True Name from the path. If this step fails, the mechanism fails.
(B) Given the True Name and the destination path, link the destination path to the True Name.
(C) If the source and destination processors have different True File registries, find (or, if necessary, create) an entry for the True Name in the True File registry table 126 of the destination processor. Enter into the source ID field of this new entry the source processor identity.
(D) Add an entry to the audit file 132 indicating the time and operation performed (copy).

This mechanism addresses capability of the system to avoid copying data from a source location to a destination location when the destination already has the data. In addition, because of the ability to freeze a directory, this mechanism also addresses capability of the system immediately to make a copy of any collection of files, thereby to support an efficient version control mechanisms for groups of files.

7. Move File or Directory

A mechanism is described which moves (or renames) a file from a source path to a destination path. The move operation, like the copy operation, requires no actual transfer of data, and is performed as follows:

(A) Copy the file from the source path to the destination path.

(B) If the source path is different from the destination path, delete the source path.

8. Get File Status

This mechanism takes a file pathname and provides information about the pathname. First the local directory extensions table entry record 138 corresponding to the pathname given is found. If no such entry exists, then this mechanism fails, otherwise, gather information about the file and its corresponding True File from the local directory extensions table 124. The information can include any information shown in the data structures, including the size, type, owner, True Name, sources, time of last access, time of last modification, state (local or not, assimilated or not, compressed or not), use count, expiration date, and reservations.

9. Get Files in Directory

This mechanism enumerates the files in a directory. It is used (implicitly) whenever it is necessary to determine whether a file exists (is present) in a directory. For instance, it is implicitly used in the Open File, Delete File, Copy File or Directory, and Move File operating system mechanisms, because the files operated on are referred to by pathnames containing directory names. The mechanism works as follows:

The local directory extensions table 124 is searched for an entry 138 with the given directory pathname. If no such entry is found, or if the entry found is not a directory, then this mechanism fails.

If there is a corresponding True File field in the local directory extensions table record, then it is assumed that the True File represents a frozen directory. The Expand Frozen Directory primitive mechanism is used to expand the existing True File into directory entries in the local directory extensions table.

Finally, the local directory extensions table 124 is again searched, this time to find each directory subordinate to the given directory. The names found are provided as the result.

Remote Mechanisms

The remote mechanisms provided by the present invention are now described. Recall that remote mechanisms are used by the operating system in responding to requests from other processors. These mechanisms enable the capabilities of the present invention in a peer-to-peer network mode of operation.

In a presently preferred embodiment, processors communicate with each other using a remote procedure call (RPC) style interface, running over one of any number of communication protocols such as IPX/SPX or TCP/IP. Each peer processor which provides access to its True File registry 126 or file regions, or which depends on another peer processor, provides a number of mechanisms which can be used by its peers.

The following remote mechanisms are described:
1. Locate True File;
2. Reserve True File;
3. Request True File;
4. Retire True File;
5. Cancel Reservation;
6. Acquire True File;
7. Lock Cache;
8. Update Cache; and
9. Check Expiration Date.

1. Locate True File

This mechanism allows a remote processor to determine whether the local processor contains a copy of a specific True File. The mechanism begins with a True Name and a flag indicating whether to forward requests for this file to other servers. This mechanism is now described with reference to FIG. 28.

First determine if the True File is available locally or if there is some indication of where the True File is located (for example, in the Source IDs field). Look up the requested True Name in the True File registry 126 (Step S432).

If a True File registry entry record 140 is not found for this True Name (Step S434), and the flag indicates that the request is not to be forwarded (Step S436), respond negatively (Step S438). That is, respond to the effect that the True File is not available.

One the other hand, if a True File registry entry record 140 is not found (Step S434), and the flag indicates that the request for this True File is to be forwarded (Step S436), then forward a request for this True File to some other processors in the system (Step S442). If the source table for the current processor identifies one or more publishing servers which should have a copy of this True File, then forward the request to each of those publishing servers (Step S436).

If a True File registry entry record 140 is found for the required True File (Step S434), and if the entry includes a True File ID or Compressed File ID (Step S440), respond positively (Step S444). If the entry includes a True File ID then this provides the identity or disk location of the actual physical representation of the file or file segment required. If the entry include a Compressed File ID, then a compressed version of the True File may be stored instead of, or in addition to, an uncompressed version. This field provides the identity of the actual representation of the compressed version of the file.

If the True File registry entry record 140 is found (Step S434) but does not include a True File ID (the File ID is absent if the actual file is not currently present at the current location) (Step S440), and if the True File registry entry record 140 includes one or more source processors, and if the request can be forwarded, then forward the request for this True File to one or more of the source processors (Step S444).

2. Reserve True File

This mechanism allows a remote processor to indicate that it depends on the local processor for access to a specific True File. It takes a True Name as input. This mechanism is described here.

(A) Find the True File registry entry record 140 associated with the given True File. If no entry exists, reply negatively.

(B) If the True File registry entry record 140 does not include a True File ID or compressed File ID, and if the True File registry entry record 140 includes no source IDs for removable storage volumes, then this processor does not have access to a copy of the given file. Reply negatively.

(C) Add the ID of the sending processor to the list of dependent processors for the True File registry entry record 140. Reply positively, with an indication of whether the reserved True File is on line or off line.

3. Request True File

This mechanism allows a remote processor to request a copy of a True File from the local processor. It requires a True Name and responds positively by sending a True File back to the requesting processor. The mechanism operates as follows:

(A) Find the True File registry entry record 140 associated with the given True Name. If there is no such True File registry entry record 140, reply negatively.

(B) Make the True File local using the Make True File Local primitive mechanism. If this mechanism fails, the Request True File mechanism also fails.

(C) Send the local True File in either it is uncompressed or compressed form to the requesting remote processor. Note that if the True File is a compound file, the components are not sent.

(D) If the remote file is listed in the dependent process list of the True File registry entry record 140, remove it.

4. Retire True File

This mechanism allows a remote processor to indicate that it no longer plans to maintain a copy of a given True File. An alternate source of the True File can be specified, if, for instance, the True File is being moved from one server to another. It begins with a True Name, a requesting processor ID, and an optional alternate source. This mechanism operates as follows:

(A) Find a True Name entry in the True File registry 126. If there is no entry for this True Name, this mechanism's task is complete.

(B) Find the requesting processor on the source list and, if it is there, remove it.

(C) If an alternate source is provided, add it to the source list for the True File registry entry record 140.

(D) If the source list of the True File registry entry record 140 has no items in it, use the Locate Remote File primitive mechanism to search for another copy of the file. If it fails, raise a serious error.

5. Cancel Reservation

This mechanism allows a remote processor to indicate that it no longer requires access to a True File stored on the local processor. It begins with a True Name and a requesting processor ID and proceeds as follows:

(A) Find the True Name entry in the True File registry 126. If there is no entry for this True Name, this mechanism's task is complete.

(B) Remove the identity of the requesting processor from the list of dependent processors, if it appears.

(C) If the list of dependent processors becomes zero and the use count is also zero, delete the True File.

6. Acquire True File

This mechanism allows a remote processor to insist that a local processor make a copy of a specified True File. It is used, for example, when a cache client wants to write through a new version of a file. The Acquire True File mechanism begins with a data item and an optional True Name for the data item and proceeds as follows:

(A) Confirm that the requesting processor has the right to require the local processor to acquire data items. If not, send a negative reply.

(B) Make a local copy of the data item transmitted by the remote processor.

(C) Assimilate the data item into the True File registry of the local processor.

(D) If a True Name was provided with the file, the True Name calculation can be avoided, or the mechanism can verify that the file received matches the True Name sent.

(E) Add an entry in the dependent processor list of the true file registry record indicating that the requesting processor depends on this copy of the given True File.

(F) Send a positive reply.

7. Lock Cache

This mechanism allows a remote cache client to lock a local file so that local users or other cache clients cannot change it while the remote processor is using it. The mechanism begins with a pathname and proceeds as follows:

(A) Find the local directory extensions table entry record 138 of the specified pathname. If no such entry exists, reply negatively.

(B) If an local directory extensions table entry record 138 exists and is already locked, reply negatively that the file is already locked.

(C) If an local directory extensions table entry record 138 exists and is not locked, lock the entry. Reply positively.

8. Update Cache

This mechanism allows a remote cache client to unlock a local file and update it with new contents. It begins with a pathname and a True Name. The file corresponding to the True Name must be accessible from the remote processor. This mechanism operates as follows:

Find the local directory extensions table entry record 138 corresponding to the given pathname. Reply negatively if no such entry exists or if the entry is not locked.

Link the given pathname to the given True Name using the Link Path to True Name primitive mechanism.

Unlock the local directory extensions table entry record 138 and return positively.

9. Check Expiration Date

Return current or new expiration date and possible alternative source to caller.

Background Processes and Mechanisms

The background processes and mechanisms provided by the present invention are now described. Recall that background mechanisms are intended to run occasionally and at a low priority to provide automated management capabilities with respect to the present invention.

The following background mechanisms are described:
1. Mirror True File;
2. Groom Region;
3. Check for Expired Links;
4. Verify Region; and
5. Groom Source List.

1. Mirror True File

This mechanism is used to ensure that files are available in alternate locations in mirror groups or archived on archival servers. The mechanism depends on application-specific migration/archival criteria (size, time since last access, number of copies required, number of existing alternative sources) which determine under what conditions a file should be moved. The Mirror True File mechanism operates as follows, using the True File specified, perform the following steps:

(A) Count the number of available locations of the True File by inspecting the source list of the True File registry entry record 140 for the True File. This step determines how many copies of the True. File are available in the system.

(B) If the True File meets the specified migration criteria, select a mirror group server to which a copy of the file should be sent. Use the Acquire True File remote mechanism to copy the True File to the selected mirror group server. Add the identity of the selected system to the source list for the True File.

2. Groom Region

This mechanism is used to automatically free up space in a processor by deleting data items that may be available elsewhere. The mechanism depends on application-specific grooming criteria (for instance, a file may be removed if there is an alternate online source for it, it has not been accessed in a given number of days, and it is larger than a given size). This mechanism operates as follows:

Repeat the following steps (i) to (iii) with more aggressive grooming criteria until sufficient space is freed or until all grooming criteria have been exercised. Use grooming information to determine how much space has been freed. Recall that, while grooming is in effect, grooming information includes a table of pathnames selected for deletion, and keeps track of the amount of space that would be freed if all of the files were deleted.

(i) Begin Grooming (using the primitive mechanism).
(ii) For each pathname in the specified region, for the True File corresponding to the pathname, if the True File is present, has at least one alternative source, and meets application specific grooming criteria for the region, select the file for removal (using the primitive mechanism).
(iii) End Grooming (using the primitive mechanism).

If the region is used as a cache, no other processors are dependent on True Files to which it refers, and all such True Files are mirrored elsewhere. In this case, True Files can be removed with impunity. For a cache region, the grooming criteria would ordinarily eliminate the least recently accessed True Files first. This is best done by sorting the True Files in the region by the most recent access time before performing step (ii) above. The application specific criteria would thus be to select for removal every True File encountered (beginning with the least recently used) until the required amount of free space is reached.

3. Check for Expired Links

This mechanism is used to determine whether dependencies on published files should be refreshed. The following steps describe the operation of this mechanism:

For each pathname in the specified region, for each True File corresponding to the pathname, perform the following step:

If the True File registry entry record 140 corresponding to the True File contains at least one source which is a publishing server, and if the expiration date on the dependency is past or close, then perform the following steps:

(A) Determine whether the True File registry entry record contains other sources which have not expired.

(B) Check the True Name expiration of the server. If the expiration date has been extended, or an alternate source is suggested, add the source to the True File registry entry record 140.

(C) If no acceptable alternate source was found in steps (A) or (B) above, make a local copy of the True File.

(D) Remove the expired source.

4. Verify Region

This mechanism can be used to ensure that the data items in the True File registry 126 have not been damaged accidentally or maliciously. The operation of this mechanism is described by the following steps:

(A) Search the local directory extensions table 124 for each pathname in the specified region and then perform the following steps:
  (i) Get the True File name corresponding to the pathname;
  (ii) If the True File registry entry 140 for the True File does not have a True File ID or compressed file ID, ignore it.
  (iii) Use the Verify True File mechanism (see extended mechanisms below) to confirm that the True File specified is correct.

5. Groom Source List

The source list in a True File entry should be groomed sometimes to ensure there are not too many mirror or archive copies. When a file is deleted or when a region definition or its mirror criteria are changed, it may be necessary to inspect the affected True Files to determine whether there are too many mirror copies. This can be done with the following steps:

For each affected True File, (A) Search the local directory extensions table to find each region that refers to the True File.

(B) Create a set of "required sources", initially empty.

(C) For each region found,
  (a) determine the mirroring criteria for that region,
  (b) determine which sources for the True File satisfy the mirroring criteria, and
  (c) add these sources to the set of required sources.

(D) For each source in the True File registry entry, if the source identifies a remote processor (as opposed to removable media), and if the source is not a publisher, and if the source is not in the set of required sources, then eliminate the source, and use the Cancel Reservation remote mechanism to eliminate the given processor from the list of dependent processors recorded at the remote processor identified by the source.

Extended Mechanisms

The extended mechanisms provided by the present invention are now described. Recall that extended mechanisms run within application programs over the operating system to provide solutions to specific problems and applications.

The following extended mechanisms are described:
1. Inventory Existing Directory;
2. Inventory Removable, Read-only Files;
3. Synchronize Directories;
4. Publish Region;
5. Retire Directory;
6. Realize Directory at Location;
7. Verify True File;
8. Track for Accounting Purposes; and
9. Track for Licensing Purposes.

1. Inventory Existing Directory

This mechanism determines the True Names of files in an existing on-line directory in the underlying operating system. One purpose of this mechanism is to install True Name mechanisms in an existing file system.

An effect of such an installation is to eliminate immediately all duplicate files from the file system being traversed. If several file systems are inventoried in a single True File registry, duplicates across the volumes are also eliminated.

(A) Traverse the underlying file system in the operating system. For each file encountered, excluding directories, perform the following:
  (i) Assimilate the file encountered (using the Assimilate File primitive mechanism). This process computes its True Name and moves its data into the True File registry 126.
  (ii) Create a pathname consisting of the path to the volume directory and the relative path of the file on the media. Link this path to the computed True Name using the Link Path to True Name primitive mechanism.

2. Inventory Removable, Read-only Files

A system with access to removable, read-only media volumes (such as WORM disks and CD-ROMs) can create a usable inventory of the files on these disks without having to make online copies. These objects can then be used for archival purposes, directory overlays, or other needs. An operator must request that an inventory be created for such a volume.

This mechanism allows for maintaining inventories of the contents of files and data items on removable media, such as diskettes and CD-ROMs, independent of other properties of the files such as name, location, and date of creation.

The mechanism creates an online inventory of the files on one or more removable volumes, such as a floppy disk or CD-ROM, when the data on the volume is represented as a directory. The inventory service uses a True Name to identify each file, providing a way to locate the data independent of its name, date of creation, or location.

The inventory can be used for archival of data (making it possible to avoid archiving data when that data is already on a separate volume), for grooming (making it possible to delete infrequently accessed files if they can be retrieved from removable volumes), for version control (making it possible to generate a new version of a CD-ROM without having to copy the old version), and for other purposes.

The inventory is made by creating a volume directory in the media inventory in which each file named identifies the data item on the volume being inventoried. Data items are not copied from the removable volume during the inventory process.

An operator must request that an inventory be created for a specific volume. Once created, the volume directory can be frozen or copied like any other directory. Data items from either the physical volume or the volume directory can be accessed using the Open File operating system mechanism which will cause them to be read from the physical volume using the Realize True File from Location primitive mechanism.

To create an inventory the following steps are taken:

(A) A volume directory in the media inventory is created to correspond to the volume being inventoried. Its contextual name identifies the specific volume.

(B) A source table entry 144 for the volume is created in the source table 130. This entry 144 identifies the physical source volume and the volume directory created in step (A).

(C) The filesystem on the volume is traversed. For each file encountered, excluding directories, the following steps are taken:
  (i) The True Name of the file is computed. An entry is created in the True Name registry 124, including the True Name of the file using the primitive mechanism. The source field of the True Name registry entry 140 identifies the source table entry 144.
  (ii) A pathname is created consisting of the path to the volume directory and the relative path of the file on the media. This path is linked to the computed True Name using Link Path to True Name primitive mechanism.

(D) After all files have been inventoried, the volume directory is frozen. The volume directory serves as a table of contents for the volume. It can be copied using the Copy File or Directory primitive mechanism to create an "overlay" directory which can then be modified, making it possible to edit a virtual copy of a read-only medium.

3. Synchronize Directories

Given two versions of a directory derived from the same starting point, this mechanism creates a new, synchronized version which includes the changes from each. Where a file is changed in both versions, this mechanism provides a user exit for handling the discrepancy. By using True Names, comparisons are instantaneous, and no copies of files are necessary.

This mechanism lets a local processor synchronize a directory to account for changes made at a remote processor. Its purpose is to bring a local copy of a directory up to date after a period of no communication between the local and remote processor. Such a period might occur if the local processor were a mobile processor detached from its server, or if two distant processors were run independently and updated nightly.

An advantage of the described synchronization process is that it does not depend on synchronizing the clocks of the local and remote processors. However, it does require that the local processor track its position in the remote processor's audit file.

This mechanism does not resolve changes made simultaneously to the same file at several sites. If that occurs, an external resolution mechanism such as, for example, operator intervention, is required.

The mechanism takes as input a start time, a local directory pathname, a remote processor name, and a remote directory pathname name, and it operates by the following steps:

(A) Request a copy of the audit file 132 from the remote processor using the Request True File remote mechanism.

(B) For each entry 146 in the audit file 132 after the start time, if the entry indicates a change to a file in the remote directory, perform the following steps:
  (i) Compute the pathname of the corresponding file in the local directory. Determine the True Name of the corresponding file.
  (ii) If the True Name of the local file is the same as the old True Name in the audit file, or if there is no local file and the audit entry indicates a new file is being created, link the new True Name in the audit file to the local pathname using the Link Path to True Name primitive mechanism.

(iii) Otherwise, note that there is a problem with the synchronization by sending a message to the operator or to a problem resolution program, indicating the local pathname, remote pathname, remote processor, and time of change.

(C) After synchronization is complete, record the time of the final change. This time is to be used as the new start time the next time this directory is synchronized with the same remote processor.

4. Publish Region

The publish region mechanism allows a processor to offer the files in a region to any client processors for a limited period of time.

The purpose of the service is to eliminate any need for client processors to make reservations with the publishing processor. This in turn makes it possible for the publishing processor to service a much larger number of clients.

When a region is published, an expiration date is defined for all files in the region, and is propagated into the publishing system's True File registry entry record 140 for each file.

When a remote file is copied, for instance using the Copy File operating system mechanism, the expiration date is copied into the source field of the client's True File registry entry record 140. When the source is a publishing system, no dependency need be created.

The client processor must occasionally and in background, check for expired links, to make sure it still has access to these files. This is described in the background mechanism Check for Expired Links.

5. Retire Directory

This mechanism makes it possible to eliminate safely the True Files in a directory, or at least dependencies on them, after ensuring that any client processors depending on those files remove their dependencies. The files in the directory are not actually deleted by this process. The directory can be deleted with the Delete File operating system mechanism.

The mechanism takes the pathname of a given directory, and optionally, the identification of a preferred alternate source processor for clients to use. The mechanism performs the following steps:

(A) Traverse the directory. For each file in the directory, perform the following steps:
  (i) Get the True Name of the file from its path and find the True File registry entry 140 associated with the True Name.
  (ii) Determine an alternate source for the True File. If the source IDs field of the TFR entry includes the preferred alternate source, that is the alternate source. If it does not, but includes some other source, that is the alternate source. If it contains no alternate sources, there is no alternate source.
  (iii) For each dependent processor in the True File registry entry 140, ask that processor to retire the True File, specifying an alternate source if one was determined, using the remote mechanism.

6. Realize Directory at Location

This mechanism allows the user or operating system to force copies of files from some source location to the True File registry 126 at a given location. The purpose of the mechanism is to ensure that files are accessible in the event the source location becomes inaccessible. This can happen for instance if the source or given location are on mobile computers, or are on removable media, or if the network connection to the source is expected to become unavailable, or if the source is being retired.

This mechanism is provided in the following steps for each file in the given directory, with the exception of subdirectories:

(A) Get the local directory extensions table entry record 138 given the pathname of the file. Get the True Name of the local directory extensions table entry record 138. This service assimilates the file if it has not already been assimilated.

(B) Realize the corresponding True File at the given location. This service causes it to be copied to the given location from a remote system or removable media.

7. Verify True File

This mechanism is used to verify that the data item in a True File registry 126 is indeed the correct data item given its True Name. Its purpose is to guard against device errors, malicious changes, or other problems.

If an error is found, the system has the ability to "heal" itself by finding another source for the True File with the given name. It may also be desirable to verify that the error has not propagated to other systems, and to log the problem or indicate it to the computer operator. These details are not described here.

To verify a data item that is not in a True File registry 126, use the Calculate True Name primitive mechanism described above.

The basic mechanism begins with a True Name, and operates in the following steps:

(A) Find the True File registry entry record 140 corresponding to the given True Name.

(B) If there is a True File ID for the True File registry entry record 140 then use it. Otherwise, indicate that no file exists to verify.

(C) Calculate the True Name of the data item given the file ID of the data item.

(D) Confirm that the calculated True Name is equal to the given True Name.

(E) If the True Names are not equal, there is an error in the True File registry 126. Remove the True File ID from the True File registry entry record 140 and place it somewhere else. Indicate that the True File registry entry record 140 contained an error.

8. Track for Accounting Purposes

This mechanism provides a way to know reliably which files have been stored on a system or transmitted from one system to another. The mechanism can be used as a basis for a value-based accounting system in which charges are based on the identity of the data stored or transmitted, rather than simply on the number of bits.

This mechanism allows the system to track possession of specific data items according to content by owner, independent of the name, date, or other properties of the data item, and tracks the uses of specific data items and files by content for accounting purposes. True names make it possible to identify each file briefly yet uniquely for this purpose.

Tracking the identities of files requires maintaining an accounting log 134 and processing it for accounting or billing purposes. The mechanism operates in the following steps:

(A) Note every time a file is created or deleted, for instance by monitoring audit entries in the Process Audit File Entry primitive mechanism. When such an event is encountered, create an entry 148 in the accounting log 134 that shows the responsible party and the identity of the file created or deleted.

(B) Every time a file is transmitted, for instance when a file is copied with a Request True File remote mechanism or an Acquire True File remote mechanism, create an entry in the accounting log 134 that shows the responsible party, the identity of the file, and the source and destination processors.

(C) Occasionally run an accounting program to process the accounting log 134, distributing the events to the account records of each responsible party. The account records can eventually be summarized for billing purposes.

9. Track for Licensing Purposes

This mechanism ensures that licensed files are not used by unauthorized parties. The True Name provides a safe way to identify licensed material. This service allows proof of possession of specific files according to their contents without disclosing their contents.

Enforcing use of valid licenses can be active (for example, by refusing to provide access to a file without authorization) or passive (for example, by creating a report of users who do not have proper authorization).

One possible way to perform license validation is to perform occasional audits of employee systems. The service described herein relies on True Names to support such an audit, as in the following steps:

(A) For each licensed product, record in the license table 136 the True Name of key files in the product (that is, files which are required in order to use the product, and which do not occur in other products) Typically, for a software product, this would include the main executable image and perhaps other major files such as clip-art, scripts, or online help. Also record the identity of each system which is authorized to have a copy of the file.

(B) Occasionally, compare the contents of each user processor against the license table 136. For each True Name in the license table do the following:

(i) Unless the user processor is authorized to have a copy of the file, confirm that the user processor does not have a copy of the file using the Locate True File mechanism.

(ii) If the user processor is found to have a file that it is not authorized to have, record the user processor and True Name in a license violation table.

The System in Operation

Given the mechanisms described above, the operation of a typical DP system employing these mechanisms is now described in order to demonstrate how the present invention meets its requirements and capabilities.

In operation, data items (for example, files, database records, messages, data segments, data blocks, directories, instances of object classes, and the like) in a DP system employing the present invention are identified by substantially unique identifiers (True Names), the identifiers depending on all of the data in the data items and only on the data in the data items. The primitive mechanisms Calculate True Name and Assimilate Data Item support this property. For any given data item, using the Calculate True Name primitive mechanism, a substantially unique identifier or True Name for that data item can be determined.

Further, in operation of a DP system incorporating the present invention, multiple copies of data items are avoided (unless they are required for some reason such as backups or mirror copies in a fault-tolerant system). Multiple copies of data items are avoided even when multiple names refer to the same data item. The primitive mechanisms Assimilate Data Items and New True File support this property. Using the Assimilate Data Item primitive mechanism, if a data item already exists in the system, as indicated by an entry in the True File registry 126, this existence will be discovered by this mechanism, and the duplicate data item (the new data item) will be eliminated (or not added). Thus, for example, if a data file is being copied onto a system from a floppy disk, if, based on the True Name of the data file, it is determined that the data file already exists in the system (by the same or some other name), then the duplicate copy will not be installed. If the data item was being installed on the system by some name other than its current name, then, using the Link Path to True Name primitive mechanism, the other (or new) name can be linked to the already existing data item.

In general, the mechanisms of the present invention operate in such a way as to avoid recreating an actual data item at a location when a copy of that data item is already present at that location. In the case of a copy from a floppy disk, the data item (file) may have to be copied (into a scratch file) before it can be determined that it is a duplicate. This is because only one processor is involved. On the other hand, in a multiprocessor environment or DP system, each processor has a record of the True Names of the data items on that processor. When a data item is to be copied to another location (another processor) in the DP system, all that is necessary is to examine the True Name of the data item prior to the copying. If a data item with the same True Name already exists at the destination location (processor), then there is no need to copy the data item. Note that if a data item which already exists locally at a destination location is still copied to the destination location (for example, because the remote system did not have a True Name for the data item or because it arrives as a stream of un-named data), the Assimilate Data Item primitive mechanism will prevent multiple copies of the data item from being created.

Since the True Name of a large data item (a compound data item) is derived from and based on the True Names of components of the data item, copying of an entire data item can be avoided. Since some (or all) of the components of a large data item may already be present at a destination location, only those components which are not present there need be copied. This property derives from the manner in which True Names are determined.

When a file is copied by the Copy File or Directory operating system mechanism, only the True Name of the file is actually replicated.

When a file is opened (using the Open File operating system mechanism), it uses the Make True File Local primitive mechanism (either directly or indirectly through the Create Scratch File primitive mechanism) to create a local copy of the file. The Open File operating system mechanism uses the Make True File Local primitive mechanism, which uses the Realize True File from Location primitive mechanism, which, in turn uses the Request True File remote mechanism.

The Request True File remote mechanism copies only a single data item from one processor to another. If the data item is a compound file, its component segments are not copied, only the indirect block is copied. The segments are copied only when they are read (or otherwise needed).

The Read File operating system mechanism actually reads data. The Read File mechanism is aware of compound files and indirect blocks, and it uses the Realize True File from Location primitive mechanism to make sure that component segments are locally available, and then uses the operating system file mechanisms to read data from the local file.

Thus, when a compound file is copied from a remote system, only its True Name is copied. When it is opened, only its indirect block is copied. When the corresponding file is read, the required component segments are realized and therefore copied.

In operation data items can be accessed by reference to their identities (True Names) independent of their present location. The actual data item or True File corresponding to a given data identifier or True Name may reside anywhere in the system (that is, locally, remotely, offline, etc). If a required True File is present locally, then the data in the file can be accessed. If the data item is not present locally, there are a number of ways in which it can be obtained from wherever it is present. Using the source IDs field of the True File registry table, the location(s) of copies of the True File corresponding to a given True Name can be determined. The Realize True File from Location primitive mechanism tries to make a local copy of a True File, given its True Name and the name of a source location (processor or media) that may contain the True File. If, on the other hand, for some reason it is not known where there is a copy of the True File, or if the processors identified in the source IDs field do not respond with the required True File, the processor requiring the data item can make a general request for the data item using the Request True File remote mechanism from all processors in the system that it can contact.

As a result, the system provides transparent access to any data item by reference to its data identity, and independent of its present location.

In operation, data items in the system can be verified and have their integrity checked. This is from the manner in which True Names are determined. This can be used for security purposes, for instance, to check for viruses and to verify that data retrieved from another location is the desired, and requested data. For example, the system might store the True Names of all executable applications on the system and then periodically redetermine the True Names of each of these applications to ensure that they match the stored True Names. Any change in a True Name potentially signals corruption in the system and can be further investigated. The Verify Region background mechanism and the Verify True File extended mechanisms provide direct support for this mode of operation. The Verify Region mechanism is used to ensure that the data items in the True File registry have not been damaged accidentally or maliciously. The Verify True File mechanism verifies that a data item in a True File registry is indeed the correct data item given its True Name.

Once a processor has determined where (that is, at which other processor or location) a copy of a data item is in the DP system, that processor might need that other processor or location to keep a copy of that data item. For example, a processor might want to delete local copies of data items to make space available locally while knowing that it can rely on retrieving the data from somewhere else when needed. To this end the system allows a processor to Reserve (and cancel the reservation of) True Files at remote locations (using the remote mechanism). In this way the remote locations are put on notice that another location is relying on the presence of the True File at their location.

A DP system employing the present invention can be made into a fault-tolerant system by providing a certain amount of redundancy of data items at multiple locations in the system. Using the Acquire True File and Reserve True File remote mechanisms, a particular processor can implement its own form of fault-tolerance by copying data items to other processors and then reserving them there. However, the system also provides the Mirror True File background mechanism to mirror (make copies) of the True File available elsewhere in the system. Any degree of redundancy (limited by the number of processors or locations in the system) can be implemented. As a result, this invention maintains a desired degree or level of redundancy in a network of processors, to protect against failure of any particular processor by ensuring that multiple copies of data items exist at different locations.

The data structures used to implement various features and mechanisms of this invention store a variety of useful information which can be used, in conjunction with the various mechanisms, to implement storage schemes and policies in a DP system employing the invention. For example, the size, age and location of a data item (or of groups of data items) is provided. This information can be used to decide how the data items should be treated. For example, a processor may implement a policy of deleting local copies of all data items over a certain age if other copies of those data items are present elsewhere in the system. The age (or variations on the age) can be determined using the time of last access or modification in the local directory extensions table, and the presence of other copies of the data item can be determined either from the Safe Flag or the source IDs, or by checking which other processors in the system have copies of the data item and then reserving at least one of those copies.

In operation, the system can keep track of data items regardless of how those items are named by users (or regardless of whether the data items even have names). The system can also track data items that have different names (in different or the same location) as well as different data items that have the same name. Since a data item is identified by the data in the item, without regard for the context of the data, the problems of inconsistent naming in a DP system are overcome.

In operation, the system can publish data items, allowing other, possibly anonymous, systems in a network to gain access to the data items and to rely on the availability of these data items. True Names are globally unique identifiers which can be published simply by copying them. For example, a user might create a textual representation of a file on system A with True Name N (for instance as a hexadecimal string), and post it on a computer bulletin board. Another user on system B could create a directory entry F for this True Name N by using the Link Path to True Name primitive mechanism. (Alternatively, an application could be developed which hides the True Name from the users, but provides the same public transfer service.)

When a program on system B attempts to open pathname F linked to True Name N, the Locate Remote File primitive mechanism would be used, and would use the Locate True File remote mechanism to search for True Name N on one or more remote processors, such as system A. If system B has access to system A, it would be able to realize the True File (using the Realize True File from Location primitive mechanism) and use it locally. Alternatively, system B could find True Name N by accessing any publicly available True Name server, if the server could eventually forward the request to system A.

Clients of a local server can indicate that they depend on a given True File (using the Reserve True File remote mechanism) so that the True File is not deleted from the server registry as long as some client requires access to it. (The Retire True File remote mechanism is used to indicate that a client no longer needs a given True File.)

A publishing server, on the other hand, may want to provide access to many clients, and possibly anonymous ones, without incurring the overhead of tracking dependencies for each client. Therefore, a public server can provide expiration dates for True Files in its registry. This allows client systems to safely maintain references to a True File on the public server. The Check For Expired Links background mechanism allows the client of a publishing server to occasionally confirm that its dependencies on the publishing server are safe.

In a variation of this aspect of the invention, a processor that is newly connected (or reconnected after some absence) to the system can obtain a current version of all (or of needed) data in the system by requesting it from a server processor. Any such processor can send a request to update or resynchronize all of its directories (starting at a root directory), simply by using the Synchronize Directories extended mechanism on the needed directories.

Using the accounting log or some other user provided mechanism, a user can prove the existence of certain data items at certain times. By publishing (in a public place) a list of all True Names in the system on a given day (or at some given time), a user can later refer back to that list to show that a particular data item was present in the system at the time that list was published. Such a mechanism is useful in tracking, for example, laboratory notebooks or the like to prove dates of conception of inventions. Such a mechanism also permits proof of possession of a data item at a particular date and time.

The accounting log file can also track the use of specific data items and files by content for accounting purposes. For instance, an information utility company can determine the data identities of data items that are stored and transmitted through its computer systems, and use these identities to provide bills to its customers based on the identities of the data items being transmitted (as defined by the substantially unique identifier). The assignment of prices for storing and transmitting specific True Files would be made by the information utility and/or its data suppliers; this information would be joined periodically with the information in the accounting log file to produce customer statements.

Backing up data items in a DP system employing the present invention can be done based on the True Names of the data items. By tracking backups using True Names, duplication in the backups is prevented. In operation, the system maintains a backup record of data identifiers of data items already backed up, and invokes the Copy File or Directory operating system mechanism to copy only those data items whose data identifiers are not recorded in the backup record. Once a data item has been backed up, it can be restored by retrieving it from its backup location, based on the identifier of the data item. Using the backup record produced by the backup to identify the data item, the data item can be obtained using, for example, the Make True File Local primitive mechanism.

In operation, the system can be used to cache data items from a server, so that only the most recently accessed data items need be retained. To operate in this way, a cache client is configured to have a local registry (its cache) with a remote Local Directory Extensions table (from the cache server). Whenever a file is opened (or read), the Local Directory Extensions table is used to identify the True Name, and the Make True File Local primitive mechanism inspects the local registry. When the local registry already has a copy, the file is already cached. Otherwise, the Locate True File remote mechanism is used to get a copy of the file. This mechanism consults the cache server and uses the Request True File remote mechanism to make a local copy, effectively loading the cache.

The Groom Cache background mechanism flushes the cache, removing the least-recently-used files from the cache client's True File registry. While a file is being modified on a cache client, the Lock Cache and Update Cache remote mechanisms prevent other clients from trying to modify the same file.

In operation, when the system is being used to cache data items, the problems of maintaining cache consistency are avoided.

To access a cache and to fill it from its server, a key is required to identify the data item desired. Ordinarily, the key is a name or address (in this case, it would be the pathname of a file). If the data associated with such a key is changed, the client's cache becomes inconsistent; when the cache client refers to that name, it will retrieve the wrong data. In order to maintain cache consistency it is necessary to notify every client immediately whenever a change occurs on the server.

By using an embodiment of the present invention, the cache key uniquely identifies the data it represents. When the data associated with a name changes, the key itself changes. Thus, when a cache client wishes to access the modified data associated with a given file name, it will use a new key (the True Name of the new file) rather than the key to the old file contents in its cache. The client will always request the correct data, and the old data in its cache will be eventually aged and flushed by the Groom Cache background mechanism.

Because it is not necessary to immediately notify clients when changes on the cache server occur, the present invention makes it possible for a single server to support a much larger number of clients than is otherwise possible.

In operation, the system automatically archives data items as they are created or modified. After a file is created or modified, the Close File operating system mechanism creates an audit file record, which is eventually processed by the Process Audit File Entry primitive mechanism. This mechanism uses the New True File primitive mechanism for any file which is newly created, which in turn uses the Mirror True File background mechanism if the True File is in a mirrored or archived region. This mechanism causes one or more copies of the new file to be made on remote processors.

In operation, the system can efficiently record and preserve any collection of data items. The Freeze Directory primitive mechanism creates a True File which identifies all of the files in the directory and its subordinates. Because this True File includes the True Names of its constituents, it represents the exact contents of the directory tree at the time it was frozen. The frozen directory can be copied with its components preserved.

The Acquire True File remote mechanism (used in mirroring and archiving) preserves the directory tree structure by ensuring that all of the component segments and True Files in a compound data item are actually copied to a remote system. Of course, no transfer is necessary for data items already in the registry of the remote system.

In operation, the system can efficiently make a copy of any collection of data items, to support a version control mechanism for groups of the data items.

The Freeze Directory primitive mechanism is used to create a collection of data items. The constituent files and segments referred to by the frozen directory are maintained in the registry, without any need to make copies of the constituents each time the directory is frozen.

Whenever a pathname is traversed, the Get Files in Directory operating system mechanism is used, and when it encounters a frozen directory, it uses the Expand Frozen Directory primitive mechanism.

A frozen directory can be copied from one pathname to another efficiently, merely by copying its True Name. The Copy File operating system mechanism is used to copy a frozen directory.

Thus it is possible to efficiently create copies of different versions of a directory, thereby creating a record of its history (hence a version control system).

In operation, the system can maintain a local inventory of all the data items located on a given removable medium, such as a diskette or CD-ROM. The inventory is independent of other properties of the data items such as their name, location, and date of creation.

The Inventory Existing Directory extended mechanism provides a way to create True File Registry entries for all of the files in a directory. One use of this inventory is as a way to pre-load a True File registry with backup record information. Those files in the registry (such as previously installed software) which are on the volumes inventoried need not be backed up onto other volumes.

The Inventory Removable, Read-only Files extended mechanism not only determines the True Names for the files on the medium, but also records directory entries for each file in a frozen directory structure. By copying and modifying this directory, it is possible to create an on line patch, or small modification of an existing read-only file. For example, it is possible to create an online representation of a modified CD-ROM, such that the unmodified files are actually on the CD-ROM, and only the modified files are online.

In operation, the system tracks possession of specific data items according to content by owner, independent of the name, date, or other properties of the data item, and tracks the uses of specific data items and files by content for accounting purposes. Using the Track for Accounting Purposes extended mechanism provides a way to know reliably which files have been stored on a system or transmitted from one system to another.

True Names in Relational and Object-Oriented Databases

Although the preferred embodiment of this invention has been presented in the context of a file system, the invention of True Names would be equally valuable in a relational or object-oriented database. A relational or object-oriented database system using True Names would have similar benefits to those of the file system employing the invention. For instance, such a database would permit efficient elimination of duplicate records, support a cache for records, simplify the process of maintaining cache consistency, provide location-independent access to records, maintain archives and histories of records, and synchronize with distant or disconnected systems or databases.

The mechanisms described above can be easily modified to serve in such a database environment. The True Name registry would be used as a repository of database records. All references to records would be via the True Name of the record. (The Local Directory Extensions table is an example of a primary index that uses the True Name as the unique identifier of the desired records.)

In such a database, the operations of inserting, updating, and deleting records would be implemented by first assimilating records into the registry, and then updating a primary key index to map the key of the record to its contents by using the True Name as a pointer to the contents.

The mechanisms described in the preferred embodiment, or similar mechanisms, would be employed in such a system. These mechanisms could include, for example, the mechanisms for calculating true names, assimilating, locating, realizing, deleting, copying, and moving True Files, for mirroring True Files, for maintaining a cache of True Files, for grooming True Files, and other mechanisms based on the use of substantially unique identifiers.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method in a system which includes a network of computers, the method implemented at least in part by hardware comprising at least one processor, the method comprising the steps:
    (a) at a first computer, obtaining a content-based name for a particular data item from a second computer distinct from the first computer, the content-based name being based at least in part on a function of at least some of the data which comprise the contents of the particular data item, wherein the function comprises a message digest function or a hash function, and wherein two identical data items will have the same content-based name; and
    (b) by hardware in combination with software, a processor at said first computer ascertaining whether or not the content-based name for the particular data item corresponds to an entry in a database comprising a plurality of identifiers; and
    (c) based at least in part on said ascertaining in (b), determining whether or not access to the particular data item is authorized.

2. A method as recited in claim 1 further comprising:
    (d) based at least in part on said determining in (c), causing access to the particular data item to be denied when it is determined that access to the particular data item is not authorized.

3. A method as recited in claim 1 wherein the content-based name for the particular data item was included in a request to access the particular data item, the request having been received from a particular requestor, and wherein said step (c) of determining comprises: determining whether or not the particular requestor is authorized.

4. A method as recited in claim 3 further comprising:
    if it is determined that the particular requestor is not authorized, causing the particular requestor's request to access the particular data item to be denied.

5. A method as recited in claim 1 wherein said database comprises a table or a list comprising said plurality of identifiers.

6. A method as recited in claim 1 wherein the plurality of identifiers in the database are identifiers of licensed content items, and wherein the identifier of each licensed content item is based at least in part on the function of at least some of the data comprising the licensed content item.

7. A method as recited in claim 1 further comprising:
    (d) collecting information regarding the particular data item.

8. A method as recited in claim 7, wherein the information collected includes at least one of: (a) information about which data items have been stored on a computer; (b) information about the content of the particular data item, (c) information about an owner of the particular data item, (d) information about a type of particular data item, (e) information about a contextual name of the particular data item, (f) information about whether the particular data item was copied; (g) the content-based name of the particular data item; (h) information about an identity of a requestor; (i) a timestamp; (j) information about whether the particular data item was created; and (k) information about whether the particular data item was read.

9. A method as recited in claim 7 wherein at least some of the information collected is maintained for accounting or billing purposes.

10. A method as recited in claim 1 further comprising:
    (d) tracking identities of data items.

11. A method as recited in claim 1 wherein the content-based name of the particular data item is based, at least in part, on a function of all of the data which comprise the contents of the particular data item.

12. A method as recited in claim 1 wherein the message digest function or hash function is selected from the functions: MD4, MD5, and SHA.

13. A method as recited in claim 1 wherein the content-based name of the particular data item is a True Name of the particular data item.

14. A method as recited in claim 1 wherein the particular data item is selected from the group comprising: a file, a portion of a file, a page in memory, a digital message, a portion of a digital message, a digital image, a portion of a digital image, a video signal, a portion of a video signal, an audio signal, a portion of an audio signal, a software product, and a portion of a software product.

15. A method as recited in claim 1 wherein at least some computers make up part of a peer-to-peer network of computers.

16. A method as recited in claim 1 further comprising:
    (d) authorizing access to the particular data item when it is not determined that the data item is unauthorized.

17. A method as recited in claim 16 wherein the authorized access permits copying of the particular data item to or from at least one of the computers in said network of computers.

18. A method as recited in claim 16 wherein the content-based name of the particular data item is received at the first computer and wherein, if it is not determined that said particular data item is unauthorized, access to the data item is permitted from at least one of a plurality of computers distinct from the first computer.

19. A method as recited in claim 16 wherein, if it is not determined that access to said particular data item is unauthorized, access to the data item is permitted from more than one of a plurality of computers in the network of computers.

20. A computer-implemented method operable in a system which includes a plurality of computers, the method comprising:

controlling distribution of content from a first computer to at least one other computer, in response to a request obtained by a first device in the system from a second device in the system, the first device comprising hardware including at least one processor, the request including at least a content-dependent name of a particular data item, the content-dependent name being based at least in part on a function of at least some of the data comprising the particular data item, wherein the function comprises a message digest function or a hash function, and wherein two identical data items will have the same content-dependent name, based at least in part on said content-dependent name of said particular data item, the first device (A) permitting the content to be provided to or accessed by the at least one other computer if it is not determined that the content is unauthorized or unlicensed, otherwise, (B) if it is determined that the content is unauthorized or unlicensed, not permitting the content to be provided to or accessed by the at least one other computer.

21. A computer-implemented method implemented at least in part by hardware comprising one or more processors, the method comprising:

(a) obtaining a list of content-dependent names, one for each of a plurality of data items, wherein, for each particular data item of the plurality of data items, the corresponding content-dependent name for that particular data item is based at least in part on a function of at least some of the contents of the particular data item, wherein the function comprises a message digest function or a hash function, and wherein two identical data items have the same content-dependent name on the list of content-dependent names;

(b) receiving at a first location, and from a second location distinct from said first location, a content-dependent identifier corresponding to a particular data item, said content-dependent identifier being based at least in part on at least some of the contents of the particular data item;

(c) at said first location, by a processor, in combination with software, determining, based at least in part on said content-dependent identifier for said particular data item, and using said list of content-dependent names, whether a requestor may access the particular data item; and (d) based on said determining in (c), if it is determined that the requestor may not access the particular data item, causing access to the particular data item to be denied.

22. A method as recited in claim 21 wherein the list of content-dependent names comprises a list of True Names of authorized data items and wherein the content-dependent identifier of the particular data item is a True Name of the particular data item.

23. A method as recited in claim 21 wherein at least some of said computers make up part of a peer-to-peer network of computers.

24. A computer-implemented method implemented at least in part by hardware comprising one or more processors, the method comprising:

(a) using a processor, receiving at a first computer from a second computer, a request regarding a particular data item, said request including at least a content-dependent name for the particular data item, the content-dependent name being based, at least in part, on at least a function of the data in the particular data item, wherein the data used by the function to determine the content-dependent name comprises at least some of the contents of the particular data item, wherein the function that was used comprises a message digest function or a hash function, and wherein two identical data items will have the same content-dependent name; and (b) in response to said request:
(i) causing the content-dependent name of the particular data item to be compared to a plurality of values;
(ii) hardware in combination with software determining whether or not access to the particular data item is unauthorized based on whether the content-dependent name of the particular data item corresponds to at least one of said plurality of values, and
(iii) based on said determining in step (ii), not allowing the particular data item to be provided to or accessed by the second computer if it is determined that access to the particular data item is not authorized.

25. A method as recited in claim 24 further comprising:
in response to said request:
(iv) allowing the particular data item to be provided to or accessed by the second computer if it is not determined that access to the particular data item is unauthorized.

26. The method of claim 1 wherein the content-based name of the particular data item is based on a function of only the data which comprise the contents of the particular data item.

27. The method of claim 20 wherein the content-dependent name of the particular data item is based on a function of only the data comprising the particular data item.

28. The method of claim 21 wherein, for each particular data item of the plurality of data items, the corresponding content-dependent name for that particular data item was determined as a function of only the contents of that particular data item.

29. The method of claim 24 wherein the data used by the function to determine the content-dependent name of the particular data item comprises only the contents of the particular data item.

30. The method of claim 20 wherein the content-dependent name of the particular data item is based on a function of all of the data comprising the particular data item.

31. The method of claim 21 wherein, for each particular data item of the plurality of data items, the corresponding content-dependent name for that particular data item was based on a function of all of the contents of that particular data item.

32. The method of claim 24 wherein the data used by the function to determine the content-dependent name of the particular data item comprises of all of the contents of the particular data item.

33. The method of claim 1 wherein the hardware comprises a processor and memory.

34. The method of claim 20 wherein the hardware comprises a processor and memory.

35. The method of claim 21 wherein the hardware comprises a processor and memory.

36. The method of claim 24 wherein the hardware comprises a processor and memory.

37. The method of claim 1 wherein the hardware comprises a computer.

38. The method of claim 20 wherein the hardware comprises a computer.

39. The method of claim 21 wherein the hardware comprises a computer.

40. The method of claim 24 wherein the hardware comprises a computer.

41. The method of claim 1 wherein said content-based name for said particular data item was obtained as part of a request to allow providing of the particular data item to one or more computers in the network of computers, and wherein the determining in (c) whether or not access to the particular data item is authorized comprises:

using at least the content-based name of the particular data item and information in the database to determine whether or not to allow the particular data item to be provided to computers in the network of computers.

42. The method of claim 41 further comprising:
(d) based at least in part on said determining in (c), causing permission to provide the particular data item to computers to be denied when it is determined that access to the particular data item is not authorized.

43. The method as in claim 1 wherein:
the function comprises a message digest function or a hash function applied to at least some of the data in the particular data item to obtain a digital fingerprint of the particular data item.

44. The method of claim 1 wherein the content-based name for the particular data item comprises a digital fingerprint of the particular data item, and wherein each of the plurality of identifiers in the database comprises a digital fingerprint of the corresponding data item.

45. The method of claim 1 wherein, when the particular data item comprises a file or a portion of a file comprising an audio signal, the content-based name of the particular data item is a function of at least some of the data comprising the audio signal.

46. The method as in claim 1 wherein, when the particular data item comprises a file or a portion of a file comprising a video signal, the content-based name of the particular data item is a function of at least some of the data comprising the video signal.

47. A method as recited in claim 1 wherein, when it is not determined in step (c) that access to said particular data item is unauthorized, providing of the particular data item is permitted to or from one or more computers in the network of computers.

48. A method as recited in claim 16 wherein the authorizing access to the particular data item authorizes providing the particular data item to or from one or more computers in the network of computers.

49. The method of claim 21 wherein determining in (c) whether the requestor may access the particular data item comprises:

using at least the content-dependent identifier of the particular data item and the list of content-dependent names to determine whether or not the requestor is authorized to allow copying of the particular data item.

50. The method of claim 1 wherein determining whether or not access to the particular data item is authorized comprises determining whether or not access to the particular data item is not unauthorized.

51. The method of claim 1 wherein the content-based name for the particular data item corresponds to an entry in the database when the content-based name for the particular data item matches one of the plurality of identifiers in the database.

52. The method of claim 1 wherein said database maps each identifier of said plurality of identifiers in said database to information relating to a corresponding data item.

53. A method as recited in claim 1 further comprising:
(d) permitting at least one copy of the particular data item to be distributed to or from at least one computer in the network when it is determined that the particular data item is not unauthorized.

54. The method of claim 1 further comprising:
(d) based at least in part on said determining in (c), causing denial of permission for at least one copy of the particular file to be distributed across the plurality of computers in a network when it is determined that the file is not authorized.

55. The method of claim 1 further comprising the step:
(i) by hardware in combination with software, determining said content-based name for said particular data item.

56. The method of claim 55 further comprising:
obtaining a copy of the particular data item, and wherein the step (i) determines the content-based name using the copy of the particular data item.

57. The method of claim 1 further comprising:
obtaining the database.

58. The method of claim 1 wherein the content-based name for said particular data item is based, at least in part, on a size or length of the particular data item.

59. The method of claim 51 wherein the content-based name for the particular data item corresponds to an entry in the database when the content-based name for the particular data item exactly matches one of the plurality of identifiers in the database.

60. The method of claim 1 wherein the database comprises a table or a list identifying data items which may only be used by licensed users.

61. The method of claim 1 wherein the database comprises a table identifying license information associated with data items, and wherein the table is indexed at least by the identifiers of data items.

62. The method of claim 1 wherein, wherein the database comprises a table containing a plurality of records, and wherein a record of the table records a relationship between a specific data item and users licensed to have access to that specific data item.

63. The method of claim 1, wherein the plurality of identifiers in the database are identifiers of licensed content items.

64. The method of claim 5 wherein the table or list identifies conditions under which certain data items may be used.

65. A method as recited in claim 1 wherein access to said data item comprises one or more of: (a) copying the data item to or from at least one of a plurality of computers; (b) providing the data item to at least one of a plurality of computers; (c) reading the data item; (d) copying the data item; (e) distributing the data item; (f) modifying the data item; (g) storing the data item; (h) opening the data item; (i) publishing the data item; (j) writing the data item; (k) moving the data item; and (l) deleting the data item.

66. A system operable in a network of computers, the system comprising hardware including at least one processor to:
(a) obtain at a first computer, from a second computer distinct from said first computer, a content-based name for a particular data item, the content-based name being based at least in part on a function of at least some of the data which comprise the contents of the particular data item, wherein the function comprises a message digest function or a hash function, and wherein two identical data items will have the same content-based name; and to
(b) ascertain whether or not the content-based name for the particular data item corresponds to an entry in a database comprising a plurality of identifiers; and to
(c) determine, based at least in part on whether or not the particular data item corresponds to an entry in a database, whether or not access to the data item is unauthorized at or by one or more computers distinct from the first computer.

67. A system operable in a network of computers, the system comprising hardware including at least one processor to:
   control distribution of content from a first computer in said network, at a first computer, in response to a request from a second computer distinct from the first computer, the request including at least a content-dependent name of a particular data item, the content-dependent name being based at least in part on a function of at least some of the data comprising the particular data item, wherein the function comprises a message digest function or a hash function, and wherein two identical data items will have the same content-dependent name, and to
   based at least in part on said content-dependent name of said particular data item, selectively permit the content to be provided to or from at least one other computer if providing of the content is not determined to unauthorized or unlicensed.

68. A device operable in a network of computers, the device comprising hardware including at least one processor, and software, in combination with said hardware:
   (a) to obtain a list of content-dependent names, one content-dependent name for each of a plurality of data items, wherein, for each of the plurality of data items, the corresponding content-dependent name for that data item is based at least in part on a function of at least some of the contents of that data item, wherein the function is a message digest function or a hash function, and wherein two identical data items have the same content-dependent name;
   (b) to receive at a first location, from a second location distinct from said first location, an identifier for a particular data item;
   (c) to determine, based at least in part on said identifier for said particular data item, and using said list of content-dependent names, whether a requestor may access the particular data item; and
   (d) based at least in part on said determining, if it is determined that requestor may not access the particular data item, to cause access to the particular data item to be denied.

69. A system operable in a network of computers, the system comprising hardware including at least a processor, and software, in combination with said hardware:
   (a) to receive at a first computer, from a second computer, a request regarding a data item, said request including at least a content-dependent name for the data item, the content-dependent name being based at least in part on a function of the data in the data item, wherein the data used by the function to determine the content-dependent name comprises at least some of the contents of the data item, wherein the function that was used is a message digest function or a hash function, and wherein two identical data items will have the same content-dependent name; and
   (b) in response to said request:
      (i) to cause the content-dependent name of the data item to be compared to a plurality of values; and
      (ii) to determine if access to the data item is authorized or unauthorized based on whether or not the content-dependent name corresponds to at least one of said plurality of values, and
      (iii) based on whether or not it is determined that access to the data item is authorized or unauthorized, to allow the data item to be provided to or accessed by the second computer if it is not determined that access to the data item is unauthorized.

70. A computer-implemented method operable in a system which includes a network of computers, the system implemented at least in part by hardware including at least one processor, the method comprising the steps of:
   in response to a request at a first computer, from another computer, said request comprising at least a content-based identifier for a particular data item, the content-based identifier for the particular data item being based at least in part on a given function of at least some data which comprise the contents of the particular data item, wherein the given function comprises a message digest or a hash function, and wherein two identical data items will have the same content-based identifier:
      (A) hardware in combination with software, determining whether the content-based identifier for the particular data item corresponds to an entry in a database comprising a plurality of content-based identifiers; and
      (B) based at least in part on said determining in step (A), selectively permitting the particular data item to be accessed at or by one or more computers in the network of computers, said one or more computers being distinct from said first computer.

71. A computer-implemented method implemented at least in part by hardware comprising at least one processor and software, in combination with said hardware, the method comprising the steps:
   at a first location, by a first computer,
      (A) for a particular data item, said particular data item comprising a plurality of segments, for at least some of said plurality of segments, obtaining a corresponding content-dependent segment identifier from another computer at another location, each said corresponding content-dependent segment identifier being based, at least in part, on a given function of at least some of the data comprising the corresponding segment, wherein said given function for content-dependent segment identifier of at least one of the segments comprises at least a message digest function or hash function, and wherein two identical segments will have the same content-dependent segment identifier; and
      (B) hardware in combination with software, ascertaining whether or not at least some of said content-dependent segment identifiers have corresponding entries in a database comprising a plurality of content-dependent identifiers; and
      (C) based at least in part on said ascertaining in (B), selectively permitting access to the particular data item at one or more locations distinct from the first location,
      wherein, when the particular data item comprises a file or a portion of a file comprising an audio signal, the content-dependent segment identifier of at least one of the plurality of segments for particular data item is a function of at least some of the data comprising the audio signal; and
      wherein, when the particular data item comprises a file or a portion of a file comprising an video signal, the content-dependent segment identifier of at least one of the plurality of segments for particular data item is a function of at least some of the data comprising the video signal, and
      wherein said selectively permitting access to said particular data item in step (C) comprises one or more of: (a) selectively permitting copying of the data item to or from at least one of a plurality of computers; (b) selectively permitting providing of the data item to at least one of a plurality of computers; (c) selectively permitting reading of the data item; (d) selectively permitting copying of the data item; (e) selectively permitting distribution of the data item; (f) selectively permitting modification of the data item; (g) selectively permitting storage of the data item; (h) selectively permitting opening of the data item; (i) selectively permitting publishing of the data item; (j) selectively permitting writing the data item; (k) selectively permitting moving the data item; and (l) selectively permitting deleting the data item.

72. The method of claim 1 wherein step (c) comprises:
determining whether or not access to the particular data item is authorized at or by one or more computers distinct from the first computer.

73. The method of claim 20 wherein the first location is the first computer.

74. The method of claim 20 wherein the second location is the second computer.

75. The method of claim 21 wherein the step (c) of determining takes place at said first location.

76. The method of claim 21 wherein the first location receives the content-dependent identifier from the requestor.

77. The system as in claim 67 wherein the at least one other computer is distinct from the first computer.

78. The system as in claim 68 wherein the identifier is received a the first location from the requestor.

79. The system of claim 68 wherein access to the particular data item comprises one or more of: (a) copying the data item to or from at least one of a plurality of computers; (b) providing the data item to at least one of a plurality of computers; (c) reading the data item; (d) copying the data item; (e) distributing the data item; (f) modifying the data item; (g) storing the data item; (h) opening the data item; (i) publishing the data item; (j) writing the data item; (k) moving the data item; and (l) deleting the data item.

80. The system of claim 69 wherein
based on whether or not it is determined that access to the data item is authorized or unauthorized, the system allows the data item to be provided to the second computer from the first computer if it is not determined that access to the data item is unauthorized.

81. A device operable in a network of computers, the device comprising hardware including at least one processor and memory, to:
(a) receive, at said device, from another device in the network, a content-based identifier for a particular sequence of bits, the content-based identifier being based at least in part on a function of at least some of the particular sequence of bits, wherein the function comprises a message digest function or a hash function, and wherein two identical sequences of bits will have the same content-based identifier; and to
(b) compare the content-based identifier of the particular sequence of bits to a plurality of values; and to
(c) selectively allow said particular sequence of bits to be provided to or accessed by other devices depending on whether or not said content-dependent identifier corresponds to one of the plurality of values.

82. The device of claim 81 wherein the particular sequence of bits represent data selected from the group comprising: a file, a portion of a file, a page in memory, a digital message, a portion of a digital message, a digital image, a portion of a digital image, a video signal, a portion of a video signal, an audio signal, a portion of an audio signal, a software product, and a portion of a software product.

83. The method of claim 1 wherein the content-based name for the particular data item comprises a request for the particular data item.

84. The method of claim 24 wherein the request regarding the particular data item is a request for the particular data item.

85. The system as in claim 69 wherein the request regarding the data item is a request for the data item.

86. A device operable in a network of computers, the device comprising hardware, including at least one processor and memory, to:
(a) receive at said device, from another device in the network, a digital identifier for a particular sequence of bits, the digital identifier being based, at least in part, on a given function of at least some of the bits in the particular sequence of bits, wherein the given function comprises a message digest function or a hash function, and wherein two identical sequences of bits will have the same digital identifier; and
(b) selectively allow the particular sequence of bits to be provided to or accessed by other devices in the system, based at least in part on whether or not the digital identifier for the particular sequence of bits corresponds to a value in a plurality of values, each of the plurality of values being based, at least in part, on the given function of at least some of the bits in a corresponding sequence of bits.

87. A device as in claim 86 wherein the device is a computer.

\* \* \* \* \*